US012045880B2

(12) United States Patent
Tomich

(10) Patent No.: US 12,045,880 B2
(45) Date of Patent: Jul. 23, 2024

(54) BUSINESS TO BUSINESS CREDIT FACILITY PROVISIONING AND PROCESSING SYSTEM AND METHOD WITH AUTOMATIC LIGHTWEIGHT MODULE AS A PAYMENT OPTION AT CHECKOUT

(71) Applicant: John Tomich, Los Angeles, CA (US)

(72) Inventor: John Tomich, Los Angeles, CA (US)

( * ) Notice: Subject to any disclaimer, the term of this patent is extended or adjusted under 35 U.S.C. 154(b) by 0 days.

(21) Appl. No.: 18/115,729

(22) Filed: Feb. 28, 2023

(65) Prior Publication Data

US 2023/0206322 A1 Jun. 29, 2023

Related U.S. Application Data

(63) Continuation-in-part of application No. 17/567,835, filed on Jan. 3, 2022, which is a continuation of application No. 16/578,262, filed on Sep. 20, 2019, now abandoned.

(51) Int. Cl.
*G06Q 40/03* (2023.01)
*G06Q 20/38* (2012.01)

(52) U.S. Cl.
CPC .......... *G06Q 40/03* (2023.01); *G06Q 20/382* (2013.01)

(58) Field of Classification Search
CPC ............................ G06Q 40/03; G06Q 20/382
See application file for complete search history.

(56) References Cited

U.S. PATENT DOCUMENTS

| | | | | | |
|---|---|---|---|---|---|
| 5,699,527 | A * | 12/1997 | Davidson | G06Q 40/02 | 705/42 |
| 5,878,403 | A * | 3/1999 | DeFrancesco | G07F 7/08 | 705/38 |
| 6,611,816 | B2 * | 8/2003 | Lebda | G06Q 40/00 | 705/1.1 |
| 2010/0094748 | A1 * | 4/2010 | Cobb | G06Q 40/03 | 705/38 |

* cited by examiner

*Primary Examiner* — Bennett M Sigmond
*Assistant Examiner* — Marla Hudson
(74) *Attorney, Agent, or Firm* — Olivo IP Law Group, P.C.; John W. Olivo, Jr.

(57) ABSTRACT

Technologies are described herein for providing an internet-connected computer system for improved business-to-business lending experience. Through the use of a simplified underwriting architecture, and a minimalistic user interface, the system improves the quality of the lending experience while reducing merchant risk and allowing product flexibility. The system further describes a secure environment, providing additional advantages over traditional methods of business-to-business underwriting.

21 Claims, 69 Drawing Sheets

FIG. 12B
Pay in 4 vs. Term U/W
Pay in 4
+ First name
+ Last name
+ Email
+ Mobile number
+ DOB
+ Last 4 SSN
+ EIN
+ Company Name
Term U/W
+ First name
+ Last name
+ Suffix
+ Email
+ Mobile number
+ Company name
+ DBA (if any)
+ Owner/purchaser
+ Biz Street
+ Biz State
+ Biz City
+ Biz Zip
+ GAR
+ Entity Type
+ Biz phone
+ EIN
+ Personal Street
+ Personal City
+ Personal State
+ Personal Zip
+ DOB
+ SSN
+ Beneficial owners
+ Bank connection

1736

BUSINESS TO BUSINESS CREDIT FACILITY PROVISIONING AND PROCESSING SYSTEM AND METHOD WITH AUTOMATIC LIGHTWEIGHT MODULE AS A PAYMENT OPTION AT CHECKOUT

CROSS REFERENCE TO RELATED APPLICATIONS

This application is a continuation in part of U.S. patent application Ser. No. 17/567,835, filed Jan. 3, 2022, which is a continuation of U.S. patent application Ser. No. 16/578,262, filed Sep. 20, 2019, the contents of which are incorporated herein by reference.

BACKGROUND OF THE INVENTION

Business-to-business ("B2B") commerce focuses on selling products and services to other companies, in contrast with the model of Business-to-consumer ("B2C"), whereby businesses sell products or services to consumers. B2B lending is comprised of four factors, which are 1. customer experience; 2. privacy and security; 3. product flexibility; and 4. merchant risk.

A positive customer experience requires speed and ease of use in order to increase conversion rates. Current platforms require a lengthy form-filling process with dozens of form fields to complete and require sensitive personal information such as customer bank account login credentials, a full Social Security Number ("SSN"), driver's license number, and recent tax returns. Many current platforms also slow down potential transactions by requiring the submission of trade reference checks from the customer, such as customer evidence of financial strain or changes in the customer's buying pattern. Current platforms have limited lending flexibility, with limited options to choose the terms of paying back the loan, and not offering the customer choices on those terms. Current platforms do not offer an overall line of credit options to the customer and have no ability to control the underwriting process, which negatively impacts customer approval ratings.

Furthermore, current platforms expose the merchant to criminal penalties due to state usury laws. For example, if the customer is charged repayment late fees, this can be re-characterized as interest. If this interest, on an annualized basis, is greater than 25% in NY or 20% in MA, for example, this is a Class C felony, with 3.5 to 15-year prison sentences. If it's greater than 8% or 12% annualized in CA or TX respectively, this breaches state usury laws.

There are dozens of states with over-changing and complicated usury laws. Operating in potential breach of state usury laws carries significant risks. The merchant is also potentially exposed to state civil penalties if the lender does not have a bank sponsor or federally chartered bank sponsor. The present invention provides optimization for customer experience, privacy and security, product flexibility, and decreasing merchant risk.

There are approximately 29 million small and medium-sized businesses ("SMBs") in the United States, which employ 50 million people that are an integral part of the US economy. These businesses rely on efficient access to outside capital in order to function and grow. According to the Federal Reserve, there were $157.9 billion in value in outstanding microloans (loans less than $100,000) in the United States as of 2Q 2016. Historically, businesses looking for a source of third-party working capital or microloans would approach a local, regional or national bank. Many of these institutions have essentially abandoned the small business market over the last decade for various reasons, including high fixed costs and outdated technology that prohibits efficient and cost-effective underwriting. Indeed, many systems presently in use end up requiring a substantial degree of human intervention in order to complete the processing steps.

Additionally, at any given time, these SMBs in aggregate hold hundreds of billions over in outstanding trade credit payable balances, which is essentially a supplier providing them short term "capital" to facilitate a business purchase. For decades, B2B merchants have extended trade credit to these SMB customers, allowing them to buy now, and pay in 30, 60 or 90 days. One of the structural challenges with trade credit in the e-commerce age is that merchants oftentimes will offer too little credit to too few customers, as well as take days or weeks to do underwriting. The trade credit industry is ripe for product innovation and disruption.

SMBs need goods to run their businesses, whether it's a heating, ventilation, and air conditioning ("HVAC") installer buying maintenance supplies, a t-shirt shop buying blank t-shirts for printing, or a mom & pop computer supplier purchasing hard drives for resale. Much like consumer purchases, these B2B sales are increasingly moving online, with telephone and in-store sales quickly being outpaced by purchases through e-commerce websites. B2B e-commerce volume is currently double the size of B2C e-commerce and is projected to surpass $1 T in gross merchandise value ("GMV") by 2020. Despite the large GMV number, B2B e-commerce technology sophistication and penetration lag a decade or so behind B2C. In multiple surveys, B2B e-commerce users list flexible payment options as one of the most desired areas for improvement and innovation.

SUMMARY OF THE INVENTION

According to one embodiment of the present invention, the user, for example a SMB, installs a lightweight module on the user's e-commerce payment portal that presents the invention as a payment option at checkout. This embodiment of the present invention allows for real-time underwriting through a proprietary scoring method. Through the input of a few additional details, the customer can be verified and approved online within seconds. The customer completes the transaction online, and the order is confirmed.

The system and method of the present invention benefit merchants by providing increased revenue; an improved consumer experience ("CX"); simple integration into the merchant's e-commerce platform; lower cost and risk due to improved verification; and an overall increase in cash flow. The present invention benefits business borrowers by providing instant, simple approval; increased credit amounts and larger lines of credit; better credit rates; longer and more flexible repayment terms; and customer support. Data is then gathered so that processing steps and criteria may be adjusted to improve the consumer experience, for example, by the deployment of machine learning or artificial intelligence (AI) techniques.

The present invention provides several advantages to the merchant, including but not limited to better differentiation against competitors; driving higher purchasing on existing member accounts; and increasing sales by providing flexible pay-over-time solutions to the customer.

One embodiment of the present invention is the integration of cloud software tools with capital and bank partnerships to build an enhanced system of risk screening, loan servicing and regulatory compliance. The present invention may be partnered with, for example, a Utah chartered industrial bank to ensure compliance with Federal Deposit Insurance Corporation ("FDIC") and state regulations (for example, if that bank is compliant).

The infrastructure of the present invention also allows for the use of web services that enable interaction with and storage of data across devices. Specifically, these web services, or Credit Key Web Services ("CKWS") can allow for the use of cloud software tools and cloud-based data storage. Cloud software tools can be used to allow for increased security screenings and authorization checkpoints for data accessed between capital and bank partnerships. The web service software aids in the transmission of data between entities while still maintaining secure access restrictions preventing any unauthorized access to the cloud data.

The present invention helps merchants deliver payment flexibility to customers through methods such as but not limited to purchase funnel financing; post-decline financing; and addressing the issues of cart abandonment and post-decline emails through consumer alerts and reminders.

One embodiment of the present invention creates a more streamlined process for B2B lending. The customer experience is improved upon as the present invention allows for fast in-cart approvals within 5 seconds and requires less time and consumer data to complete, allowing for higher conversion rates. The present invention offers improved privacy and security, whereby personal details such as a customer's tax statements or returns, or driver's license number are not required in the approval process, and trade reference checks are not needed. The present invention is a true pay-over-time product, instead of the typical single option net term replacement. This flexibility drives higher conversion rates, higher Average Order Value ("AOV"), and higher order volume. The underwriting is controlled by the present invention in order to lend most effectively and can control approval rates. The present invention includes, for example, a Utah chartered bank sponsorship to eliminate merchant exposure to civil state penalties and criminal penalties due to state usury laws. Naturally, any user of the present invention may choose any bank or lender as it is deemed satisfactory for intended business purposes.

The present invention does not rely upon or preferably utilize a line of credit which is open-ended but rather and preferably utilizes a trade credit limit. In that manner, a user of the present invention may benefit from an overall assessment of a user/borrower's pattern with particular trade credit history, taking into account the nature of the vendor, the nature of the borrower, and the history pertinent with respect to both.

The present invention utilizes a unique method of mixing Enterprise Resource Planning ("ERP") data with data from Public Credit Bureaus (TransUnion, Equifax & Experian (Fair Isaac Corporation ("FICO"))). ERP data is derived from the service provider or retailer etc.; from its client; Social Security number or a portion of a Social Security number; spending past and/or present; and payment history data which service or product suppliers gather from the party wishing to have credit extended to it. The present invention features a so-called lightweight approach, allowing for integration into a merchant's database. Merchants have ERP data derived from their respective customer relationships, and that ERP data may be operated upon and integrated into business lending decisions according to the present invention. Moreover, the present invention may deploy a myriad of biometric identification techniques, such as retina scans, fingerprinting printing, voice printing, face printing, code words, passwords, PIN codes, and so forth, to insure, for example, only authorized users to avail themselves of the credit facilities provided according to the present invention. In addition, login to any social media application will be included for two-factor authentication, and a GPS comparison logic may be deployed for data security, so that, for example, a customer "checks in" via social media in Las Vegas, and at the same time or roughly the same time, that same consumer attempts to transact business at a point of sale ("POS") terminal in Florida, that a flag will be raised as to whether the user is legitimate.

The present invention provides a valuable service to its Merchant partners on two fronts. For Merchants that offer net trade credit to their customers, the present invention provides an alternative solution so that the Merchant no longer has to do so. For a Merchant to effectively extend trade credit it needs to have the ability to assess the creditworthiness of its customers to determine if they are eligible for trade credit and to determine how much trade credit they will offer, be willing to wait the term of the trade credit to receive its funds, many times without monetary compensation, have a collections/servicing department to make sure payments are received, and be willing to accept the risk that the customer will not pay. All the above capabilities have a cost associated with them. By integrating with the present invention, these Merchants will no longer have to execute the above tasks and can instead focus on their core business. Since the present invention is integrated with a finance company, it will be able to better assess customer creditworthiness, which will translate into more customers approved for trade credit and larger credit amounts extended.

The present invention will also eliminate the need for the Merchant to have a staff dedicated to managing trade credit and servicing the accounts receivables. The Merchant will also eliminate all the risk associated with the customer not paying and receiving the funds two days after the transaction versus having to wait thirty days. Finally, to some extent, a Merchant can increase the likelihood that it will efficiently extend trade credit to its customers, and in cases where that is not possible under any circumstances, will be able to identify the external lending facility as the negative decision maker. The above factors translate into material cost savings and risk reduction for the Merchants. For Merchants that don't extend trade credit, the present invention provides an alternative payment option that will provide flexibility to customers. This flexibility will allow customers to better manage their cash flow which will translate into higher order sizes and increased revenue for the Merchant and higher satisfaction rates for the customers.

By providing more trade credit to more customers and allowing payment flexibility, the present invention will increase the customer's average order size and increase revenues for the Merchants. By taking on the trade credit function of the Merchants, the present invention will also reduce risk and costs to the Merchants while improving their cash flow. For all these benefits the Merchant will pay a processing fee to the financing company associated with the present invention starting at 2.9% of the transaction amount which will decline based on volume thresholds. This fee is priced similarly to credit card processing fees that the Merchant would have otherwise paid to execute the transactions.

Another benefit for the Merchant is an added loan for Merchants. The Merchant can request a loan from the financial institution through the present invention and have the payments from their customers go towards the financial institution in order to repay the loan. This loan option begins with the financial institution looking at the Merchant's selling history and its credit score to determine whether the financial institution will approve or deny the loan request. Once the loan request is approved, the Merchant chooses which customer payments will be used to repay the loan, and then the Merchant will receive the money. Once the chosen customer purchases items from the Merchant, that money is sent directly to the financial institution via an electronic transaction in order to pay back the Merchant's loan. An example of this is if a Merchant needs to purchase a business necessity but does not have the funds before items are sold, the Merchant can request a loan from the financial institution and when items are sold, that payment will go to the financial institution to pay back the loan for the Merchant. With this loan option for Merchants, the present invention gives multiple opportunities to both Merchants and Customers to be able to purchase products needed to run a business before funds are available.

The present invention offers SMB customers a new payment solution, that results in better access to credit, in seconds, right at the e-commerce point of purchase. SMB customers enter a few details about the business owner (name, address, social security number, date of birth, etc.) and the business (name, employer identification number, address, etc.), and the present invention is instantly able to approve and fund the order, right at e-commerce checkout. The present invention does this through a real-time, proprietary scoring engine that delivers a high approval rate, and interest rates that are often lower than the SMB customer's credit cards. In just a few clicks, SMB owners can use a flexible B2B payment option that lets them pay overtime for their orders. The payments can be made through either credit card or cryptocurrency, with the connection of a cryptocurrency wallet to the present invention. The present invention makes business credit transactional.

The present invention has multiple advantages built into its business model. Other business lending options have to charge high interest rates/fees due to the fact that the use of the funds they provide SMB customers is undetermined. The SMB recipient might use the funds for business purposes, or they might be used for non-business purposes, like a personal vacation. The present invention funds the B2B merchant directly, not the SMB, so the loan is always guaranteed to be for business use.

The present invention also provides access directly to its merchant partners' historical transaction data, which provides a powerful underwriting decision advantage. At scale, along with the present invention's own transactional data, this will make the present invention's proprietary scoring incredibly robust and valuable. Clients who operate businesses that are seasonally busy during certain time periods could be, for example, extended more credit during certain times and for certain goods based on real history that is directly applicable. In addition, because the present invention utilizes a unique method of mixing ERP data with data from Public Credit Bureaus (TransUnion, Equifax & Experian (FICO)), which data is derived from: the service provider or retailer etc.; from its client; Social Security number or a portion of a SSN; spending past and/or present; and payment history data which service or product suppliers gather from the party wishing to have credit extended to it, data may be stored for later usage and the overall system may "learn" based on past lending decisions. In other words, the system according to the present invention can track the reasons "why" past lending decisions were made in one way or another (approve or deny), and then, track the outcome of those decisions in the future, so that future lending decisions may optionally be influenced by the overall track record according to the present invention. The present invention features a so-called lightweight approach, allowing for integration into a merchant's database. Merchants have ERP data derived from their respective customer relationships, and that ERP data may be operated upon and integrated into business lending decisions according to the present invention.

The system may also "learn" the spending habits of the customers and give recommendations to the customer on which loan options are the best fit for the customer. This system will use AI technologies in order to constantly learn from previous costumer decisions. These previous decisions will be analyzed and used by the present invention to give recommendations to the customer. For example, the system may learn based on previous purchases that the customer always chooses the loan repayment option with the longest duration of payments. However, based on the customer's income, the system may see that it is a better fit for the customer to make a larger dollar amount of payment every month, shortening the amount of time needed to pay back the loan. The system in the present invention will provide this recommendation to the customer when they are choosing a loan repayment option. The customer still has the choice to make their own decision on the loan repayment, but this recommendation allows the customer to see the best overall repayment option based on their past decisions.

Another distinct advantage of the present invention is that once the present invention is integrated as a payment option on a merchant's site, there's no incremental cost for new users. This provides substantial and unique advantaged economies of scale. The present invention has an even more distinct advantage of giving a loyalty rewards program to the merchants and customers. Through the connection of other applications, such as Melio Payments, the merchant or the customer can receive rewards for on-time payments made for their loans. Melio Payments is a site that gives points and rewards to their customers for making payments. With connection to Melio Payments, customers and merchants can make payments and earn rewards through both Melio Payments and the present invention. With Melio Payments, the present invention can also streamline all the different loans one has into one location. The connection with Melio Payments also makes it easier and quicker for customers to pay their loans to receive points and rewards, as well as making it easier and quicker for merchants to be paid.

Some of these rewards include a decreased processing fee to the financial institution or rewards from the credit card companies used. For example, if a customer is repaying a loan through a Visa credit card, the rewards that the Visa credit card gives their customers can also be redeemed using the present invention. The customers also have the option of choosing to have their points from the loyalty rewards program of the present invention be transferred into credit card points. So, if the customer uses a Visa credit card to make their payments, the points the customer receives for the present invention's loyalty reward program can be transferred to Visa rewards points. The more on-time payments or the faster a loan is repaid, the more rewards a customer or merchant can receive with this loyalty rewards program. The loyalty rewards program incentivizes the merchant or customer to stay on track with loans and to pay the loans back even faster, giving a benefit to all that use the present invention.

The loyalty rewards program is a points-based system. With every on-time payment made, the customer or merchant will receive 50 points. With every early payment, the customer or merchant will receive 100 points. With every fully repaid loan on time, the customer or merchant will receive 150 points. With every fully repaid loan early, the customer or merchant will receive 200 points. The customer or merchant can begin to redeem rewards once they have reached 500 points. The customer or merchant has the option to save up their points in order to receive greater rewards or multiple rewards at once. Different rewards will be worth different numbers of points depending on how great the rewards are. The greater the reward is, the more points the reward is worth. For example, a reward for 10% off at a Sephora would cost 500 points, while a reward for 25% off at Sephora would cost 1500 points.

Other reward options that can be redeemed by the customer or merchant include airline miles and cash back. Points earned through the reward system can be redeemed in exchange for airline miles. The more points used in the exchange, the more airline miles the customer can redeem. Cash back is an alternative option to points in return for making early payments or completing the full repayment of a loan early. An example of this would be for making 3 early payments toward the loan, the customer can receive $100 back as a reward. Another example of this would be for a customer completing the repayment of a loan 3 months early, the customer can receive $200 back as a reward.

Customers and merchants can also turn reward points into cash rewards. These cash rewards can be redeemed in two ways. The first way is that the customer or merchant can have the cash rewards deposited directly into their bank account. The other option is for the customer or merchant to have the cash value added to their next loan. This option allows the customer or merchant to directly save money on their next loan payment. These cash rewards will be given to customers and merchants who have received and saved a large sum of points.

Another aspect of the loyalty rewards program is that the customer can receive discounts on items being purchased using the present invention. The longer the customer uses the present invention for payments, the greater the discount they can receive. Customers can be categorized as either bronze, silver, or gold-tier based on how long they have been using the present invention. Customers who reach the gold tier receive the largest discount offers, while silver members receive greater discounts than bronze and bronze receive greater discounts than new customers. For example, if a customer is purchasing hot sauces in bulk for their restaurant and has been using the present invention to pay for the hot sauces, the present invention will show a discount code for the customer to use to receive 15% off based on the fact that this customer has been using the present invention for over a year. This incentivizes customers to continue using the present invention for years to come in order to receive multiple types of rewards and benefits that increase with loyalty.

The present invention's loyalty rewards program will also have a reward for loans made by a customer or merchant. For a customer or merchant who has made a minimum of 10 loans, they can receive a bonus to reward the loyalty of the customer or merchant. This will motivate the customer or merchant to stay loyal to the present invention and keep using the present invention in the future.

The present invention also provides rewards to customers and merchants upon approval for their first loan as well as for referring friends to the present invention. This gives the customers and merchants a reward for choosing to use the present invention, as well as provides customers and merchants with rewards for introducing new users to the present invention. Once the referred friend is approved for their first loan, the customer or merchant who referred the friend will receive points for the referral and the friend will also receive points for their first loan approval through the present invention. This builds loyalty for the customers and merchants using the present invention and increases marketing and participants using the present invention.

Machine learning can automatically track rewards offers and points for each customer and merchant so that they do not have to worry about keeping track of their earned points and rewards. The use of machine learning for the loyalty and rewards program allows the present invention to suggest certain rewards as "priority" to each customer or merchant, based on their previous use of points and rewards. For example, if a customer continuously uses their accumulated points for airline miles, the system will suggest future rewards that align with this interest, such as discounted hotel rates, coupons for transportation, and other rewards related to travel. The use of machine learning also enables the present invention to track each customer and merchant's ability to earn points and rewards based on the following set of guidelines: on-time payments, early repayments, and early completion of repayment. The program will keep track of each time one of these guidelines is met and, once a certain number of them are reached, the program will alert the customer or merchant that a reward can be redeemed. The customer or merchant can then choose from a set of rewards. Once the reward is redeemed, the program resets the reward tracking and begins again from the beginning, while still maintaining access to data from previous rewards provided and redeemed.

The present invention also has the advantage of having a mobile phone application. This application will allow customers to log into their account from the app on their phone or other wireless interface device. In this format, customers can view any open loans and check the next payment due date and amount. This increases the convenience of the present invention for the customer because it provides them with the ability to check all open loans, receive push notifications for payment due dates and other alerts, and allow customers to track all open loans and payment schedules from their phone or other wireless interface. This also allows for the integration of the present invention with other applications such as their mobile calendar application in order to sync payment schedules to their preferred calendar application and receive email and text alerts for upcoming payments, new reward offers, and other important information.

This app also has the distinct advantage of having a unique Quick Response ("QR") code for the customer that will bring up all the customer's information when scanned. This allows for the present invention to also be used in brick-and-mortar stores. A customer can go to a brick-and-mortar store and when checking out, the customer can open the present invention's app and have that scanned by the store clerk or Merchant. This will then provide the Merchant with the customer's information regarding the present invention and whether the customer can be approved or denied for a loan. Once the customer is approved, the customer can choose their repayment option and redirect the completion of their order to take place with the present invention's platform. This app gives more Merchants opportunities to work with the present invention and allows for more customers to use the benefits of the present invention by expanding its application beyond online-only purchases.

Just as customers are able to use a unique QR code to check out in-person, Merchants can also use a unique QR code for their brick-and-mortar shop. Merchants can display a QR code which customers can scan in order to apply for the use of the present invention. The application process can be completed in less than a few minutes, and once approved, the Merchant can redirect the checkout process with the approved customer using their standard POS device so that the order completion and payment is conducted on the platform of the present invention.

The present invention can provide the customer with one or more offers of loans. Whether or not a customer qualifies for a financing offer can be based entirely on an evaluation of the customer's previously conducted financial transactions through the algorithm of the present invention. The present invention can collect this amount as a percentage of the amounts collected by the customer from future financial transactions conducted through the present invention. The present invention will give recommendations to the customer based on what the invention has "learned" about the customer for which offer the invention determines is the best fit for the customer. An example of these recommendations is "we think the ______ month repayment option is best because of ______ spending habits vs ______ income". These recommendations will come from previous decisions that the customer has made and are based on their credit score or any income the customer has. The customer still will have the choice of which repayment option they believe is best. This recommendation is only to show what is believed by the present invention to be the best option for the customer, thus providing the customer with additional insight into their options before making their own choice. Once the customer makes their choice, an offer is made. To accept the offer, the customer can select an option, for example, through the interface provided by the present invention. Once the offer is accepted, the customer can be provided with the funds specified in the loan amount through the payment portal or interface of the present invention. Once the loan amount is accepted by the customer, each time the customer conducts a transaction through the present invention, the present invention interface will deduct a specified percentage from the amount charged in the loan transaction. This allows customers that do not have adequate funds to also obtain financing without having to go through a typical loan application process.

The present invention allows for the use of borrower strength or creditworthiness to (a) charge merchants more for the acquisition of that client and to (b) charge merchants or even the customers more (in terms of interest rates) on the back end for servicing the loan. This can also be based on customer granularity within particular tiers of creditworthiness. Furthermore, the present invention may allow customers to decrease the interest rate with a down payment. For example, a customer may qualify at 2% per month, but if the customer makes an initial down payment of 30% of the value of the purchase, the customer is offered a lowered interest rate. The present invention's team has deep e-commerce and product experience, with multiple successful exits among the founding team. The key principle that drives all the present invention's product offerings is customer experience. On this front, the present invention is truly transformative.

Applying for a loan has never been described as a simple or speedy process, but the present invention aims to invert that perception. By pulling personal and business information from the cart, the present invention pre-populates form fields, making the process easier for the user. With a clean UI and as little data entry as possible, the present invention accelerates the SMB customer to a transaction, helping both customers and merchants succeed.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

DETAILED DESCRIPTION OF THE PREFERRED EMBODIMENT

Figure 1:
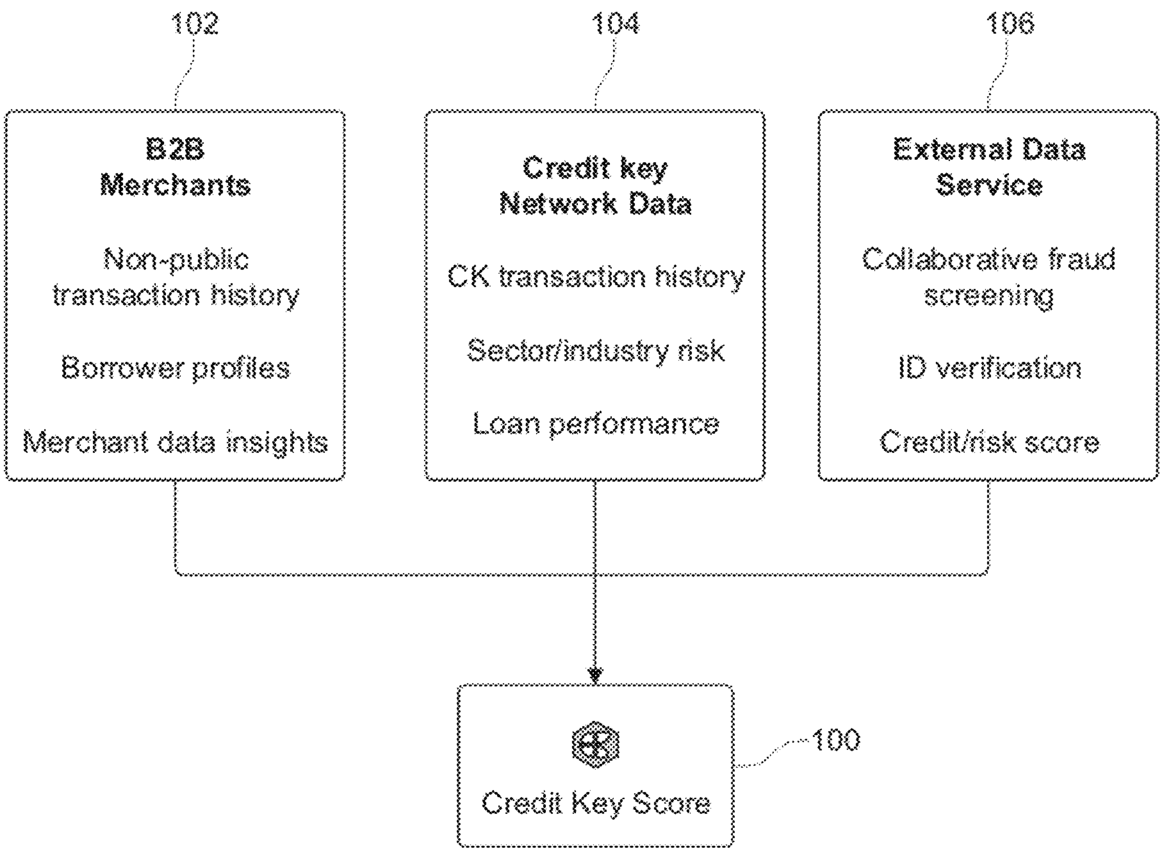
FIG. 1 is a diagram showing the data used to obtain the credit score for the present invention.

FIG. 1 is a diagram showing the data used to obtain the credit score for the present invention. In accordance with the preferred embodiment of the present invention, the process of obtaining a credit score 100 requires data from B2B Merchants 102, credit network data 104, and external data services 106. Data from B2B Merchants 102 includes non-public transaction history; borrower profiles; and merchant data insights. Data obtained from the credit network 104 includes: transaction history stored within the database of the present invention; sector and industry risk; and loan performance. Data obtained from external services 106 includes: collaborative fraud screening; ID verification; and credit risk scores.

Figure 2:
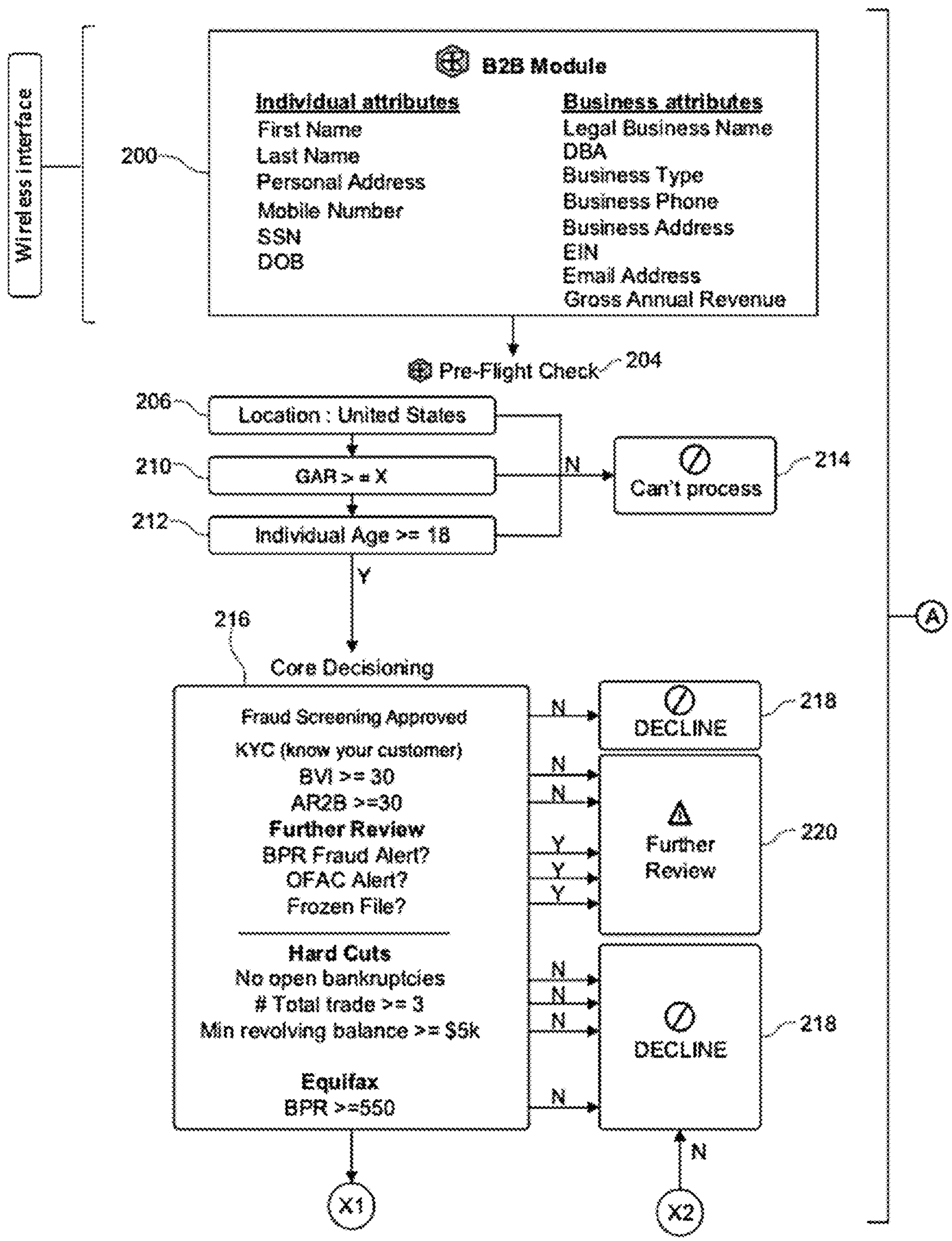
FIG. 2 is a diagram showing the underwriting process of the present invention.
Figure 2:
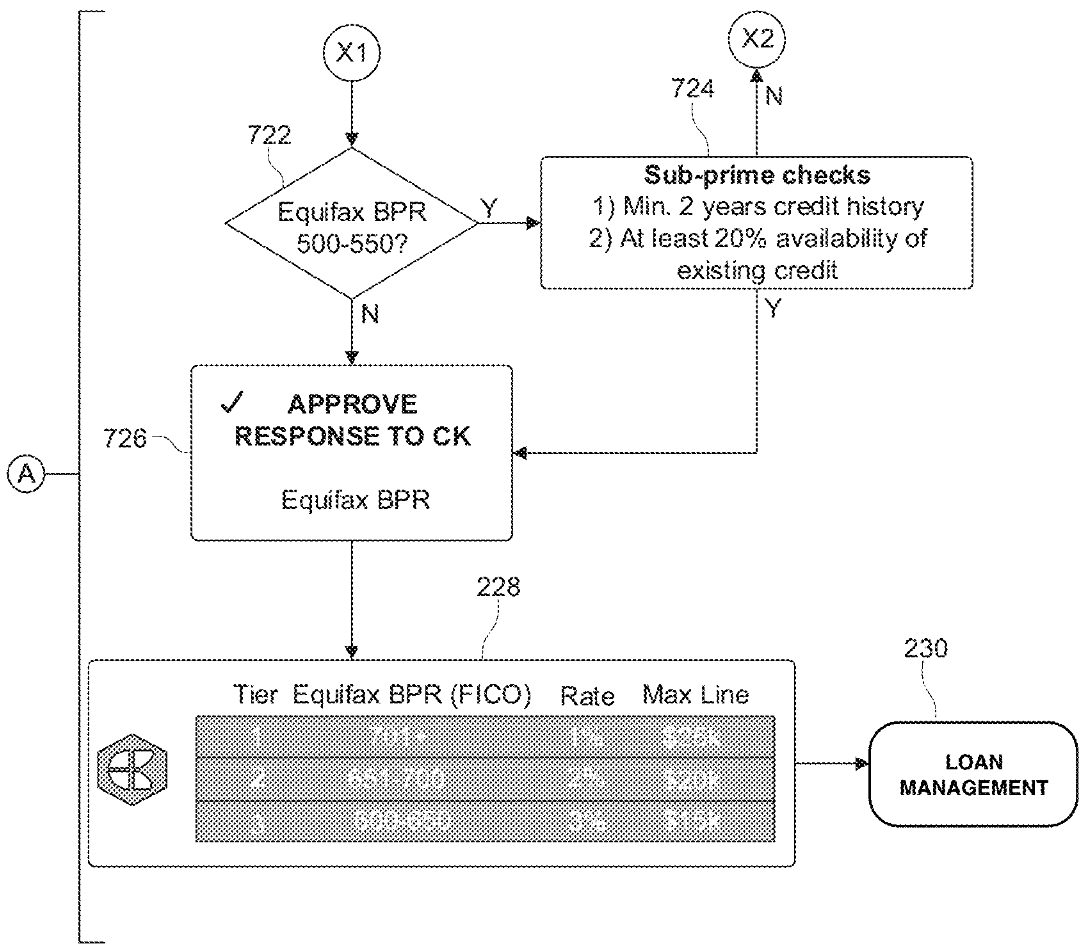

FIG. 2 is a diagram showing the underwriting process of the present invention. In accordance with the preferred embodiment of the present invention, the underwriting process processes data from the B2B module 200 of the present invention, such as data from the individual applying for credit as well as business information. Using a wireless interface, this data is entered into the pre-flight check process 204 whereby it is compared with the requirements for the location 206, the Gross Annual Revenue ("GAR") 210, and the age of the applicant 212. If the submitted data does not meet these requirements, the application is declined 214.

If the application passes the Pre-Flight checks, the application then proceeds to be processed through the Loan Origination factors in the core decision-making 216, which includes assessing factors such as: fraud screening approval; Know Your Customer ("KYC") Brand Visual Identity ("BVI") and Business to Account Representative ("AR2B"); further review that includes Business Process Redesign ("BPR") Fraud Alerts, Office of Foreign Assets Control ("OFAC") Alerts, and Frozen Files; Hard Cuts such as bankruptcies, number of total trades, and minimum revolving balance; and Equifax BPR. If these Loan Origination factors are not met, the application is declined 218. Alternatively, if certain criteria are in a specific threshold, the application is submitted for further review 220. Where the Equifax BPR is between 550 and 599 score 222, the application is submitted to sub-prime checks 224. Where credit history of more than two years, and 20 percent availability of existing credit exists, the application is approved 226. In addition, if the Loan Origination factors 216 are met, the application obtains an approval response from the present invention 226 and the applicant is presented with the loan information 228 including the set tier consisting of 4 different rates and maximum line of credit options. Various attributes submitted in the Credit Key application are taken into account in order to funnel each applicant through the various tiers, and the system's algorithm categorizes the applicants based on determined creditworthiness. This tiered rate and maximum line of credit data are then passed to a Software as a Service ("SAAS") banking engine for loan management 230. Alternatively, the decision tree may be substituted with an algorithm containing any number of acceptance levels. These different levels can be different scores for different people based on any number of criteria such as location, financial history, age of business, or other aspects that are taken into consideration for approval. For example, one person may apply and receive a Credit Key score of X which results in an acceptance. However, another person may apply and receive the same Credit Key score of X, but based on any other number of criteria, this person does not obtain an acceptance with a score of X and is not approved for use of the present invention. This allows for more flexibility for applicants and ensures that all criteria are taken into consideration for an individual's approval.

Figure 3A:
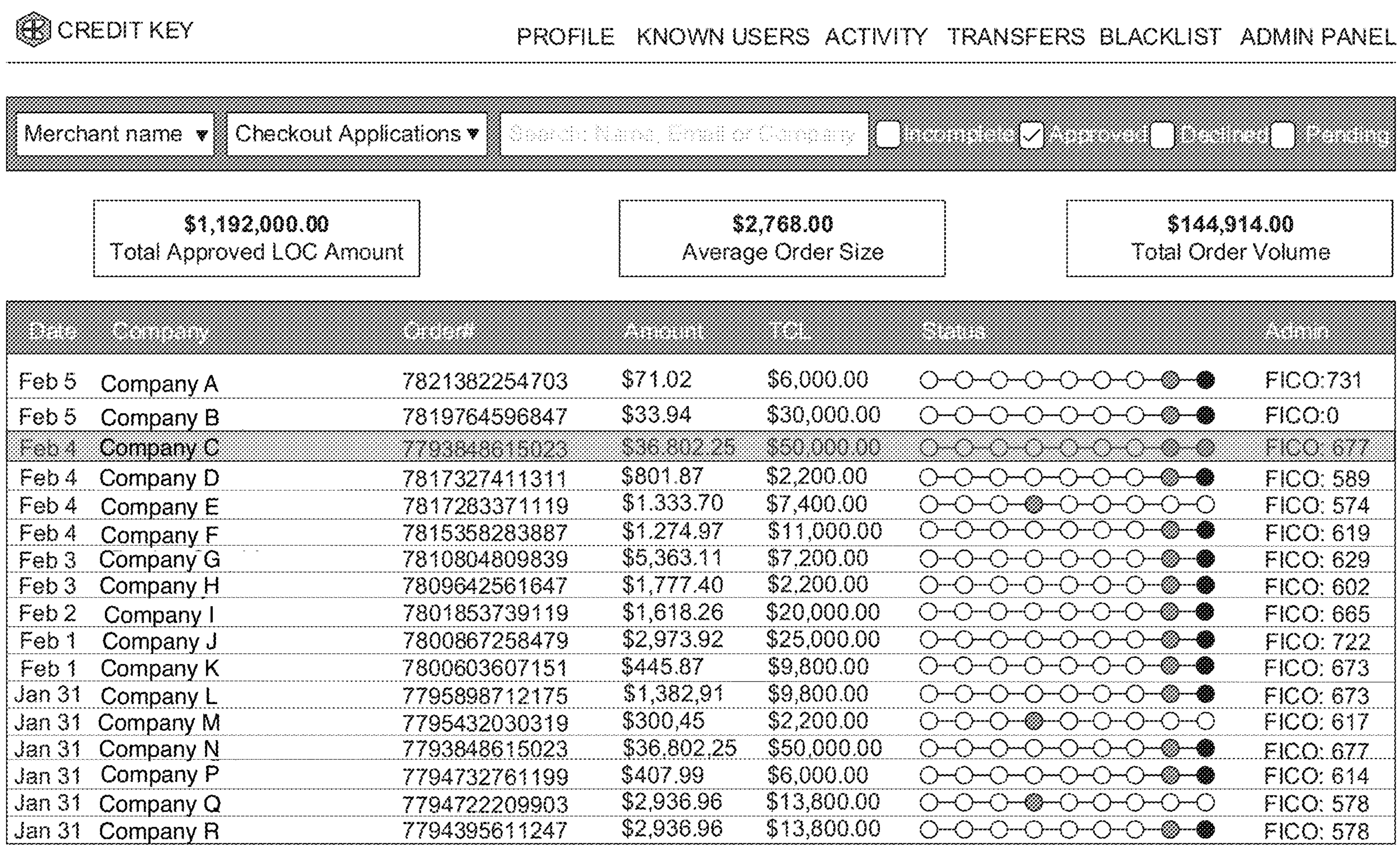
FIGS. 3A-B are diagrams of the admin portal of the present invention.
Figure 3B:
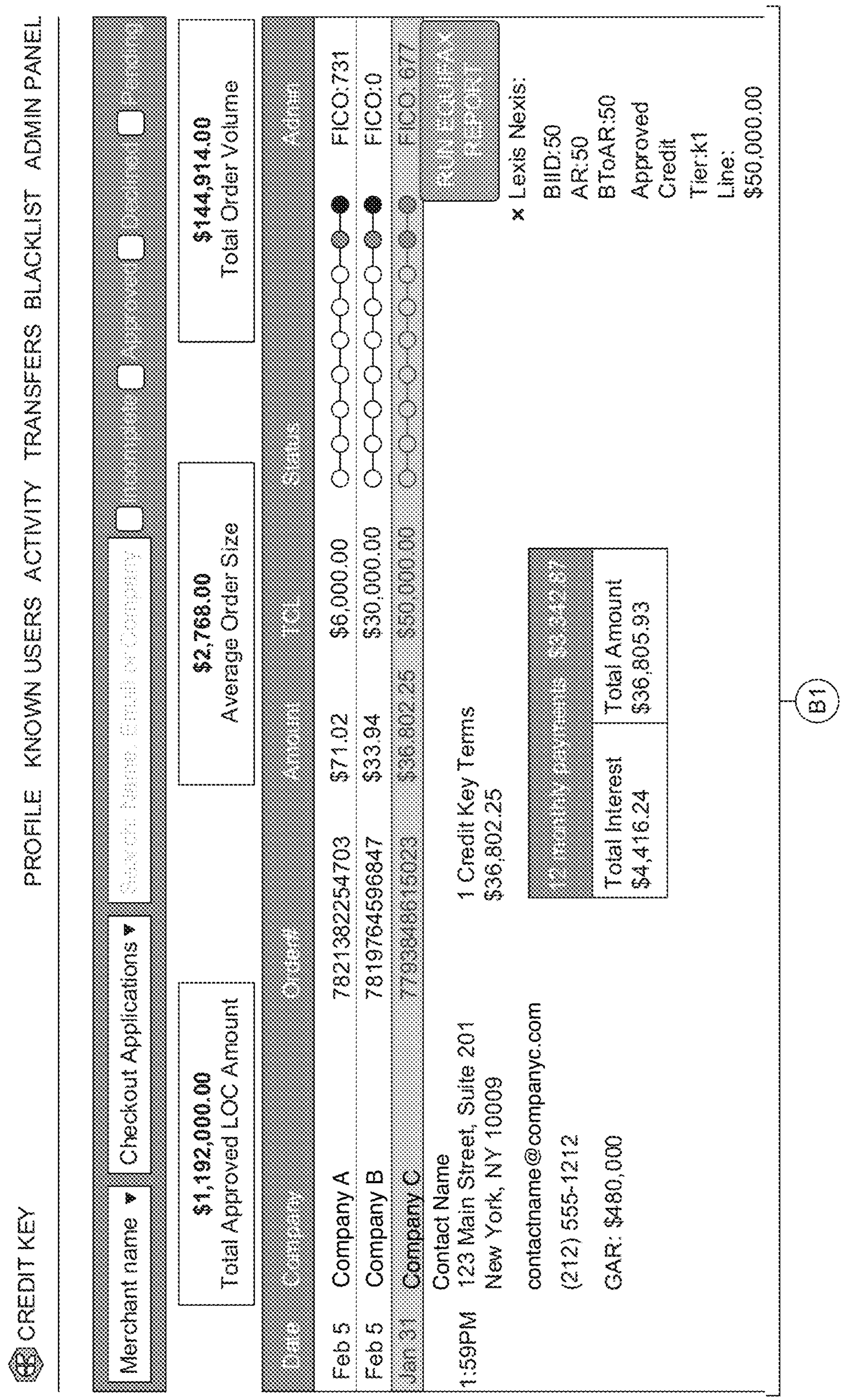
Figure 3B:
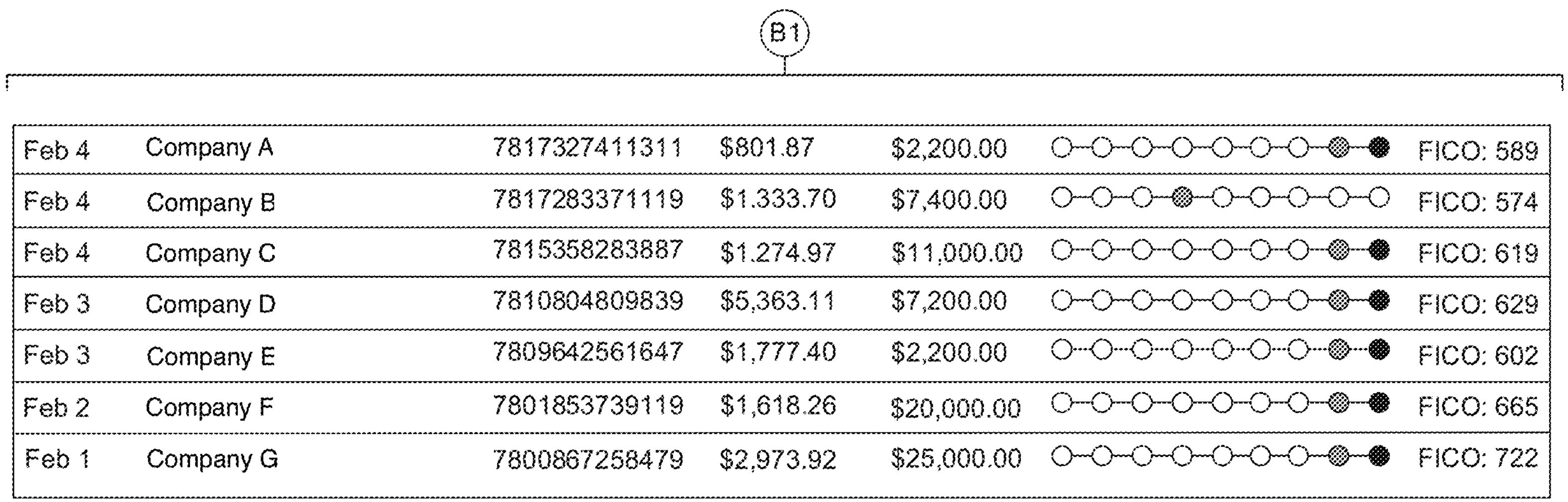

FIGS. 3A-B are diagrams of the admin portal of the present invention. In accordance with the preferred embodiment of the present invention, FIG. 3A is a rendering of the admin portal, displaying an overview of all applications and their current status of approval. FIG. 3B is a rendering of the expanded view of the admin portal, whereby the administrator can select a specific application that expands to show additional information pertaining to that specific application.

Figure 4:
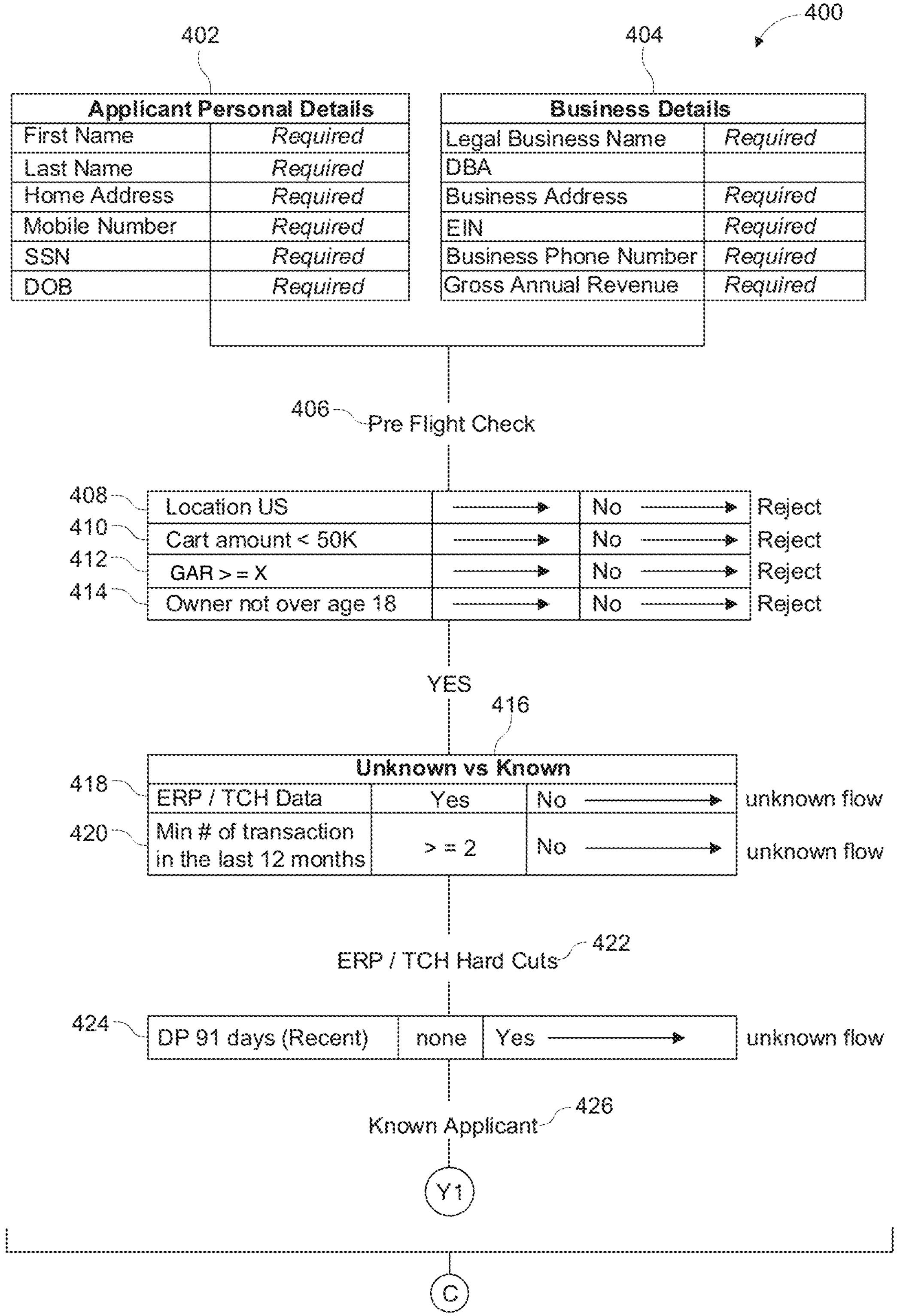
FIG. 4 Is a process flow diagram of the known borrower underwriting model of the present invention.
Figure 4:
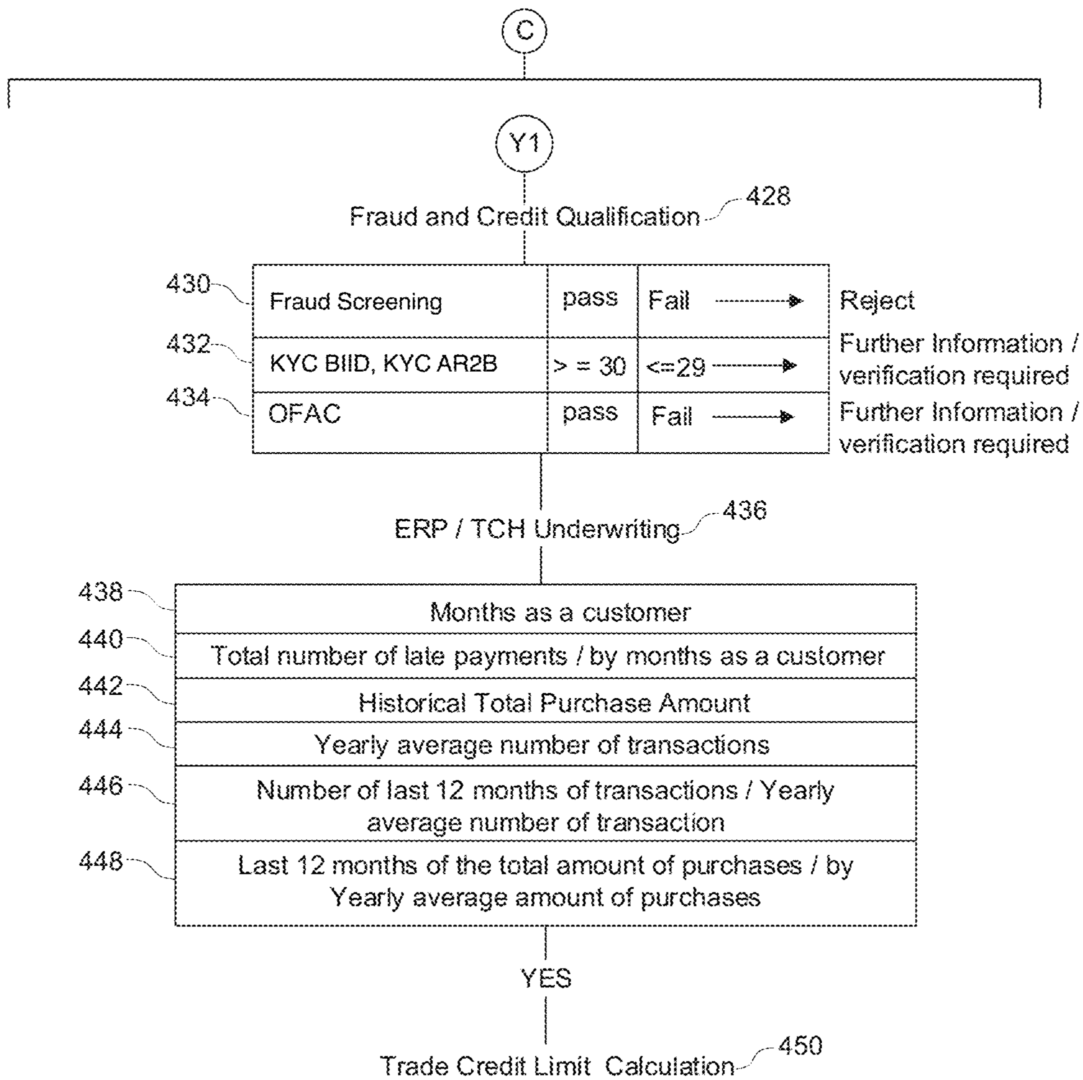

FIG. 4 is a process flow diagram of the known borrower underwriting model of the present invention. In accordance with the preferred embodiment of the present invention, the Known Borrower (ERP) underwriting model 400 requires the applicant to input personal details 402 such as: the applicant's first and last name; home address; phone number; SSN; and date of birth, as well as Business details 404, such as: the legal business name and Doing Business As ("DBA"); the business address; the Employer Identification Number ("EIN"); the business phone number; and GAR. Once this information has been entered by the applicant, the data is processed through the Pre-Flight Check 406. In order to proceed to the next step, the data must comply with the following parameters: the business location 408 must be located in the U.S.; the cart amount 410 must be below the threshold of $50,000.00; the GAR 412 must be within the threshold of more than $40,000.00; and the owner must be at least 18 years old 414. If the data passes these four requirements, the application proceeds to verify whether the applicant borrower is unknown or known 416.

In order to qualify as a known borrower, the applicant must meet the following requirements: the applicant must have ERP and/or The Clearing House ("TCH") data 418; the applicant must have made at least two transactions within the last 12 months 420; If the applicant satisfies these requirements, the application proceeds through to the ERP/TCH Hard Cuts verification 422, where the applicant must meet the requirement of not having had a DP credit report within the last 91 days 424. If the applicant meets this requirement, the applicant is qualified as a known applicant 426, and the application proceeds through to the fraud and credit qualification check 428.

The known applicant must meet the following fraud and credit qualification 428 requirements to proceed through to the next step: the applicant must pass the fraud screening check 430 to confirm the applicant has a valid Internet Protocol ("IP") address; the applicant must have a KYC Business Instant ID ("BIID") and KYC AR2B 432 score of over 30; and the applicant must pass the OFAC 434 qualifications set by the U.S. Treasury. If the applicant satisfies these requirements, the application proceeds to the ERP/TCH underwriting phase 436, where the following information is assessed: the amount of time in months that the applicant has been a customer 438; the number of late payments (as a percentage) compared to the months that the applicant has been a customer 440; the applicant's total transaction volume 442; the applicant's average number of transactions per year 444; the number of purchases made in the last 12 months (as a percentage of average transactions per year) 446; and the total transaction volume of the last 12 months (as a percentage of the yearly transaction volume) 448. Once this information is reviewed and meets the requirements, the application proceeds to the final phase of the underwriting process, which is the Trade Credit Limit calculation 450.

Figure 5A:
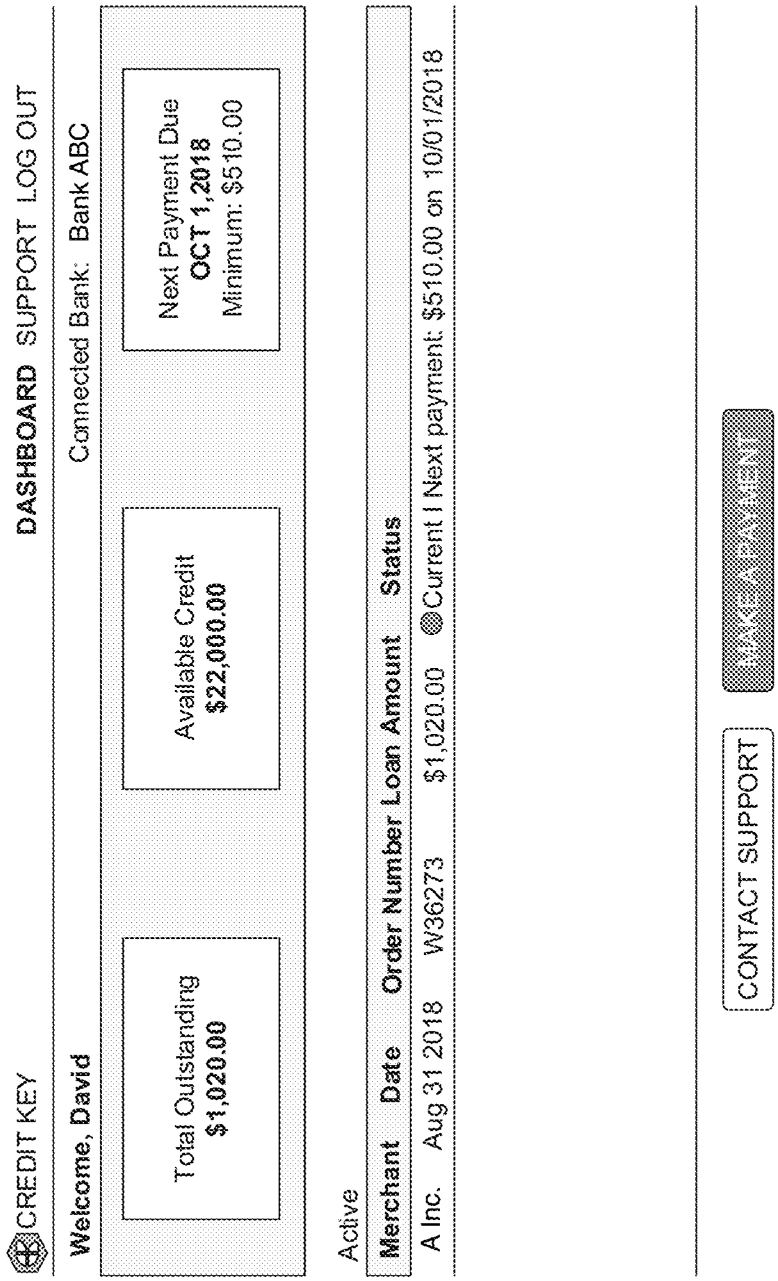
FIGS. 5A-C are diagrams of the borrower portal of the present invention.
Figure 5B:
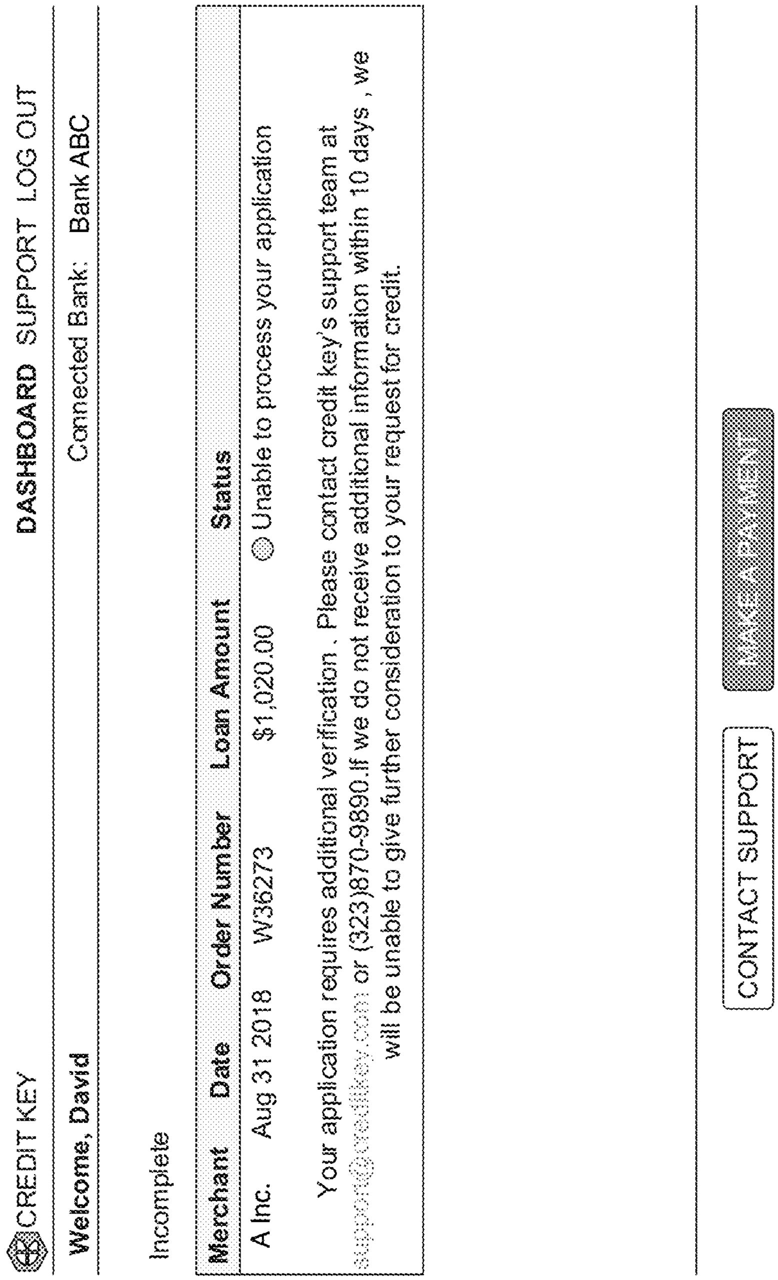
Figure 5C:
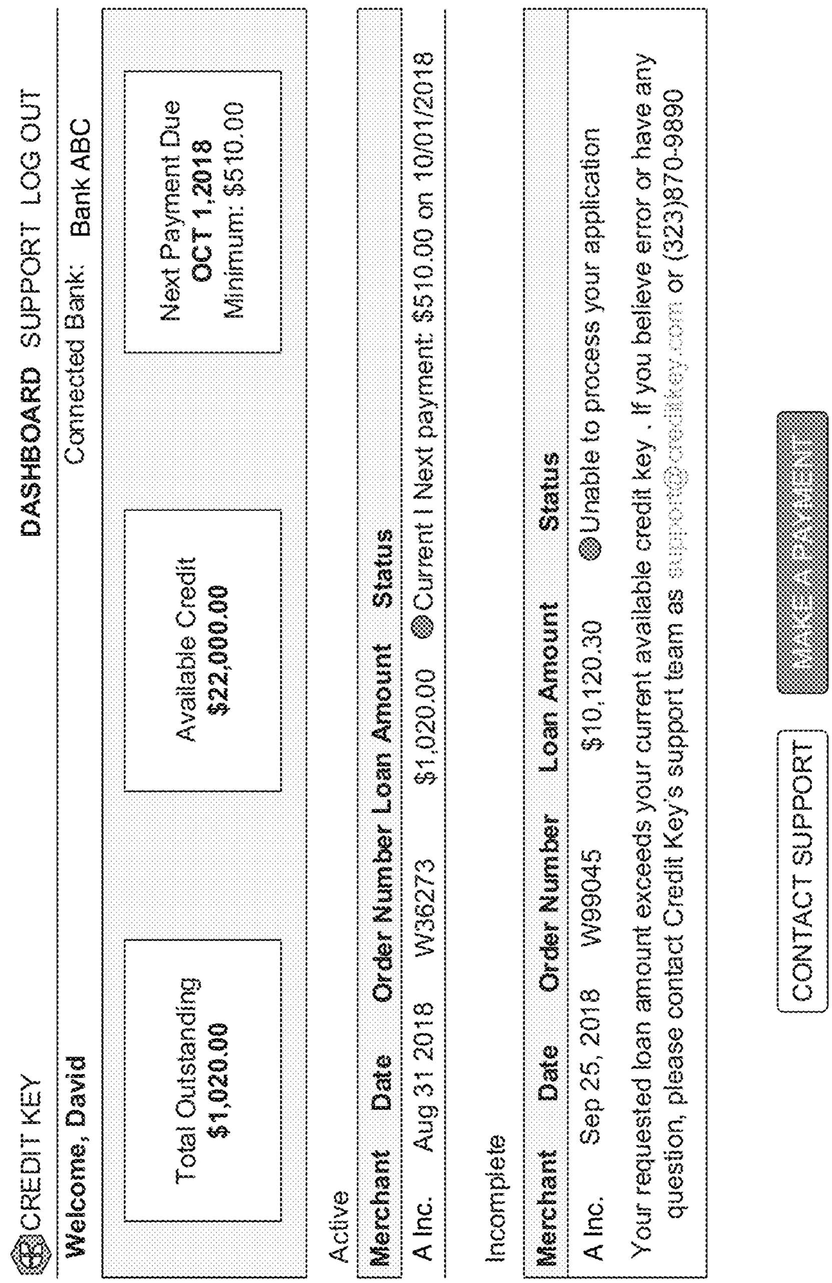

FIGS. 5A-C are diagrams of the borrower portal of the present invention. In accordance with the preferred embodiment of the present invention, FIG. 5A is a rendering of the borrower viewing screen that shows all currently active loans, including the total outstanding loan balance, the available credit, and the due date for the next payment. FIG. 5B is a rendering of the borrower portal that displays incomplete applications. FIG. 5C is a rendering of the borrower portal that displays both the currently active loans as well as incomplete applications.

Figure 6A:
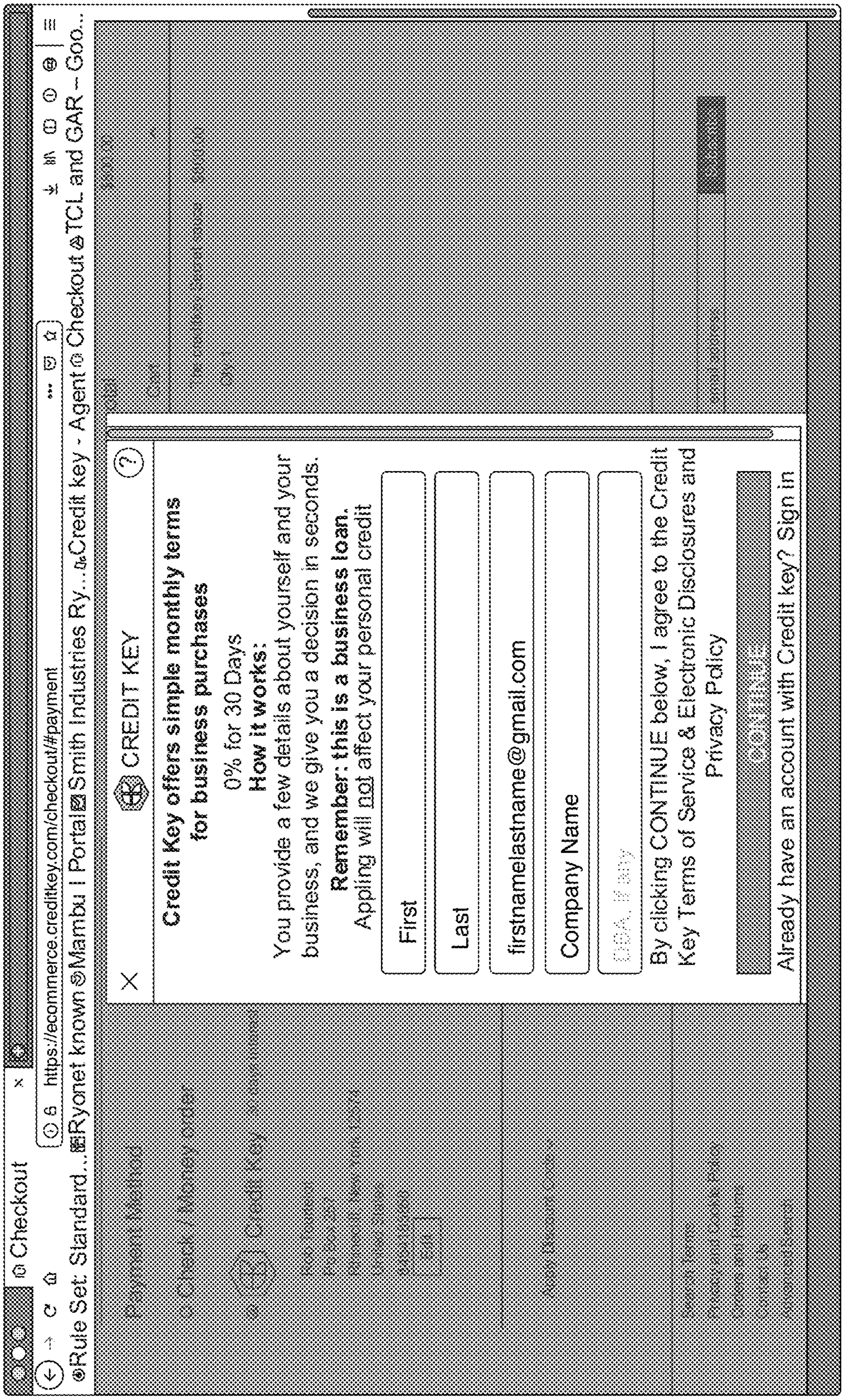
FIGS. 6A-K are diagrams showing the pre-approval flow of the present invention.
Figure 6B:
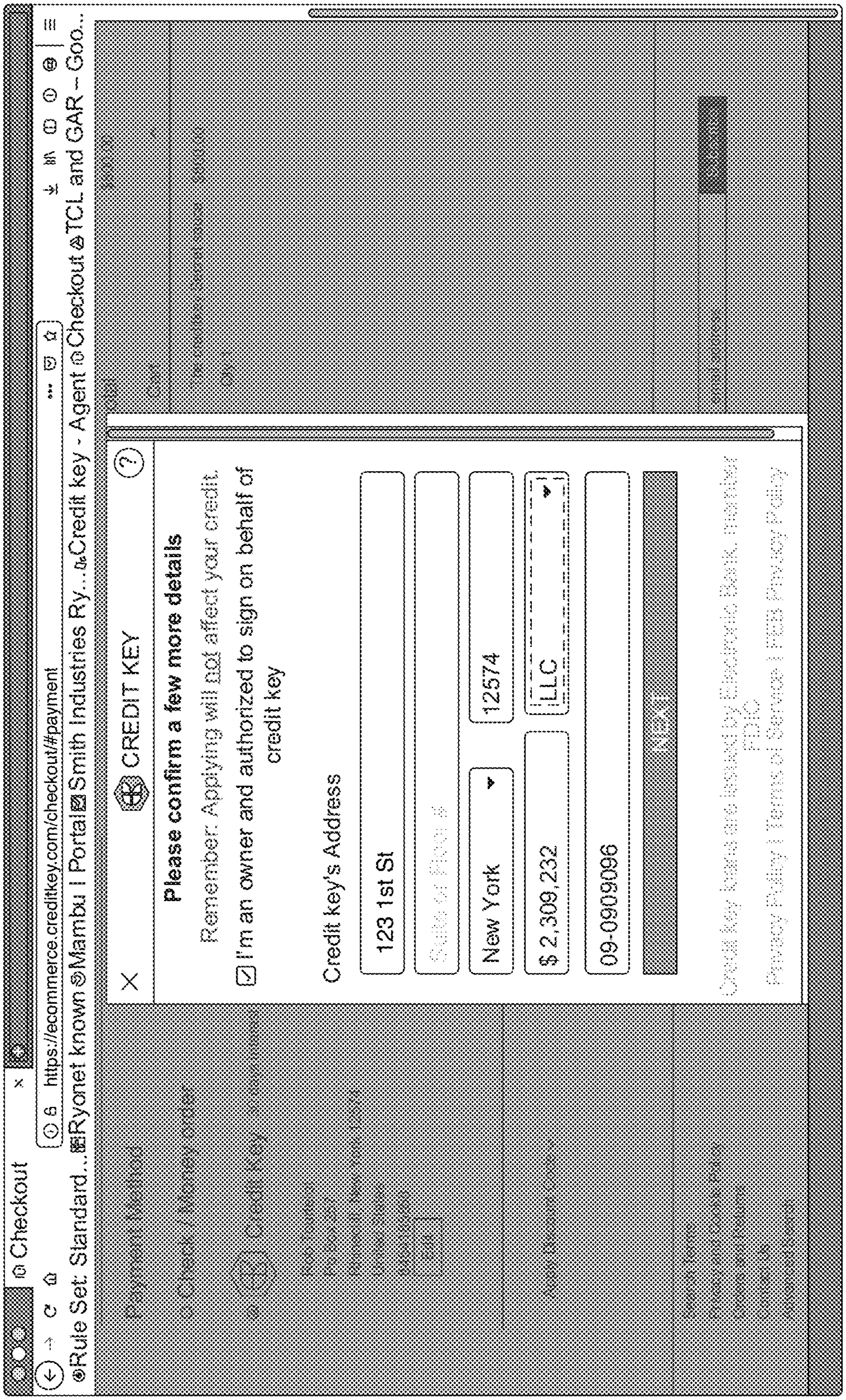
Figure 6C:
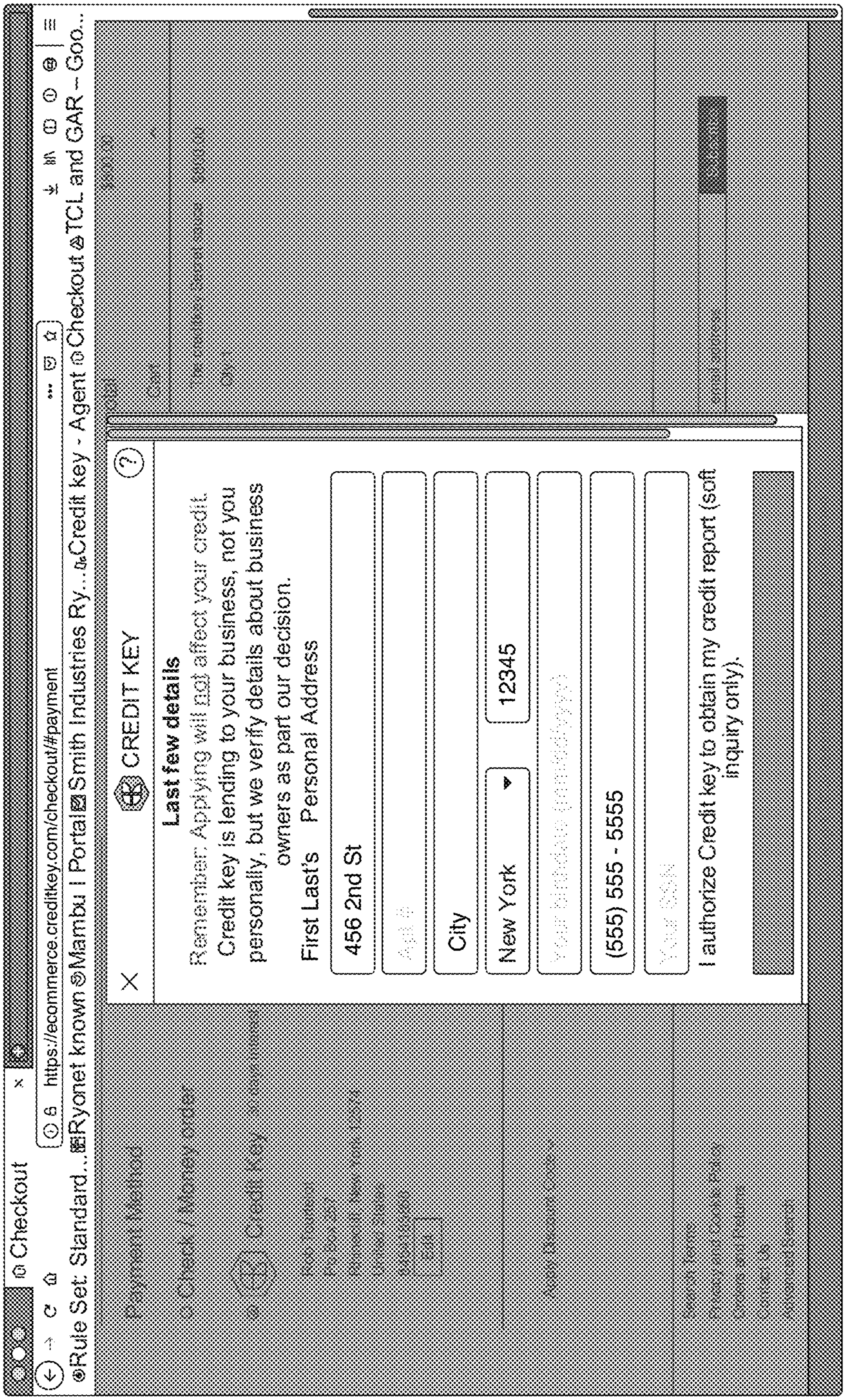
Figure 6D:
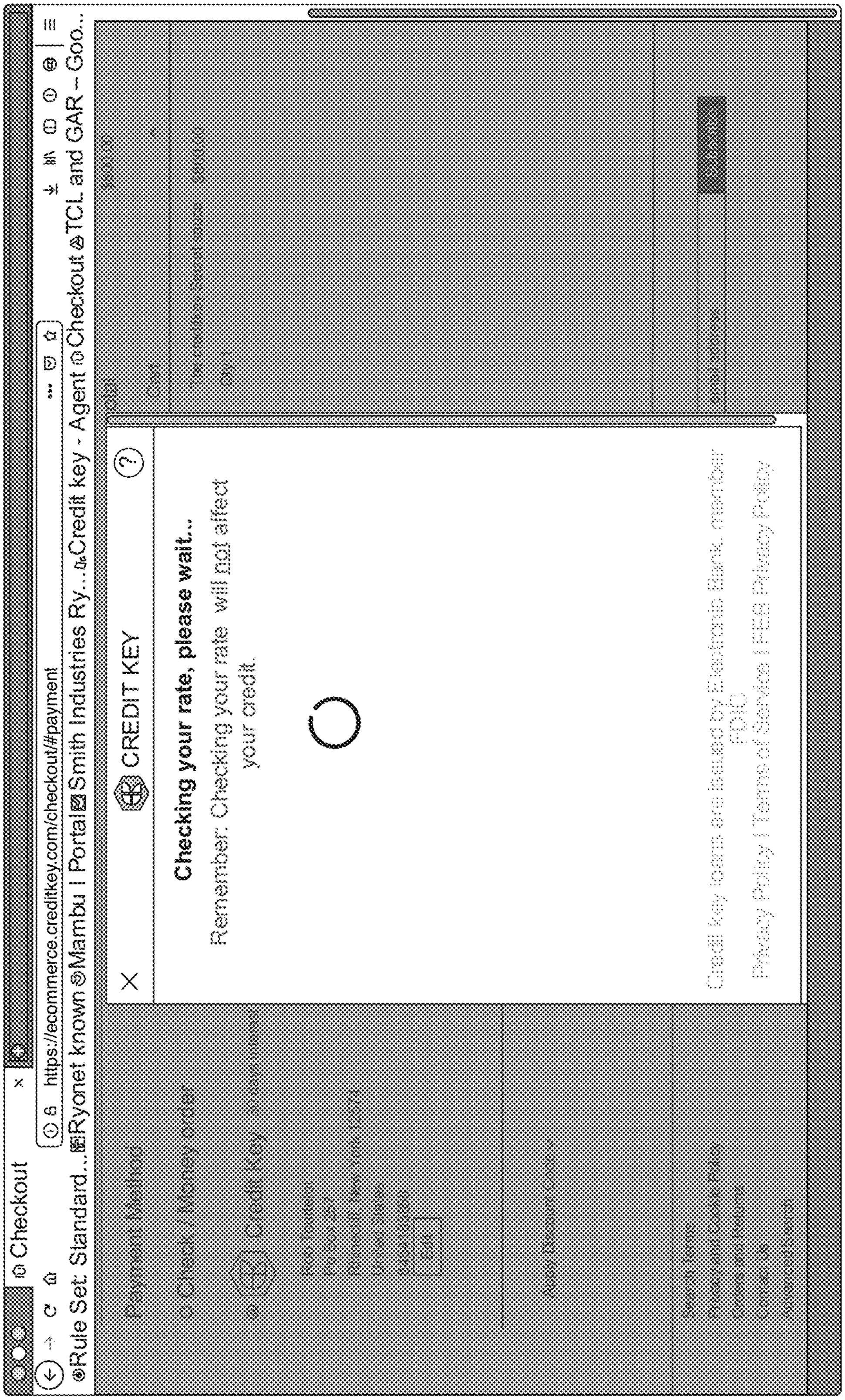
Figure 6E:
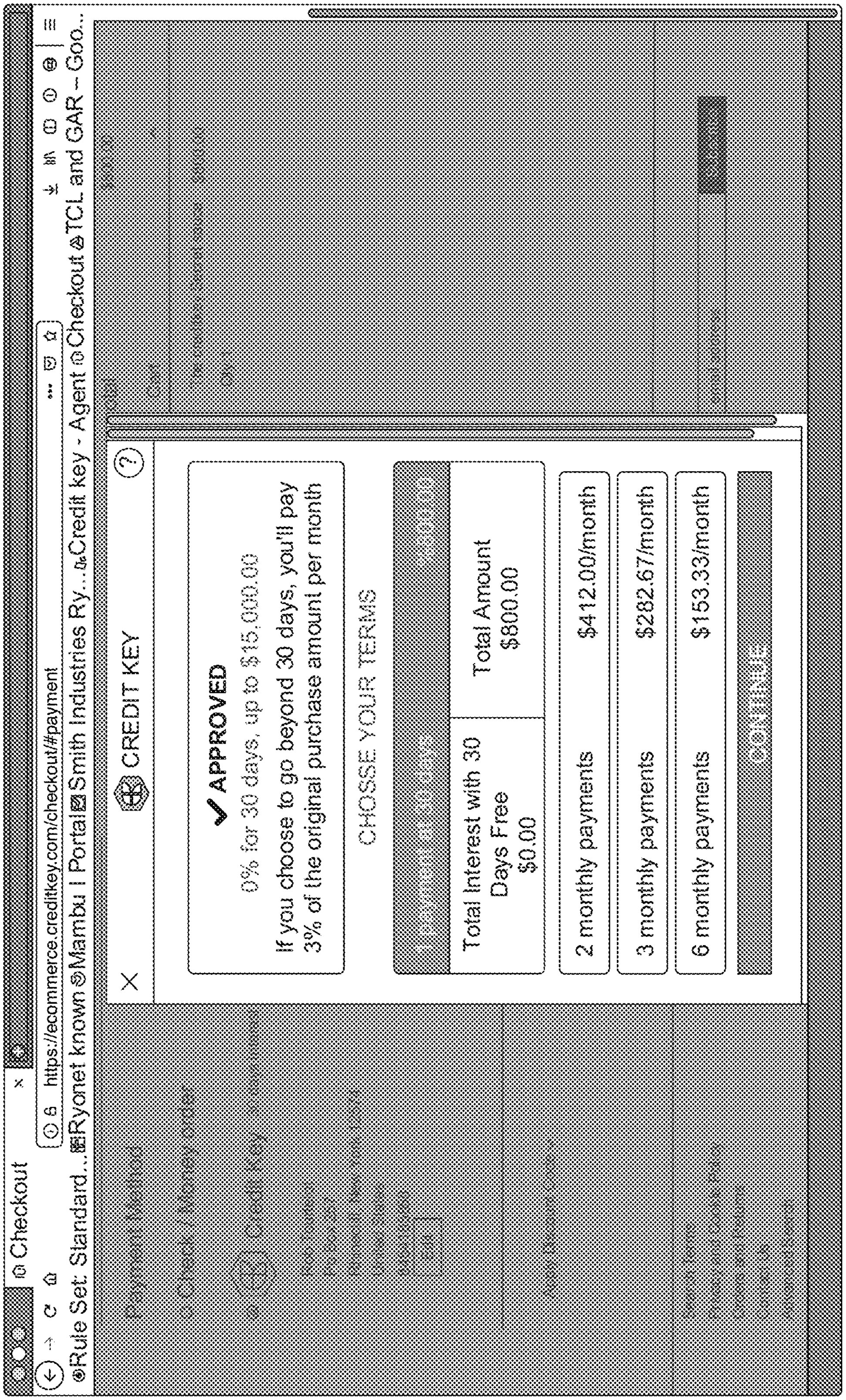

FIGS. 6A-K are diagrams showing the pre-approval flow of the present invention. In accordance with the preferred embodiment of the present invention, FIG. 6A is a rendering of the first step of the pre-approval flow process, where general information such as the borrower's full name, contact email, and business name, is entered. FIG. 6B is the next step of the pre-approval flow, where the borrower's business address details are entered. In FIG. 6C, the borrower's personal address is entered. Once the required information is entered in FIGS. 6A-D, the borrower's approval rate is calculated as shown in FIG. 6E.

Figure 6F:
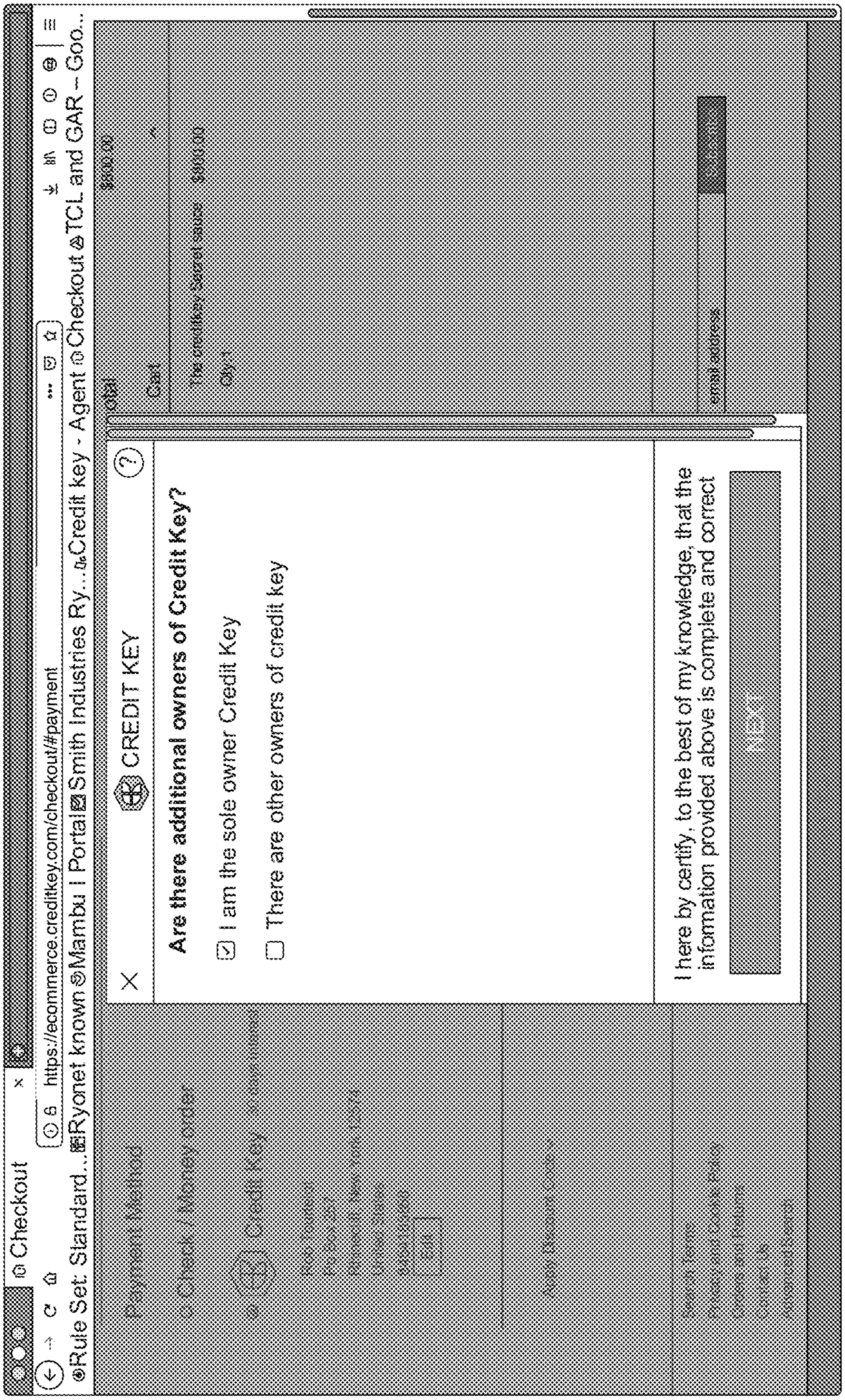
Figure 6G:
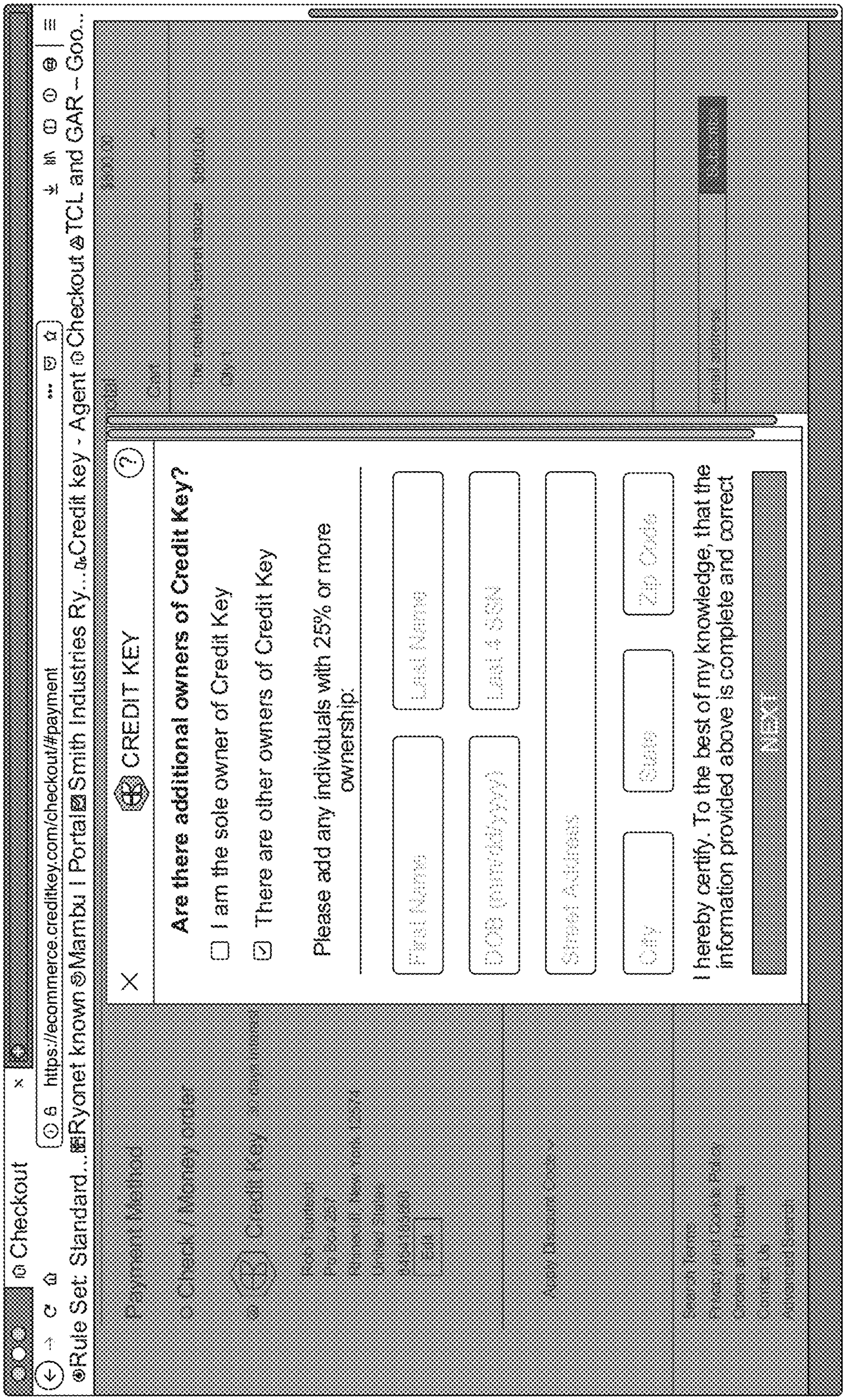
Figure 6H:
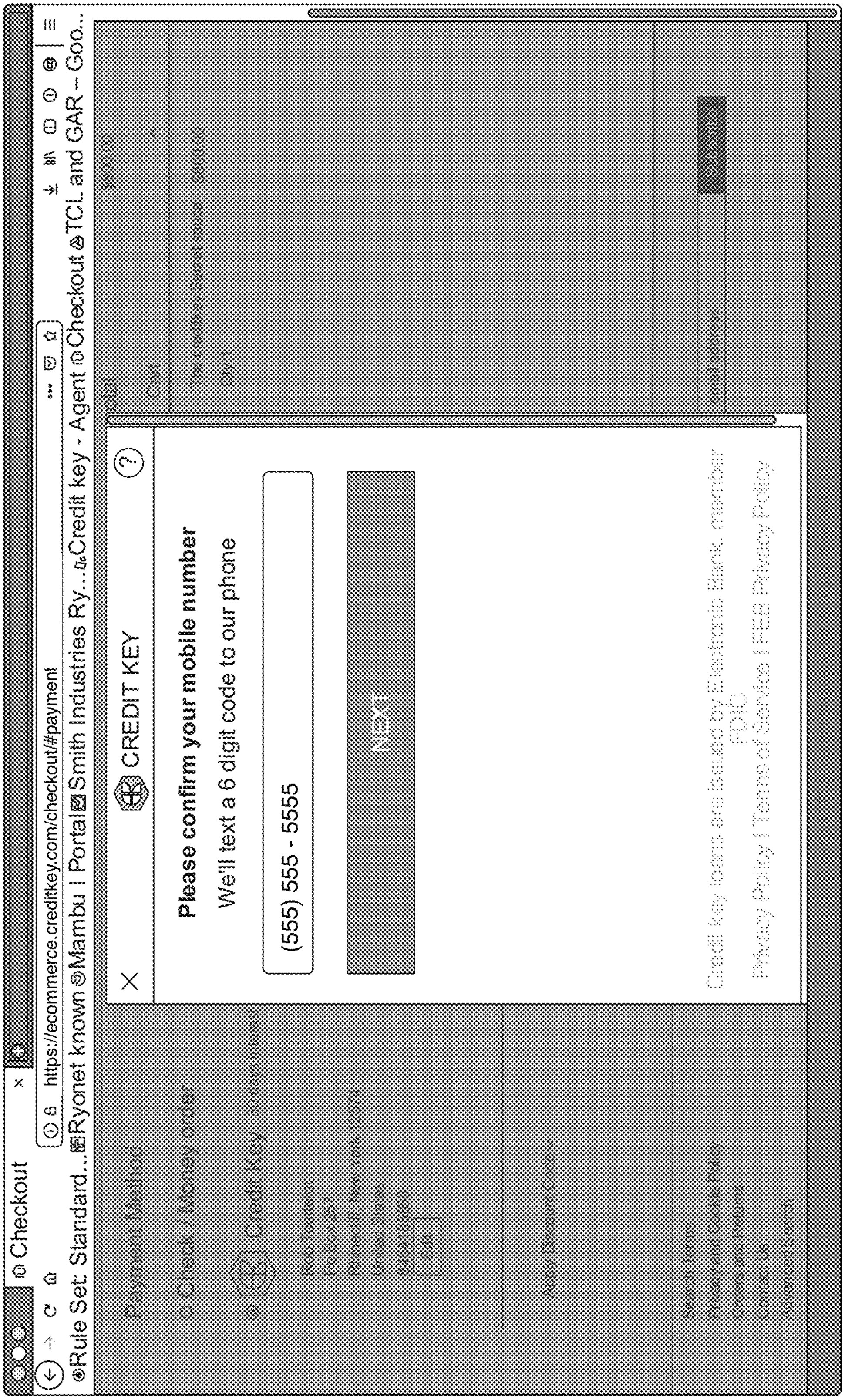
Figure 6I:
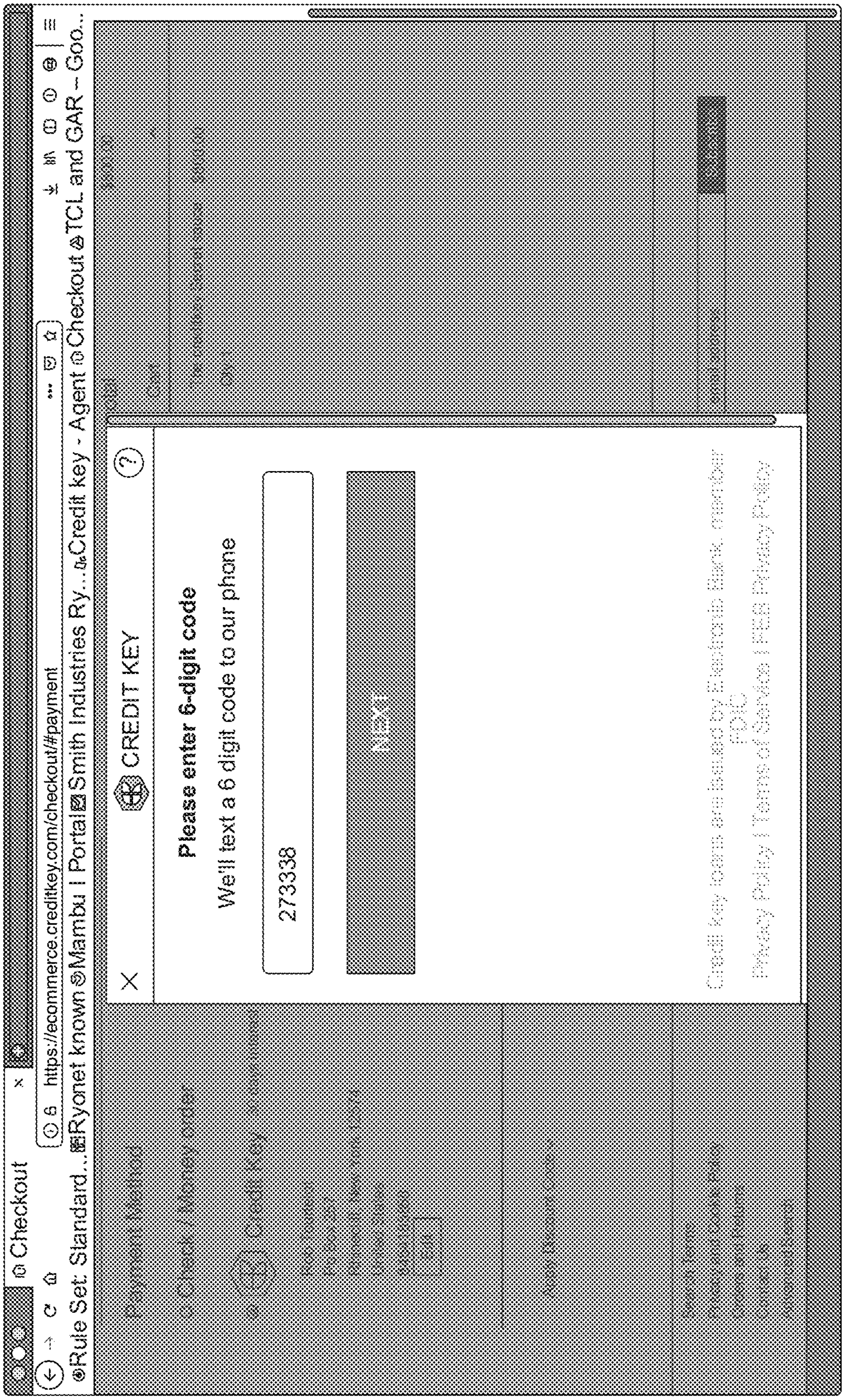
Figure 6J:
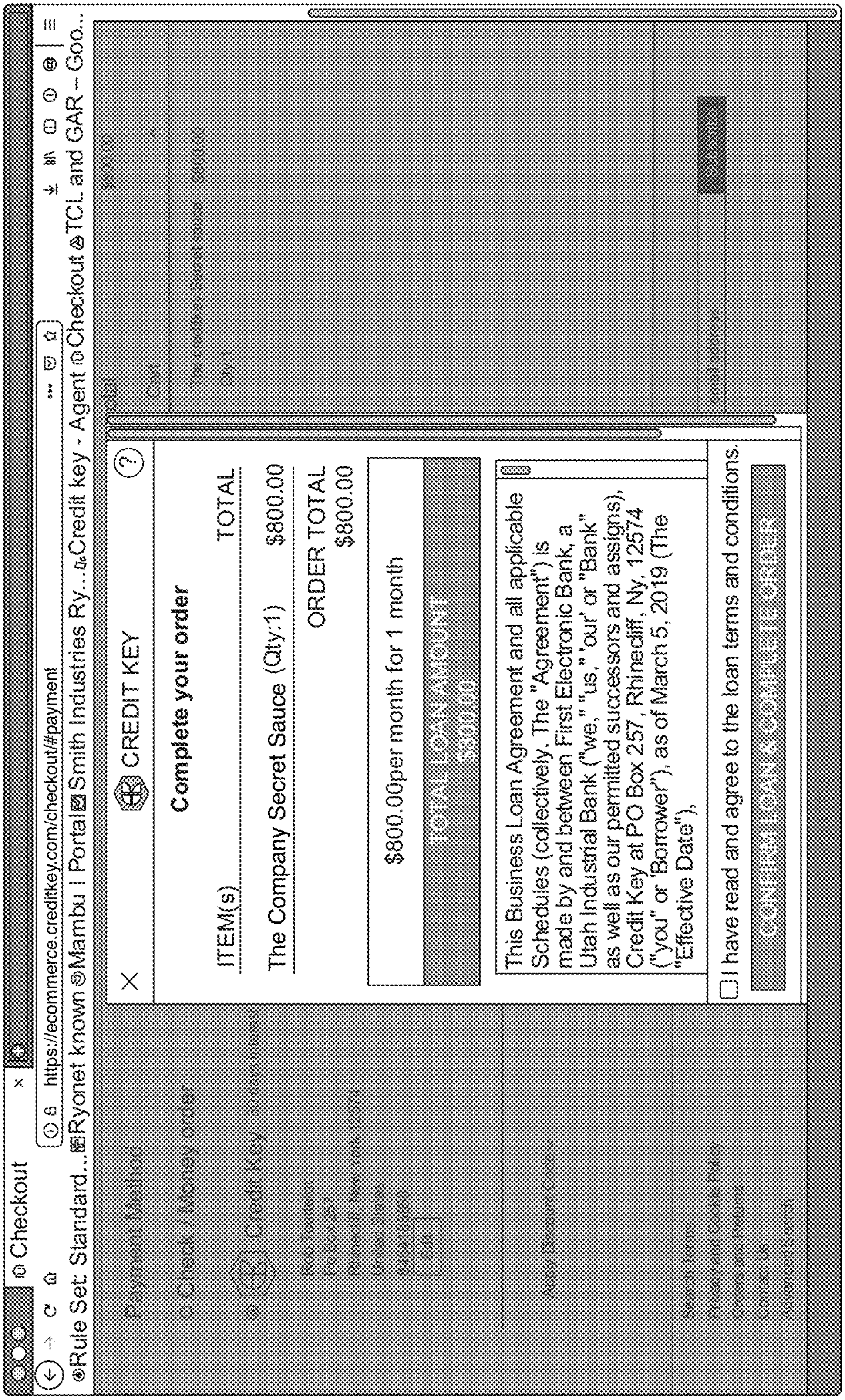
Figure 6K:
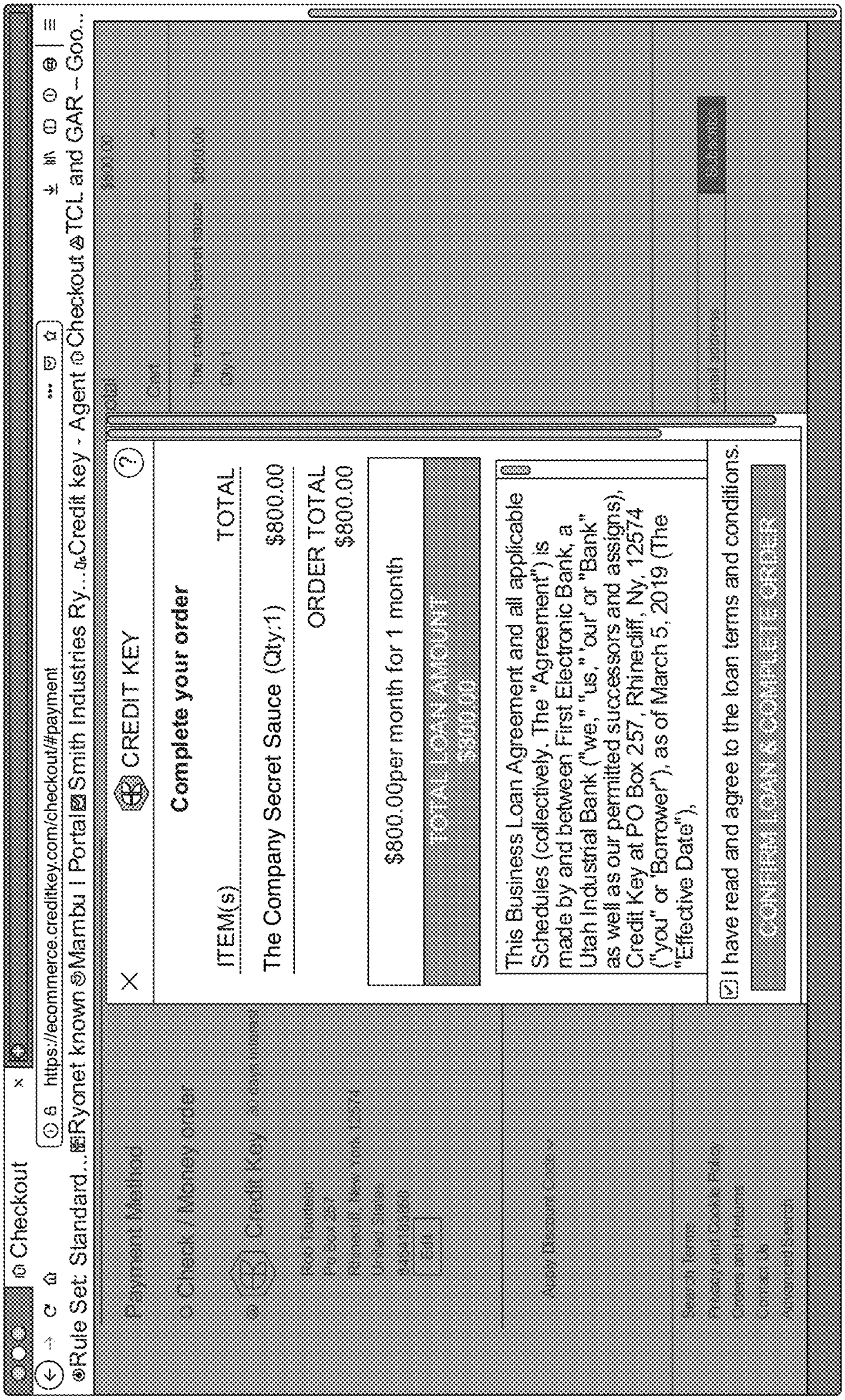

FIG. 6F is a rendering of the screen that shows the loan amount the borrower is approved for and allows the borrower to select the terms of payment based on monthly increments. A recommendation from the present invention will pop up on the screen for which of the repayment options the invention thinks is best. The customer does not have to choose this recommended option, but the present invention will still give it. This recommendation is based on the information that the present invention has recorded and learned from. FIG. 6G is the next step of the pre-approval application, asking if there are additional business owners of the borrower's company. FIG. 6H asks the borrower to provide the name, date of birth, SSN, and address of the additional owners. The next step, shown in FIG. 6I, asks for the borrower to confirm their mobile telephone number, in order to send out a 6-digit confirmation code. The 6-digit confirmation code sent to the borrower's mobile telephone number is entered in the screen shown in FIG. 6J. Once the borrower has been authenticated, the borrower is allowed to review their order as shown on the screen in FIG. 6K. Once the order and the terms and conditions are reviewed, the borrower acknowledges the order by indicating that they have read and agree to the terms and conditions, and the borrower can then click to confirm the loan and complete the order.

Figure 7:
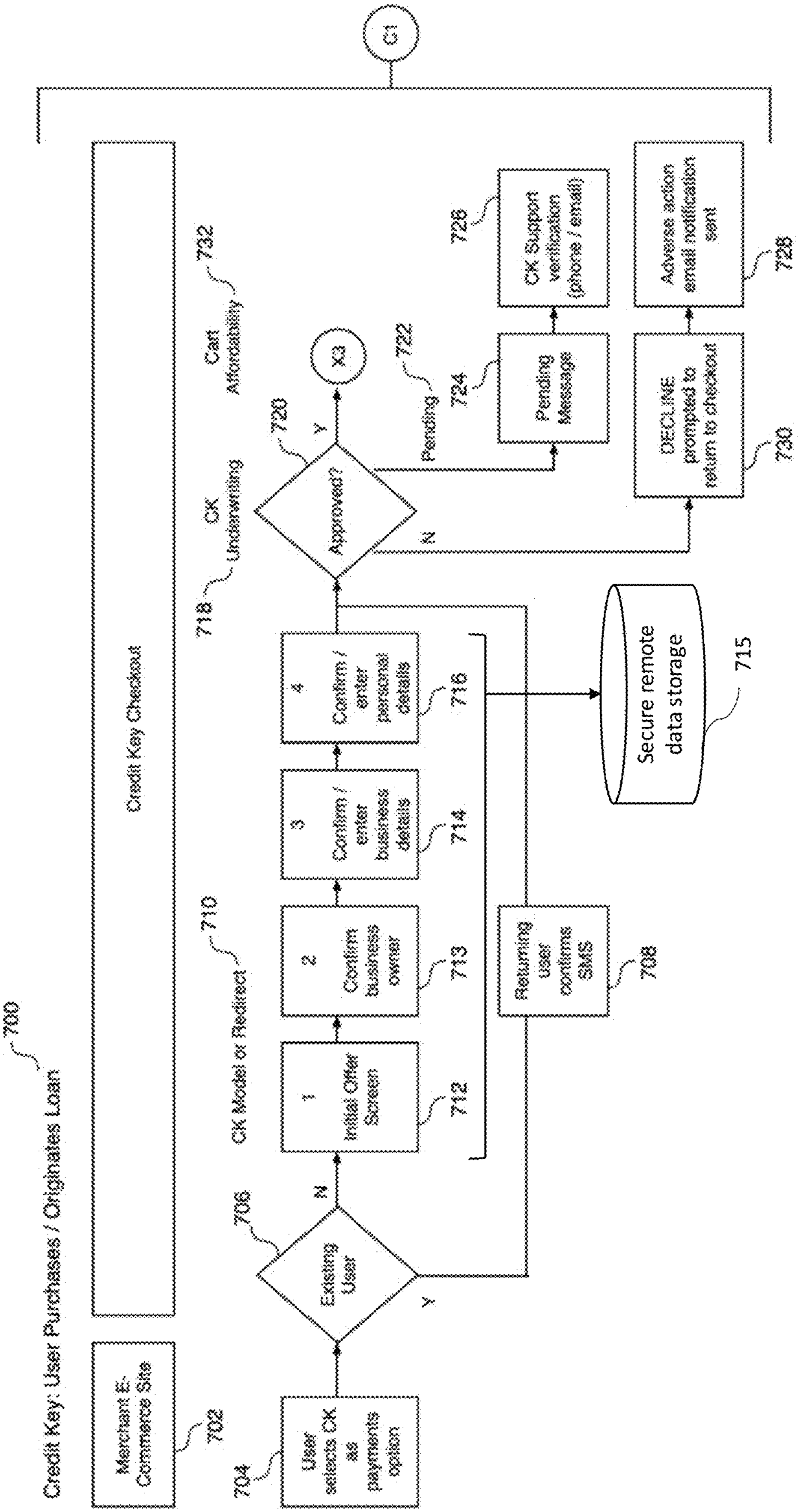
FIG. 7 is a flow diagram showing one aspect of the present invention.
Figure 7:
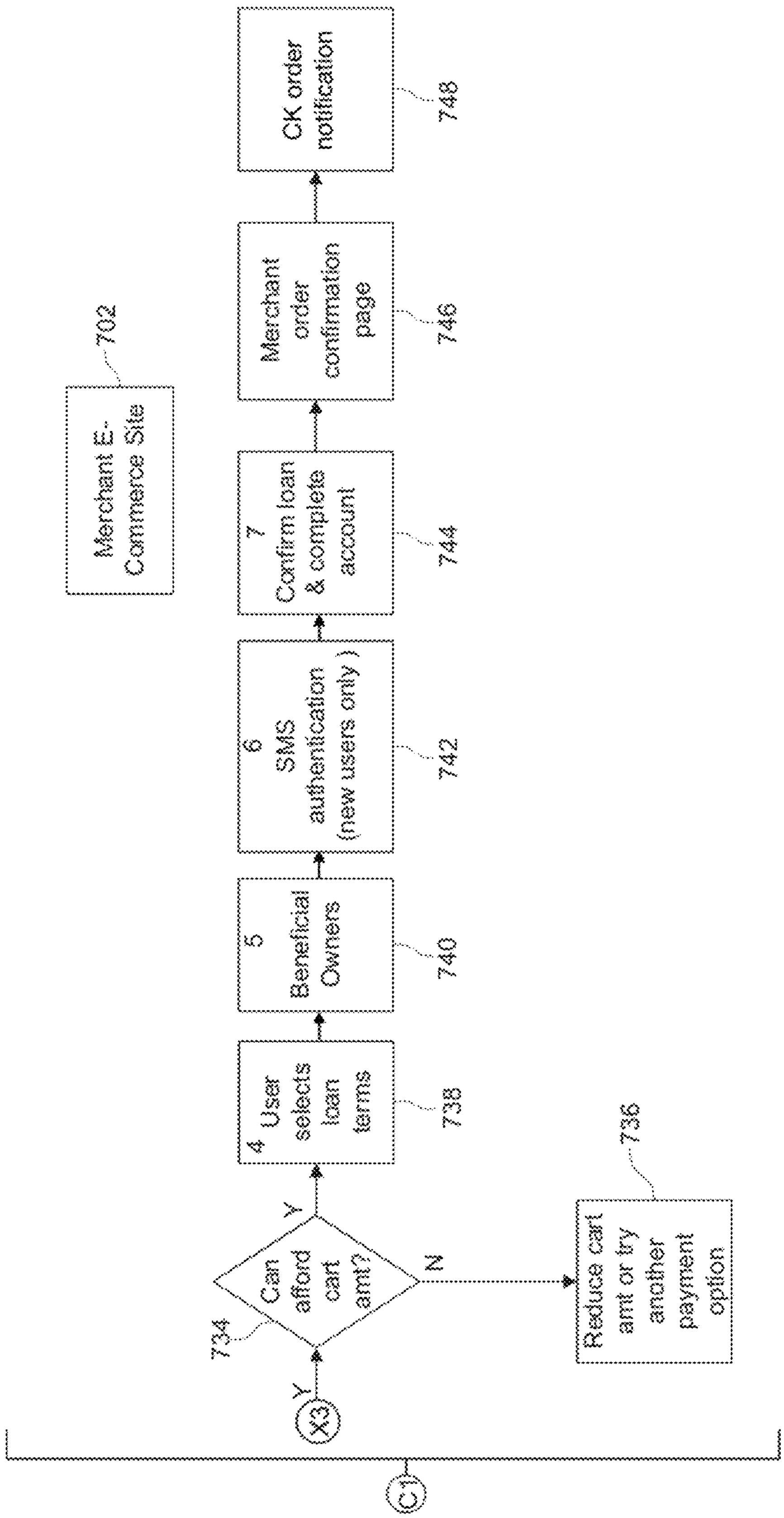

FIG. 7 is a flow diagram showing one embodiment by which a user can purchase or originate a loan and is depicted by the numeral 700. Under this embodiment, a User accesses the merchant E-Commerce site 702, and selects CK as a payment option 704. The checkout platform 750 verifies whether the user email is in the database 706. Where the user email address is in the database, the user is a returning user 708. If the user is not in the database, the page is redirected 710 to an initial offer screen 712. This screen allows the user to confirm the business owner 713, enter and confirm business details 714, and confirm personal details 716. The personal details 716 and business details 714 are then passed to the underwriting team 718. The underwriting team determines the approval possibility 720 of the application. Where the application is not approved, it is declined and returned to checkout 730. In addition, an adverse email notification is sent 728. Where the application is in queue to be reviewed, the status is labeled as pending 722 and a pending message 724 is provided to the user who will then receive an email or phone call from staff 726. The next determination is regarding affordability of the items in the cart 732. A determination regarding whether the user can afford the cart amount 734 is made. If the amount is not affordable, the cart amount is reduced, or the user is invited to try a different payment method 736. Where the user can afford the loan amount, the user selects the loan terms 738. Beneficial ownership terms are provided 740. For new users a text message authentication page is shown 742. The loan is confirmed, and the account is completed 744. Subsequently, the merchant order confirmation page is shown 746 and the order notification 748.

Figure 8:
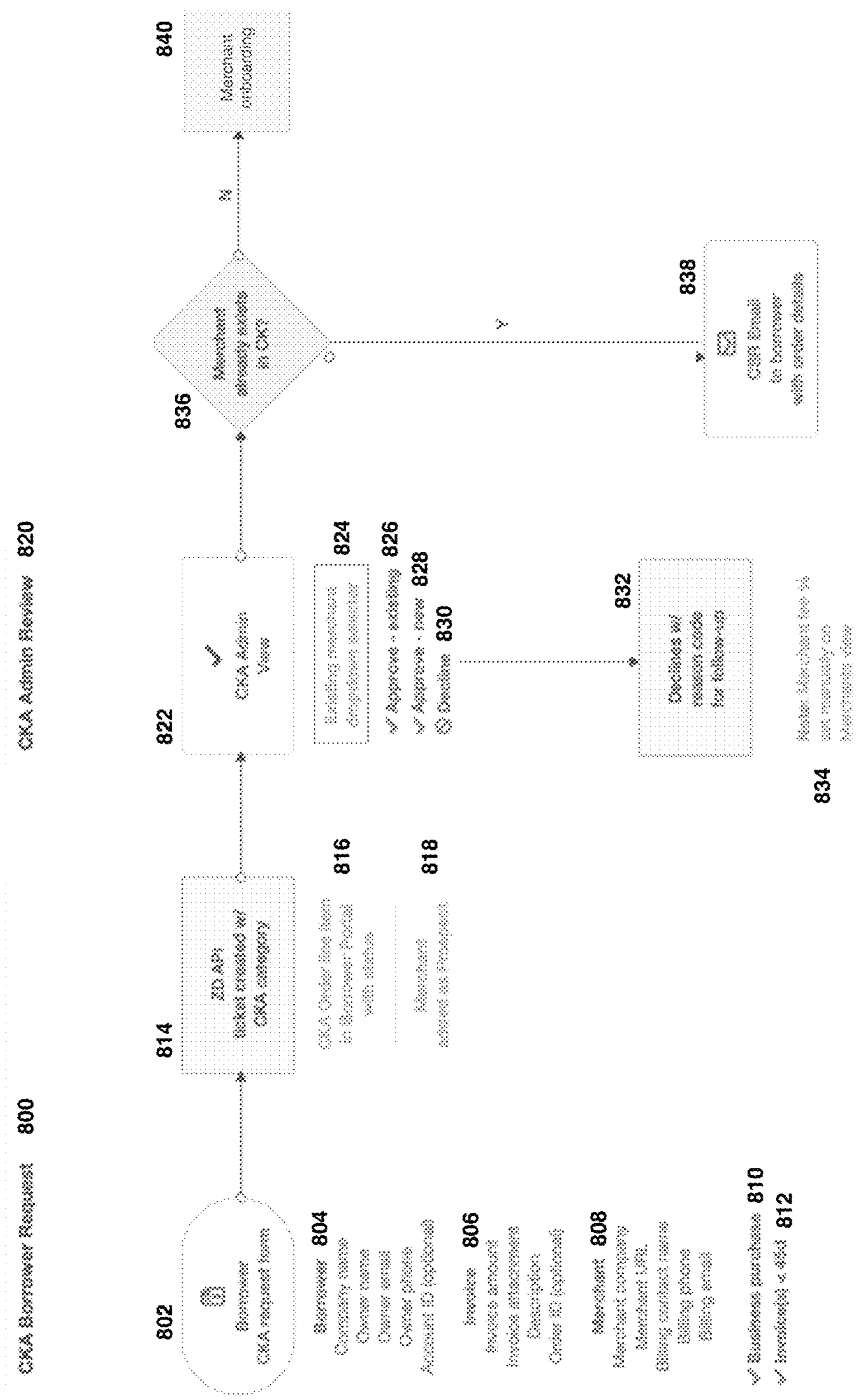
FIG. 8 is a diagram of the borrower request and admin review process flow of the present invention.

FIG. 8 is a diagram of the borrower request and admin review process flow of the present invention. Under this embodiment, the borrower initiates a borrower request 800 by completing the borrower request form 802. The borrower request form 802 requires information about the borrower 804, the invoice 806, and the merchant 808. Borrower information 804 includes: the company name; the owner's name; email address; contact phone number; and the account ID. Invoice information 806 includes the: invoice amount; copy of the invoice as an attachment; the invoice description; and the order ID. The merchant information 808 includes: the merchant company name; the merchant URL; the billing contact name; contact phone number; and email address. In order to submit the borrower request form 802, the request must be for a business purchase 810 and the purchase invoice must have been issued within the last 45 days 812. Once the request form 802 has been submitted, a ZD API ticket is created, and the request is assigned to a category 814. This includes the creation of the order line item in the Borrower Portal with a request status 816, and the merchant is added as a prospect 818. The request is then submitted for admin view 822, within the admin review portal 820. The administrator can select the existing merchant from a dropdown selector 824, whereby the merchant fee percentage is set manually through the merchant's view portal 834. The administrator can approve the request as an existing merchant 826, as approve as a new merchant 828, or decline the request 830. If the request is declined 830, a follow up reason code is provided 832. Once the request has been reviewed and approved by the administrator 822, if the merchant already exists in the system database 836, an email is sent to the borrower that includes the details of the order 838. If the Merchant does not exist in the system database 836, the merchant is added to the system through the merchant onboarding process 840.

Figure 9:
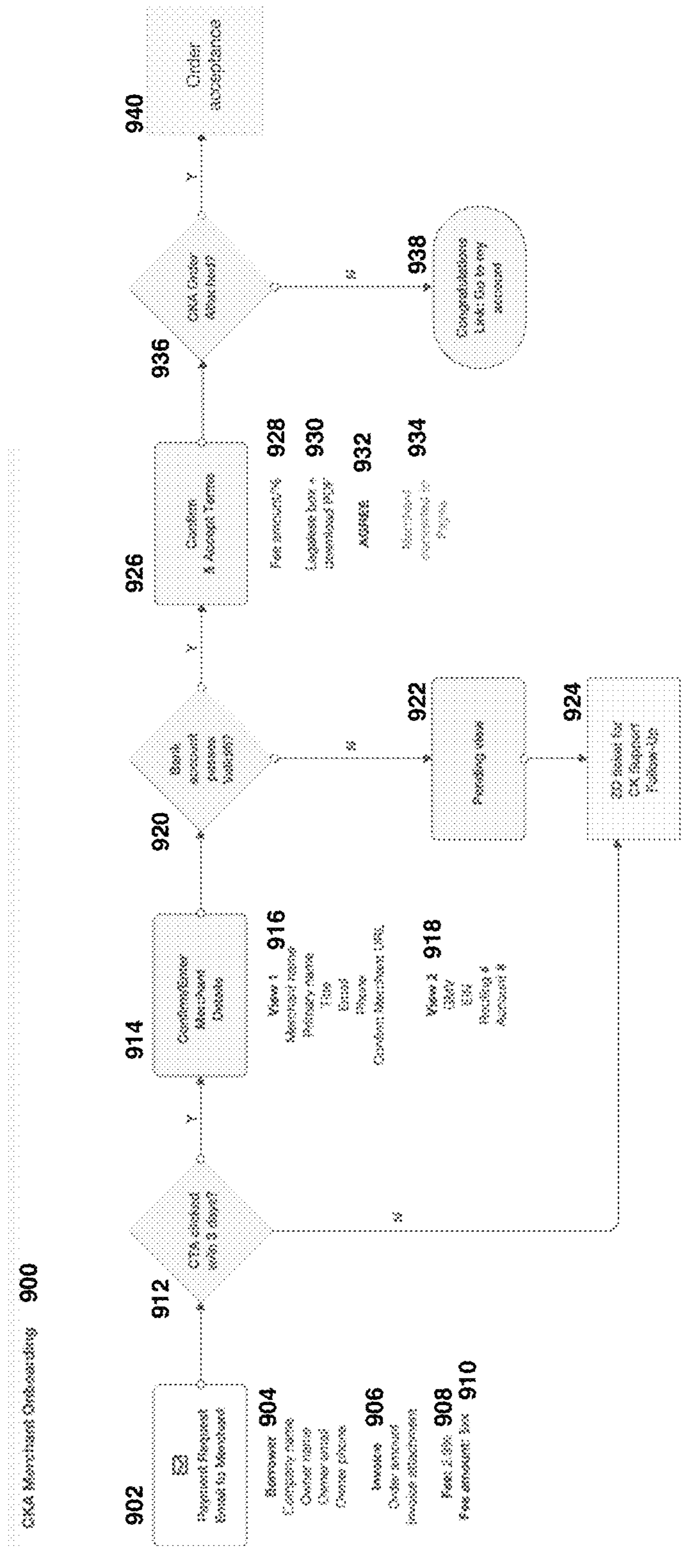
FIG. 9 is a diagram of the new merchant onboarding process flow of the present invention.

FIG. 9 is a diagram of the new merchant onboarding process flow of the present invention. Under this embodiment, a new merchant can be added to the system of the present invention through the merchant onboarding process 900. Once a borrower request has been successfully approved with a new merchant, a payment request email is sent to the merchant 902. This email 902 includes borrower information 904, such as the company name and the owner's name, email, and phone number, as well as the invoice information 906 such as the order amount and a copy of the invoice as an attachment. The merchant payment request email 902 also includes a fee based on a percentage 908 as well as the fee amount 910. The payment request email 902 includes a read receipt notification that alerts if the email has been opened by the recipient 912. If the email has not been opened within 3 days 912, a support ticket is opened within the system of the present invention 924. If the email has been opened within 3 days 912, the request is confirmed, and the merchant details are entered into the system 914. View 1 details 916 include the merchant's name; the primary contact's name; the contact's title, email, and phone number; and the merchant URL. View 2 details 918 include the gross merchandise value (GMV); the merchant's EIN; and the bank routing and account numbers. The merchant's banking details are then verified through a payment processing program such as ValidiFi 920. If the bank details cannot be verified, the merchant profile is pending 922 and a support ticket is opened in the system for further review 924. If the banking details are successfully verified 920, the merchant must then confirm and accept the terms and conditions 926, including the fee amount percentage 928, and the legal information 930, whereby the merchant can agree 932 and be converted to a payee 934. Once the terms have been confirmed and accepted 926, the order is attached 936 for order acceptance 940. If there is no attached order associated with the merchant's account 936, the merchant is provided with a notification and a link to access the merchant account 938.

Figure 10:
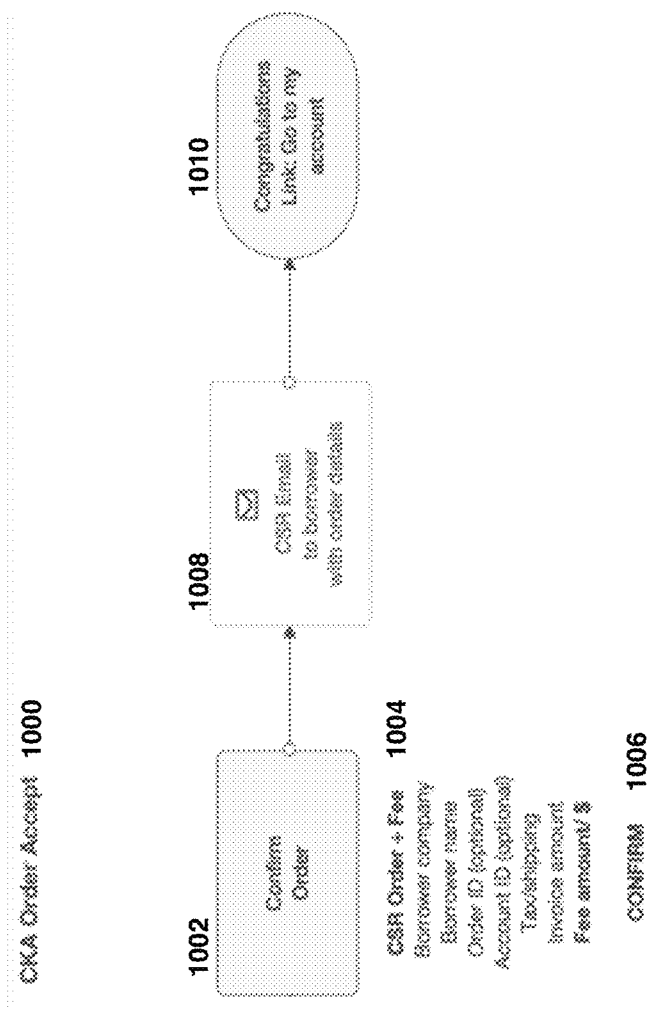
FIG. 10 is a diagram of the order acceptance process flow of the present invention.

FIG. 10 is a diagram of the order acceptance process flow of the present invention. Under this embodiment, the approved order request has been confirmed and the merchant has been onboarded into the system of the present invention. During the order acceptance 1000, the order is confirmed 1002. This process includes confirming the Corporate Social Responsibility ("CSR") order and fee 1004, including: the borrower company and name; the order ID; the account ID; the tax and shipping amounts of the order; the invoice amount; and the fee amount. Once these details have been confirmed 1006, a CSR email is sent to the borrower with the order details 1008, and the borrower is provided with a link to access their account in the system 1010.

Figure 11:
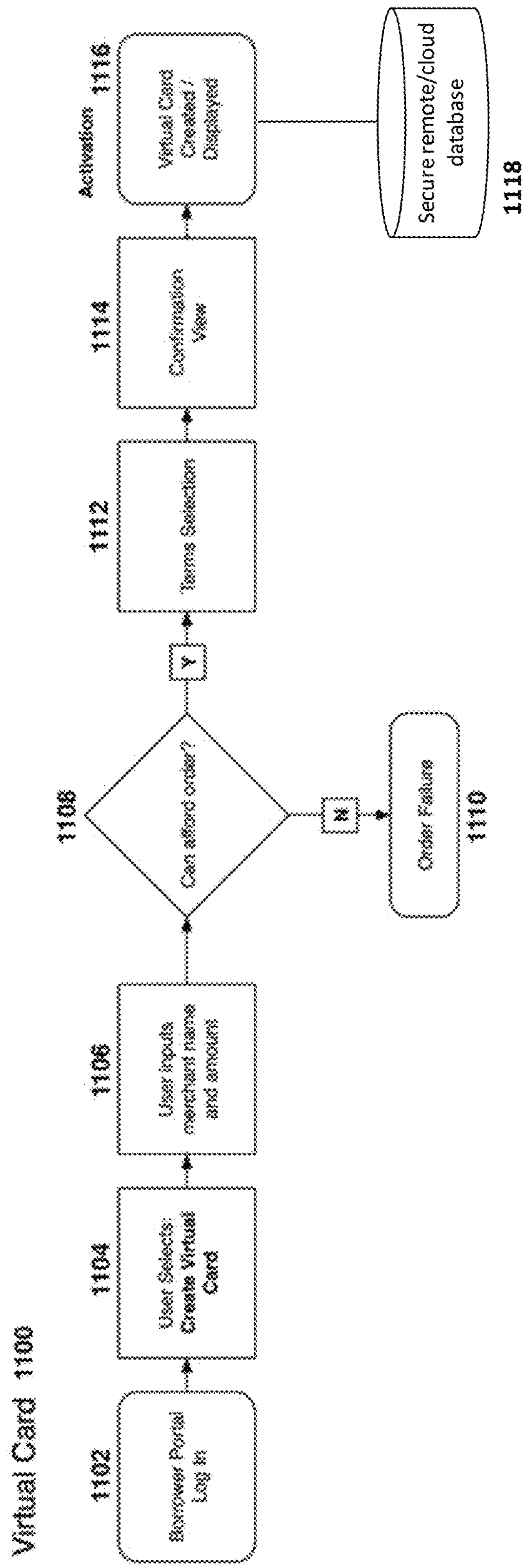
FIG. 11 is a diagram of the virtual card process flow of the present invention.

FIG. 11 is a diagram of the virtual card process flow of the present invention. In accordance with the preferred embodiment of the present invention, the virtual card 1100 process requires the customer to log in to the borrower portal 1102. Once logged in, the customer can select the option to create a virtual card 1104. The customer must then enter the merchant's name and amount 1106, and the application approval is determined on whether the customer can afford the order based on the amount entered 1108. If the system determines that the customer cannot afford the order, the application is denied, and the order is not processed 1110. If the system determines that the customer can afford the order, then the customer is directed to the terms selection view 1112. Once the customer has selected the term 1112 for the virtual card, the customer must then confirm the order through the confirmation view 1114. Once the customer has confirmed the order in the confirmation view 1114, the virtual card is created in the activation step 1116 and the card information is displayed for the customer. This information is stored for reference in a secure remote virtual private cloud space 1118 accessible via CKWS provided by the present invention.

Figure 12A:
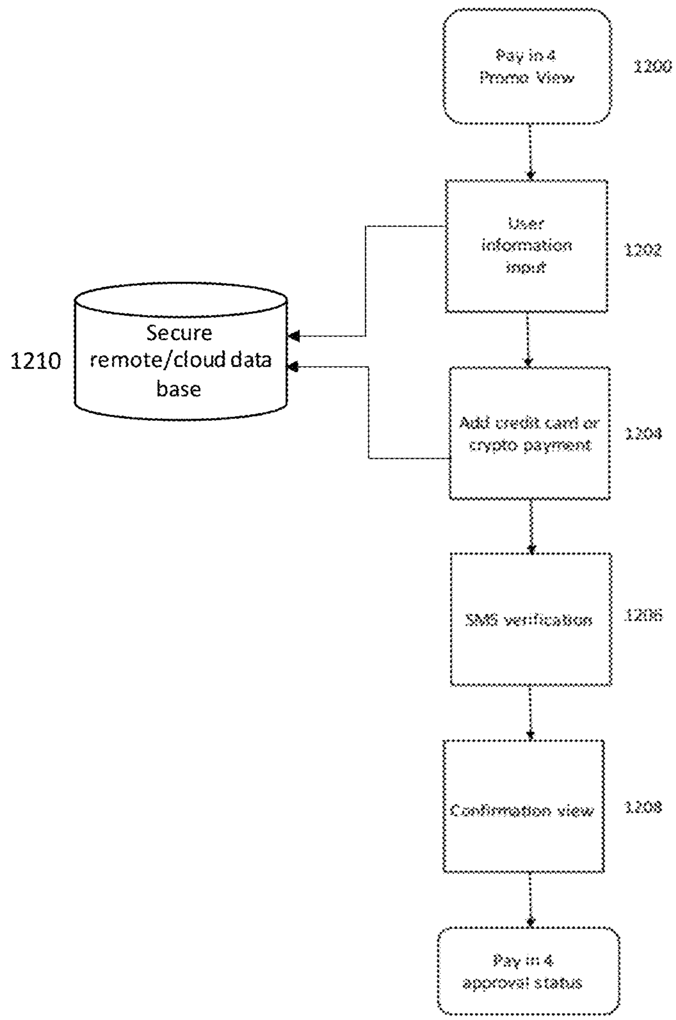
FIGS. 12A-B show the pay in 4 process flow of the present invention.
Figure 12B:

FIGS. 12A-B show the Pay in 4 process flow of the present invention. In accordance with the preferred embodiment of the present invention, FIG. 12A is a diagram of the Pay in 4 (P4) process flow. The Pay in 4 promo view 1200 displays the P4 timeline and basic promotional program information, including the installment options that should be 25% of the order amount, and displayed in 0-2 weeks, 4 weeks, and 6-week timeline displays. To start the P4 application process, the customer enters the required information (such as personal details) for decisioning 1202. Decisioning with Cognito/Equifax happens after this view's data is submitted and might be followed by Cognito phone/ID fail views and/or Equifax-driven views (e.g., Frozen file, Fraud alert). If the customer passes Cognito/Equifax, the customer can then proceed to the Add credit card view 1204. If not, the attempt is documented as a pending or failed case.

In the add credit card or cryptocurrency view 1204, the customer enters credit card payment details or a cryptocurrency wallet, including the card number, expiration date, and security code. All user information input 1202 and credit card or crypto payment information 1204 are stored in a secure remote cloud database 1210. Upon submission of this view, the card information or cryptocurrency is authenticated and validated, and the first installment of 25% of the total price is authorized. Once the card or cryptocurrency has been authorized, the customer will proceed to SMS verification 1206. If the credit card or cryptocurrency authorization fails, the attempt is documented as a pending or failure case.

In the SMS verification view 1206, The customer's phone number should already have passed Cognito with a 100 score. A Short Message Service ("SMS") text message is sent to the phone number entered by the customer with a 6-digit verification code. At this view, we'll send a text message to that phone number and ask for the 6-digit code. Any change in phone number will require a re-submission to Cognito and retrieval of code from that new 100-scoring number. Once the identity of the customer has been verified, the customer can access the confirm and complete view 1208. This view presents the P4 timeline graphic again, in addition to the P4 loan agreement. Like the term loan confirm and complete page, the customer must opt-in to agree to the terms, then submit. Once the P4 application has been submitted, the customer is able to view the P4 confirmation view 1208 and the approval status 1210.

FIG. 12B is an overview of how Pay in 4 differs from traditional term loan underwriting. P4 allows customers to pay for purchases up to $2,500 in 4 interest-free payments. The payment schedule is bi-weekly, with the first 25% payment due at purchase, followed by three additional 25% installments at 2, 4, and 6 weeks after purchase. P4 can be offered to both consumers SMBs and can be approved without the need for underwriting. There is no interest charged and it is not considered to be a loan. There is no need to identify the business or the business owner, and No GAR consideration is required in decisioning. The application process is streamlined as only 6-7 attributes are requested to run the decisioning process for approval: the customer's name; email; phone number; date of birth; last 4 digits of the customer's SSN; the business EIN; and the business name. The P4 checkout process requires a payment method, such as a credit card, as well as two-factor authentication. The order is processed once a payment method has been added and successfully authenticated.

Pay in 4 Approvals will be granted a max capacity (XPL) based on credit band, as follows:

| X1 | X2 | X3 | X4 |
|---|---|---|---|
| $2,500 | $2,000 | $1,500 | $1,000 |

The XPL is merely a maximum amount and does not indicate capacity. For example, a customer approved at the X1 level for a $100 order does not qualify for spending up to $2,500. Each order is evaluated separately based on the 25% initial installment being successfully authenticated. The XPL remains in place as the maximum sum allowed for all open Pay in 4 orders. A Pay in 4 customer can have one or more open installment plans up to his/her XPL. Repayment in full of a single order will increase the XPL for the order amount, similar to the way term loans and temporary credit limits operate.

Figure 13:
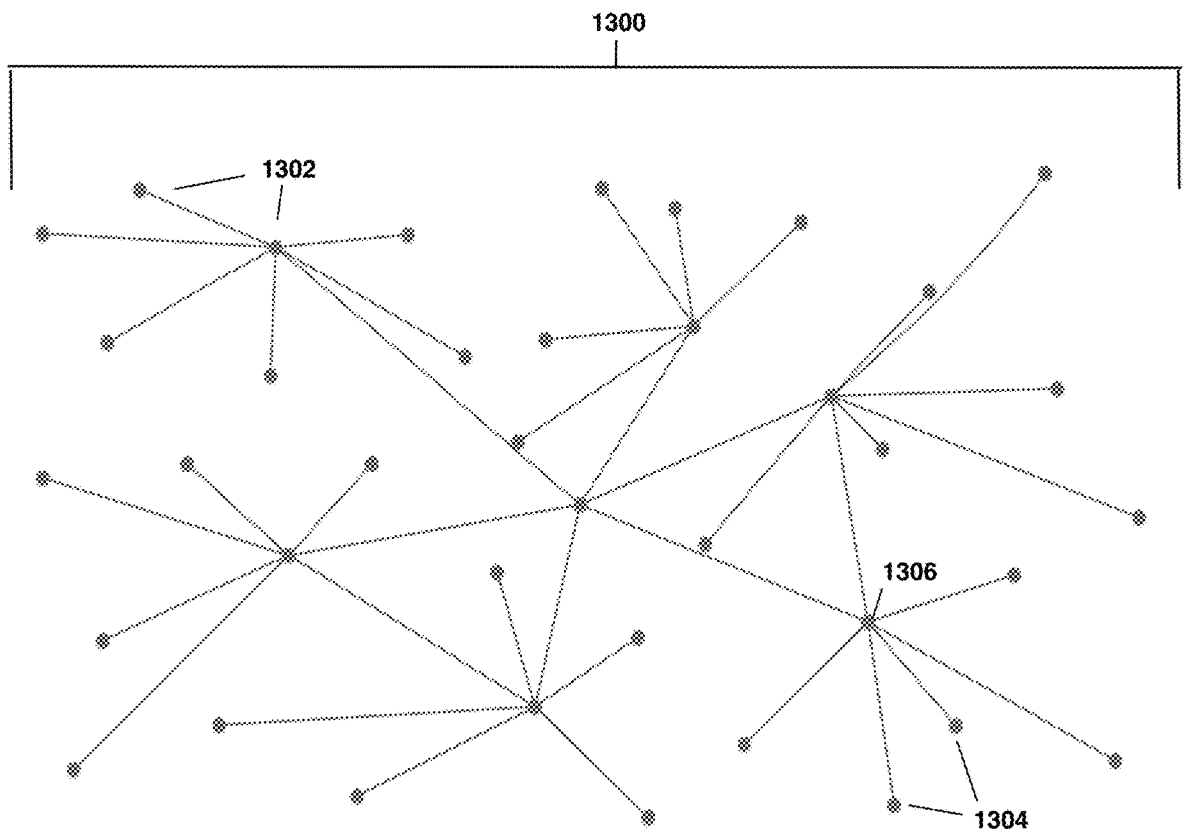
FIG. 13 is a line diagram illustrating a decentralized network.

FIG. 13 is a line diagram illustrating a decentralized network. In accordance with the preferred embodiment of the present invention, the specific architecture of the network can be either decentralized or distributed. FIG. 13, generally represented by the numeral 1300, provides an illustrative diagram of the decentralized network. FIG. 13 depicts each node with a dot 1302 Under this system, each node is connected to at least one other node 1304. Only some nodes are connected to more than one node 1306.

Figure 14:
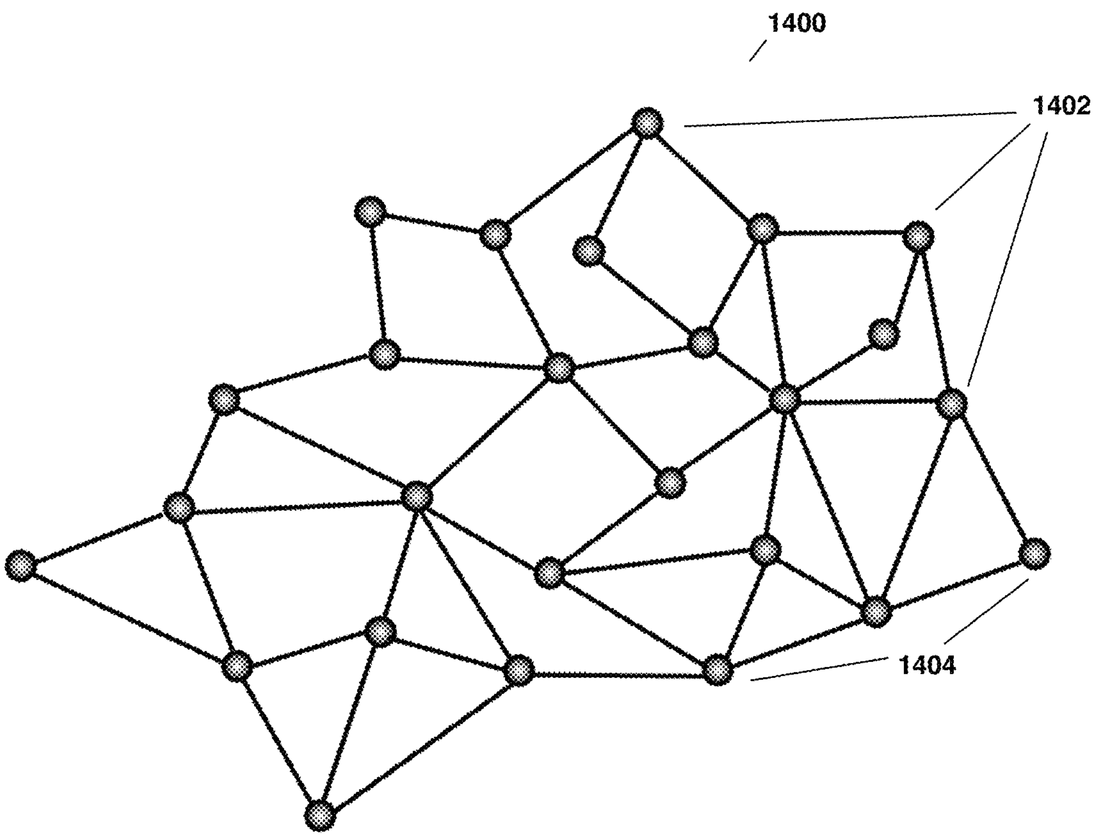
FIG. 14 is a line diagram illustrating a distributed network.

FIG. 14 is a line diagram illustrating a distributed network. For comparison purposes, FIG. 14, which is generally represented by the numeral 1400, illustrates a distributed network. Specifically, the illustration shows the interconnection of each node 1402 in a distributed decentralized network 1400. In accordance with the preferred embodiment of the present invention, each node 1402 in the distributed network 1400 is directly connected to at least two other nodes 1404. This allows each node 1402 to transact with at least one other node 1402 in the network. The present invention can be deployed on a centralized, decentralized, or distributed network.

In one embodiment, each transaction (or a block of transactions) is incorporated, confirmed, verified, included, or otherwise validated into the blockchain via a consensus protocol. Consensus is a dynamic method of reaching an agreement regarding any transaction that occurs in a decentralized system. In one embodiment, a distributed hierarchical registry is provided for device discovery and communication. The distributed hierarchical registry comprises a plurality of registry groups at the first level of the hierarchical registry, each registry group comprising a plurality of registry servers. The plurality of registry servers in a registry group provides services comprising receiving client update information from client devices and responding to client lookup requests from client devices. The plurality of registry servers in each of the plurality of registry groups provide the services using, at least in part, a quorum consensus protocol.

As another example, a method is provided for device discovery and communication using a distributed hierarchical registry. The method comprises Broadcasting a request to identify a registry server, receiving a response from a registry server, and sending client update information to the registry server. The registry server is part of a registry group of the distributed hierarchical registry, and the registry group comprises a plurality of registry servers. The registry server updates other registry servers of the registry group with the client update information using, at least in part, a quorum consensus protocol.

Figure 15:
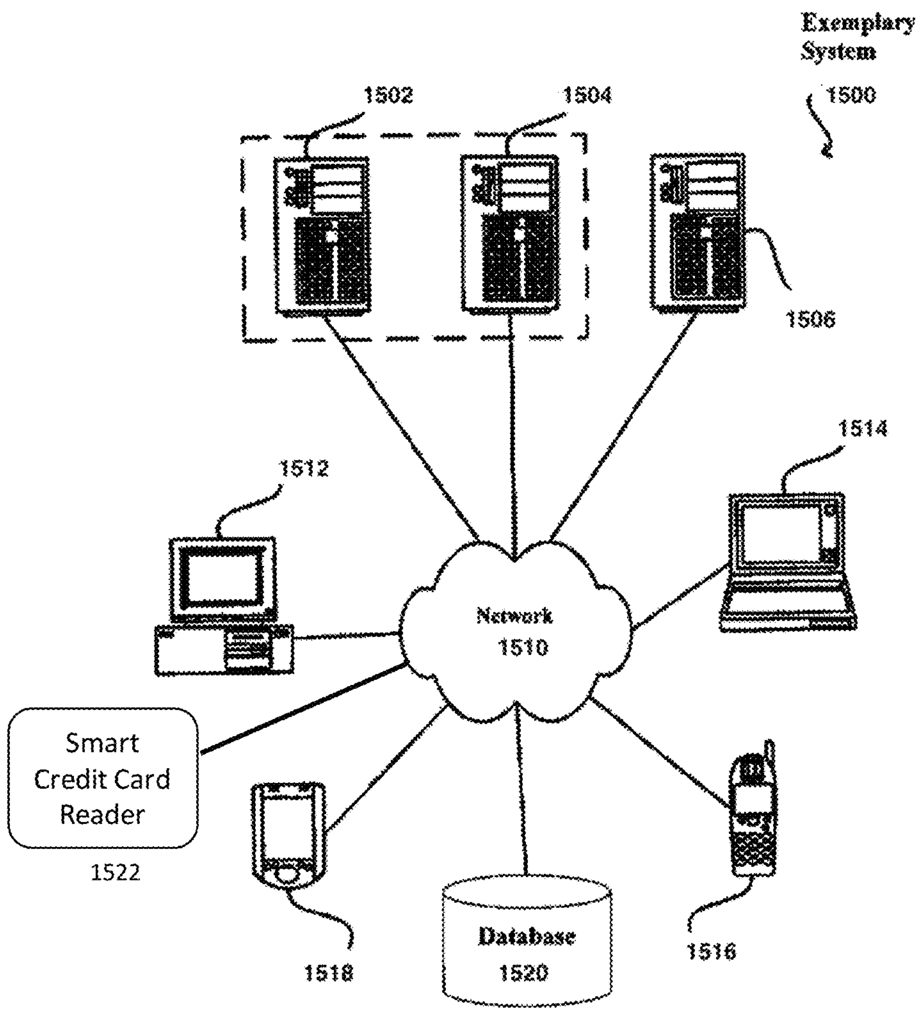
FIG. 15 is an illustration depicting an exemplary operating environment including one or more user computers, computing devices, or processing devices, which can be used to operate a client, such as a dedicated application, web browser is shown.

FIG. 15 is a block diagram illustrating components of an exemplary operating environment in which embodiments of the present invention may be implemented. The system 1500 can include one or more user computers, computing devices, or processing devices 1512, 1514, 1516, 1518, which can be used to operate a client, such as a dedicated application, web browser, etc. The user computers 1512, 1514, 1516, 1518 can be general-purpose personal computers (including, merely by way of example, personal computers and/or laptop computers running a standard operating system), cell phones or personal digital assistants ("PDAs") (running mobile software and being Internet, e-mail, SMS, Blackberry, or other communication protocol enabled), and/or workstation computers running any of a variety of partially available Uniplexed Information Computing System ("UNIX") or UNIX-like operating systems (including without limitation, the variety of GNU/Linux operating systems). User computers 1512, 1514, 1516, 1518 may also have any of a variety of applications, including one or more development systems, database client and/or server applications, and Web browser applications. Alternatively, the user computers 1512, 1514, 1516, and 1518 may be any other electronic device, such as a thin-client computer, Internet-enabled gaming system, and/or personal messaging device, capable of communicating via a network (e.g., the network 1510 described below) and/or displaying and navigating Web pages or other types of electronic documents. Although the exemplary system 1500 is shown with four user computers, any number of user computers may be supported.

In most embodiments, the system 1500 includes some type of network 1510. The network can be any type of network familiar to those skilled in the art that can support data communications using any of a variety of commercially available protocols, including without limitation Transmission Control Protocol ("TCP")/IP, System Network Architecture ("SNA"), Internet Package Exchange ("IPX"), AppleTalk, and the like. Merely by way of example, the network 1510 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the Institute of Electrical and Electronics Engineers ("IEEE") 802.101 suite of protocols, General Packet Radio Services ("GPRS"), Global System for Mobile Communications ("GSM"), Universal Mobile Telecommunications Service ("UMTS"), Enhanced GPRS ("EDGE"), 2G, 2.5G, 3G, 4G, Wimax, Wi-Fi, Code Division Multiple Access ("CDMA") 2000, Wideband CDMA ("WCDMA"), the Bluetooth protocol known in the art, and/or any other wireless protocol); and/or any combination of these and/or other networks.

The system may also include one or more server computers 1502, 1504, and 1506 which can be general-purpose computers, specialized server computers (including, merely by way of example, personal computer ("PC") servers, UNIX servers, mid-range servers, mainframe computers rack-mounted servers, etc.), server farms, server clusters, or any other appropriate arrangement and/or combination. One or more of the servers (e.g., 1506) may be dedicated to running applications, such as a business application, a Web server, an application server, etc. Such servers may be used to process requests from user computers 1512, 1514, 1516, and 1518. The applications can also include any number of applications for controlling access to resources of the servers 1502, 1504, and 1506.

The Web server can run an operating system including any of those discussed above, as well as any commercially available server operating systems. The Web server can also run any of a variety of server applications and/or mid-tier applications, including Hypertext Transfer Protocol ("HTTP") servers, File Transfer Protocol ("FTP") servers, Common Gateway Interface ("CGI") servers, database servers, Java servers, business applications, and the like. The server(s) also may be one or more computers that can be capable of executing programs or scripts in response to the user computers 1512, 1514, 1516, and 1518. As one example, a server may execute one or more Web applications. The Web application may be implemented as one or more scripts or programs written in any programming language, such as Java®, C, C# or C++, and/or any scripting language, such as Perl, Python, or telephone Communication Limited ("TCL"), as well as combinations of any programming/scripting languages. The server(s) may also include database servers, including without limitation those commercially available from Oracle®, Microsoft®, Sybase®, IBM® and the like, which can process requests from database clients running on a user computer 1512, 1514, 1516, and 1518.

The system 1500 may also include one or more databases 1520. The database(s) 1520 may reside in a variety of locations. By way of example, a database 1520 may reside on a storage medium local to (and/or resident in) one or more of the computers 1502, 1504, 1506, 1512, 1514, 1516, 1518. Alternatively, it may be remote from any or all of the computers 1502, 1504, 1506, 1512, 1514, 1516, 1518, and/or in communication (e.g., via the network 1510) with one or more of these. In a particular set of embodiments, the database 1520 may reside in a storage-area network ("SAN") familiar to those skilled in the art. Similarly, any necessary files for performing the functions attributed to the computers 1502, 1504, 1506, 1512, 1514, 1516, 1518 may be stored locally on the respective computer and/or remotely, as appropriate. In one set of embodiments, the database 1520 may be a relational database, such as Oracle 10 g, that is adapted to store, update, and retrieve data in response to Structured Query Language ("SQL")-formatted commands. The system 1500 may also include Smart Credit Card Reader or POS systems 1522 which can process financial requests for the present invention.

Figure 16:
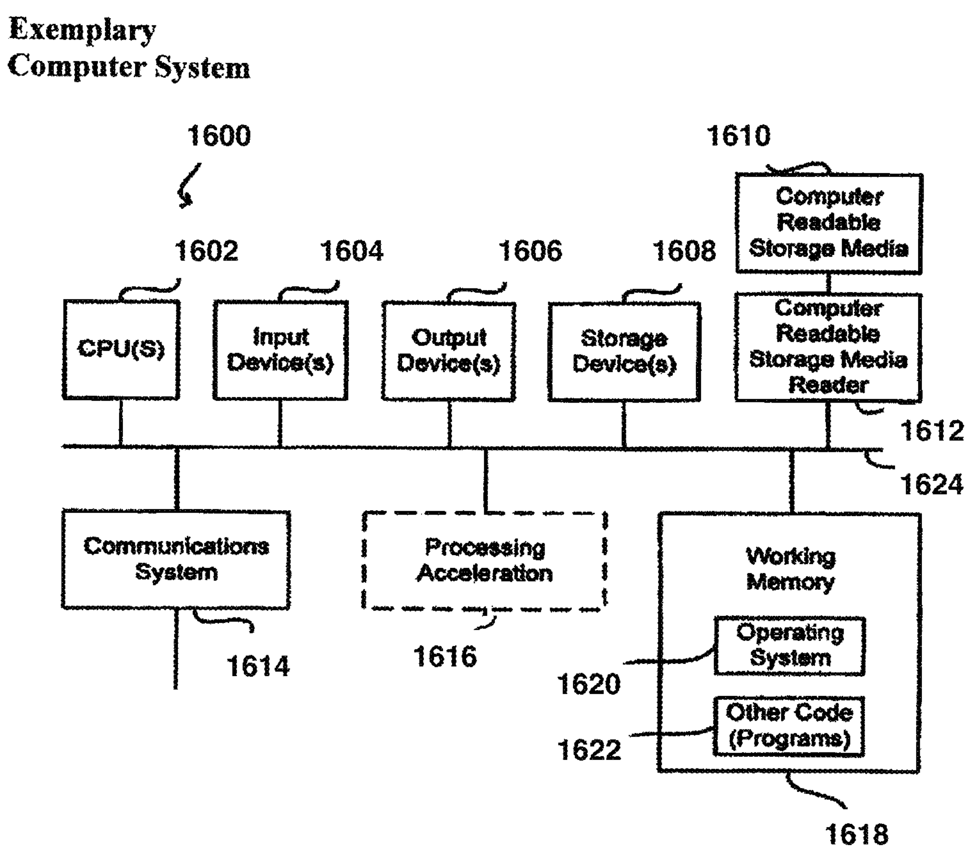
FIG. 16 is another illustration depicting an exemplary operating environment including a computer system with various elements as shown.

FIG. 16 illustrates an exemplary computer system 1600, in which embodiments of the present invention may be implemented. The system 1600 may be used to implement any of the computer systems described above. The computer system 1600 is shown comprising hardware elements that may be electrically coupled via a bus 1624. The hardware elements may include one or more central processing units ("CPUs") 1602, one or more input devices 1604 (e.g., a mouse, a keyboard, etc.), and one or more output devices 1606 (e.g., a display device, a printer, etc.). The computer system 1600 may also include one or more storage devices 1608. By way of example, the storage device(s) 1608 can include devices such as disk drives, optical storage devices, solid-state storage devices such as a random-access memory ("RAM") and/or read-only memory ("ROM"), which can be programmable, flash-updateable and/or the like.

The computer system 1600 may additionally include a computer-readable storage media reader 1612, a communications system 1614 (e.g., a modem, a network card (wireless or wired), an infra-red communication device, etc.), and working memory 1618, which may include RAM and ROM devices as described above. In some embodiments, the computer system 1600 may also include a processing acceleration unit 1616, which can include a digital signal processor DSP, a special-purpose processor, and/or the like.

The computer-readable storage media reader 1612 can further be connected to a computer-readable storage medium 1610, together (and, optionally, in combination with storage device(s) 1608) comprehensively representing remote, local, fixed, and/or removable storage devices plus storage media for temporarily and/or more permanently containing, storing, transmitting, and retrieving computer-readable information. The communications system 1614 may permit data to be exchanged with the network and/or any other computer described above with respect to the system 1600.

The computer system 1600 may also comprise software elements, shown as being currently located within a working memory 1618, including an operating system 1620 and/or other code 1622, such as an application program (which may be a client application, Web browser, mid-tier application, relational database management system ("RDBMS"), etc.). It should be appreciated that alternate embodiments of a computer system 1600 may have numerous variations from that described above. For example, customized hardware might also be used and/or particular elements might be implemented in hardware, software (including portable software, such as applets), or both. Further, connection to other computing devices such as network input/output devices may be employed.

In addition, the computer system 1600 according to the present invention utilizes a unique method of mixing ERP data with data from Public Credit Bureaus (TransUnion, Equifax & Experian (FICO)), which data is derived from: the service provider or retailer etc.; from its client; Social Security number or a portion of a Social Security number; spending past and/or present; and payment history data which service or product suppliers gather from the party wishing to have credit extended to it, data may be stored for later usage and the overall system may "learn" based on past lending decisions. In other words, the system according to the present invention can track the reasons "why" past lending decisions were made in one way or another (approve or deny), and then, track the outcome of those decisions into the future, so that future lending decisions may optionally be influenced by the overall track record according to the present invention.

The present invention features a so-called lightweight approach, allowing for integration into a merchant's database. Merchants have ERP data derived from their respective customer relationships, and that ERP data may be operated upon and integrated into business lending decisions according to the present invention. The computer system 1600 may incorporate an interface to iOS and Android computer applications, to enable users to use their smartphones to access their borrowing files. In that manner, users of the present invention may set alarms with respect to spending and may receive notifications from various vendors about promotional opportunities for lower percentage rates available for certain purchases or during certain times of the year and may learn when their payments are due or past due.

In addition, computer system 1600 may enable the merchant or system administrator (or lender) to account for the use of borrower strength or creditworthiness as a way to (a) charge merchants more for the acquisition of that client and to (b) charge merchants or even the customers more (in terms of interest rates) on the back end for servicing the loan. This can also be based on customer granularity within particular tiers of creditworthiness. In addition, by way of the computer system 1600, the present invention may allow customers to decrease their interest rate with a down payment. For example, a customer may qualify at 2% per month, but if the customer makes an initial down payment of 30% of the value of the purchase, the customer is offered a lowered interest rate. In that manner, a higher down payment may be used to "buy down" the interest rate.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, electronically erasable programmable read-only memory ("EEPROM"), flash memory or other memory technology, compact disc ("CD")-ROM, digital versatile disk ("DVD") or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

As discussed above, embodiments are suitable for use with the Internet, which refers to a specific global internetwork of networks. However, it should be understood that other networks can be used instead of the Internet, such as an intranet, an extranet, a virtual private network ("VPN"), a non-TCP/IP based network, any LAN or wide area network ("WAN") or the like.

FIG. 14 further illustrates an environment where an on-demand distributed database service might be used. As illustrated in FIG. 14 user systems might interact via a network with an on-demand database. Some on-demand databases may store information from one or more records stored in tables of one or more distributed database images to form a database management system ("DBMS"). Accordingly, on-demand database and system will be used interchangeably herein. A database image may include one or more database objects. A relational database management system ("RDMS") or the equivalent may execute storage and retrieval of information against the database object(s). Some on-demand database services may include an application platform that enables creation, managing and executing one or more applications developed by the provider of the on-demand database service, wherein users access the on-demand database service via user systems, or third-party application developers access the on-demand database service via user systems.

The security of a particular user system might be entirely determined by permissions (permission levels) for the current user. For example, where a user account identification transaction may involve a portable identification alphanumeric data field physically or digitally linked to a personal primary identification device to request services from a provider account and wherein the user is using a particular user system to interact with System, that user system has the permissions allotted to that user account. However, while an administrator is using that user system to interact with System, that user system has the permissions allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different permissions with regard to accessing and modifying application and database information, depending on a user's security or permission level.

A network can be a LAN, WAN, wireless network, point-to-point network, star network, token ring network, hub network, or other appropriate configuration. As the most common type of network in current use is a TCP/IP (Transfer Control Protocol and Internet Protocol) network such as the global internetwork of networks often referred to as the "Internet" with a capital "I," that will be used in many of the examples herein. However, it should be understood that the networks that the present invention might use are not so limited, although TCP/IP is a frequently implemented protocol.

User systems might communicate with a system using TCP/IP and, at a higher network level, use other common Internet protocols to communicate, such as HTTP, FTP, authentication file system ("AFS"), wireless application protocol ("WAP"), etc. In an example where HTTP is used, a user system might include an HTTP client commonly referred to as a "browser" for sending and receiving HTTP messages to and from an HTTP server at System. Such HTTP server might be implemented as the sole network interface between a system and network, but other techniques might be used as well or instead. In some implementations, the interface between a system and network includes load sharing functionality, such as round-robin HTTP request distributors to balance loads and distribute incoming HTTP requests evenly over a plurality of servers. As for the users that are accessing that server, each of the plurality of servers has access to at least one third party entity system data schema; however, other alternative configurations are contemplated.

According to one arrangement, each user system and all its components are operator configurable using applications, such as a browser, including computer code run using a central processing unit such as an Intel Pentium® processor or the like. Similarly, a computer system (and additional instances of an enterprise database, where more than one is present) and all their components might be operator configurable using application(s) including computer code run using a central processing unit such as an Intel Pentium® processor or the like, or multiple processor units. A computer program product aspect includes a machine-readable storage medium (media) having instructions stored thereon/in which can be used to program a computer to perform any of the processes of the embodiments described herein.

Computer code for operating and configuring systems to intercommunicate and to process web pages, applications, and other data and media content as described herein is preferably downloaded and stored on a hard disk, but the entire program code, or portions thereof, may also be locally stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a client system and/or server or server system such as, for example, in C, C++, hypertext markup language ("HTML"), any other markup language, Java™, JavaScript, ActiveX, any other scripting language such as VBScript, and many other programming languages as are well known. (Java™ is a trademark of Sun Microsystems, Inc.).

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer-readable medium. All or some of the computer program may be provided on computer-readable media permanently, removably, or remotely coupled to an information processing system. The computer-readable media may include, for example, and without limitation, any number of the following: magnetic storage media including disk and tape storage media; optical storage media such as compact disk media (e.g., CDROM, CDR, etc.) and digital video disk storage media; nonvolatile memory storage media including semiconductor-based memory units such as FLASH memory, EEPROM, EPROM, ROM; ferromagnetic digital memories; magnointrusive random access memory ("MRAM"); volatile storage media including registers, buffers or caches, main memory, RAM, etc.

A computer process typically includes an executing (running) program or portion of a program, current program values and state information, and the resources used by the operating system to manage the execution of the process. An operating system ("OS") is software that manages the sharing of the resources of a computer and provides programmers with an interface used to access those resources. An operating system processes system data and user input and responds by allocating and managing tasks and internal system resources as a service to users and programs of the system.

The computer system may for instance include at least one processing unit, associated memory and a number of input/output ("I/O") devices. When executing the computer program, the computer system processes information according to the computer program and produces resultant output information via I/O devices.

The present technology requires a data processing system with sufficient memory and processing power to store and recall user data in real time. In addition, the invention may be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

As before, the blocks may be representative of modules that are configured to provide represented functionality. Further, any of the functions described herein can be implemented using software, firmware (e.g., fixed logic circuitry), manual processing, or a combination of these implementations. The terms "module," "functionality," and "logic" as used herein generally represent software, firmware, hardware or a combination thereof. In the case of a software implementation, the module, functionality, or logic represents program code that performs specified tasks when executed on a processor (e.g., CPU or CPUs). The program code can be stored in one or more computer-readable memory devices. The features of the techniques described above are platform-independent, meaning that the techniques may be implemented on a variety of commercial computing platforms having a variety of processors.

Encoding the software presented herein also transforms the physical structure of the computer-readable media presented herein. The specific transformation of physical structure depends on various factors, in different implementations of this description. Examples of such factors include, but are not limited to, the technology used to implement the computer-readable media, whether the computer-readable media is characterized as primary or secondary storage, and the like. For example, if the computer-readable media is implemented as semiconductor-based memory, the software disclosed herein can be encoded on the computer-readable media by transforming the physical state of the semiconductor memory. For instance, software can transform the state of transistors, capacitors, or other discrete circuit elements constituting the semiconductor memory. The software can also transform the physical state of such components in order to store data thereupon.

As another example, the computer-readable media disclosed herein can be implemented using magnetic or optical technology. In such implementations, the software components presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

Figure 17A:
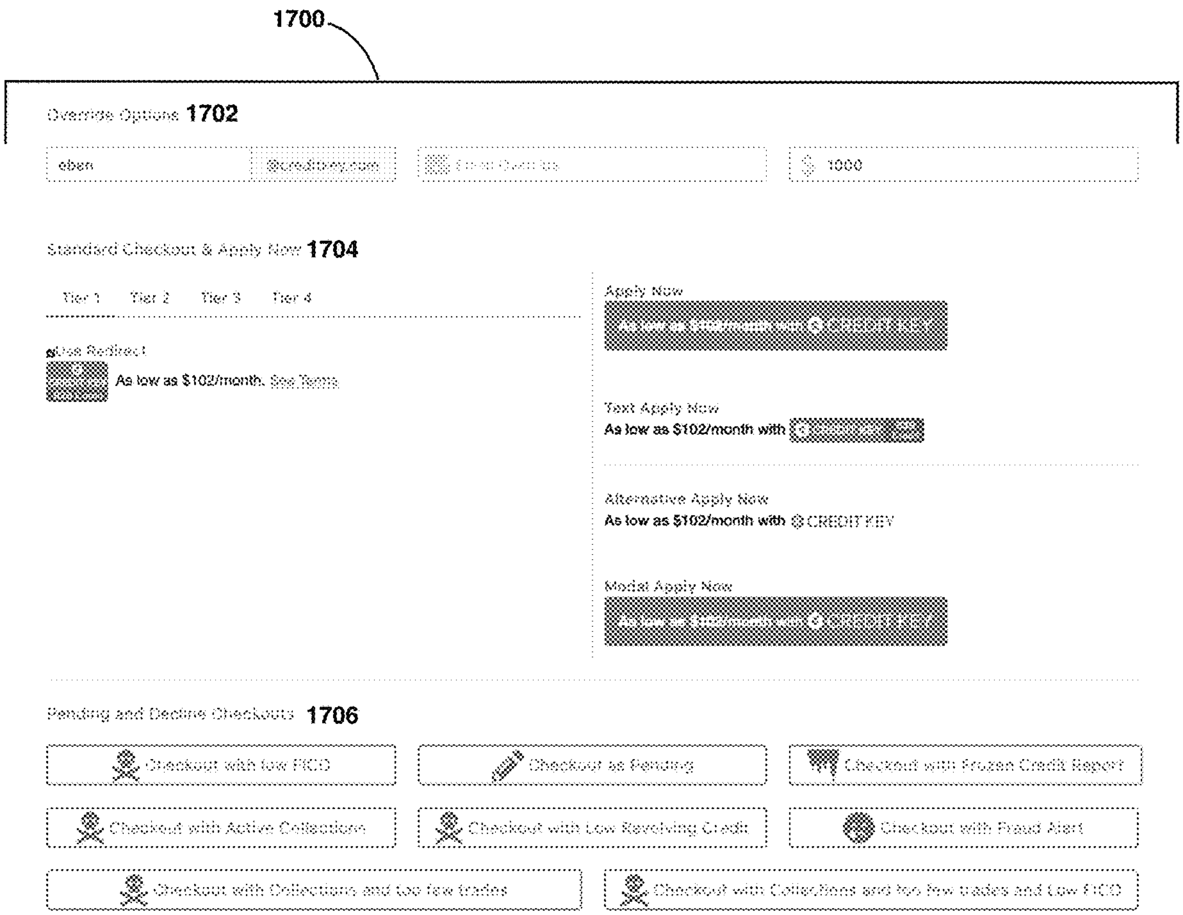
FIGS. 17A-L are screenshots of the loan application process of the present invention.

FIGS. 17A-L are screenshots of the loan application process of the present invention. In accordance with the preferred embodiment of the present invention, FIG. 17A is a screenshot of the first page 1700 of the business online loan application process of the present invention. The user's email address and amount of the loan are entered in the override options 1702. The tiers of the loan are selected for standard checkout and apply now 1704 to proceed to the next step. The user also has the options of completing the application using a variety of loan parameters by selecting one of the options under pending and decline checkouts 1706, such as: checkout with low FICO; checkout as pending; checkout with frozen credit report; checkout with active collections; checkout with low revolving credit; checkout with fraud alert; checkout with collections and too few trades; and checkout with collections and too few trades and low FICO.

Figure 17B:
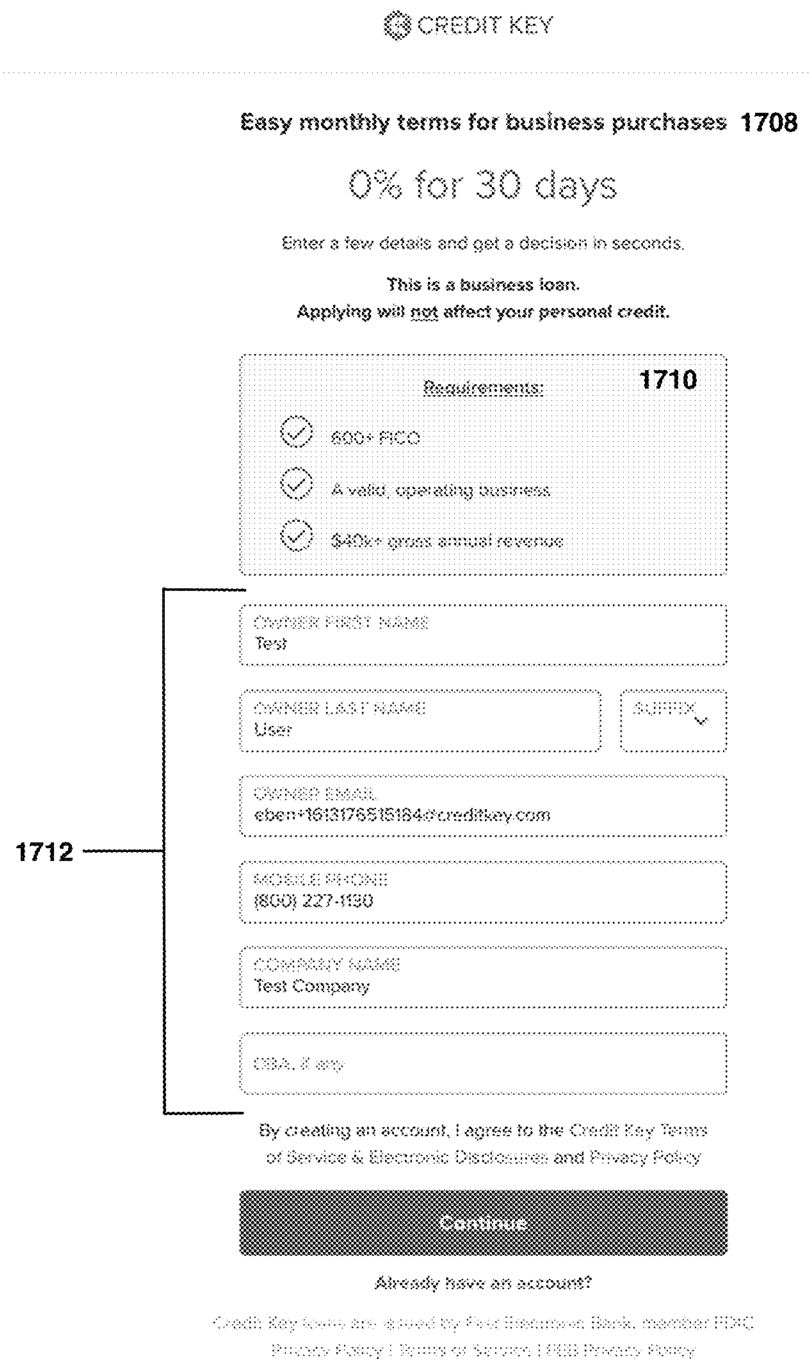

FIG. 17B is the next step of the business online loan application of the present invention, whereby the user reviews the monthly term for the business purchase 1708. The user reviews the requirements outlined for the loan 1710, and then enters in required information 1712 such as: business owner's first and last name; business owner's email; mobile phone number; company name; and DBA if any.

Figure 17C:
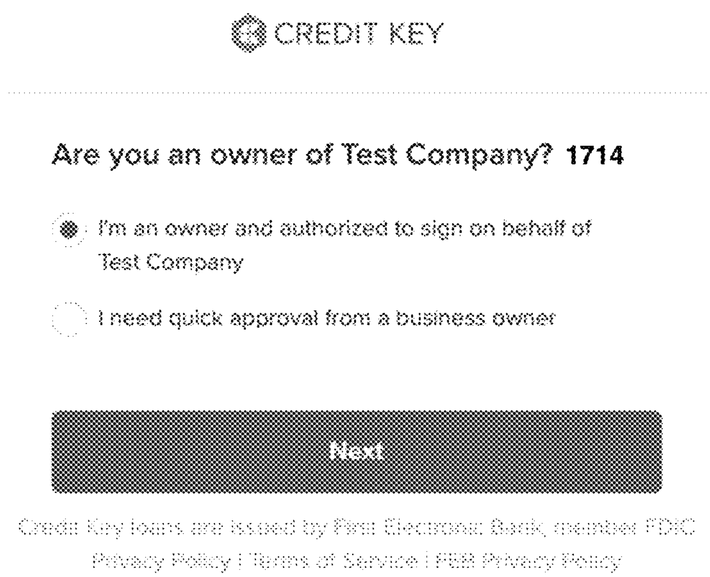

FIG. 17C is the next step of the business online loan application of the present invention, wherein the user is asked if they are the owner of the company applying for the loan 1714.

Figure 17D:
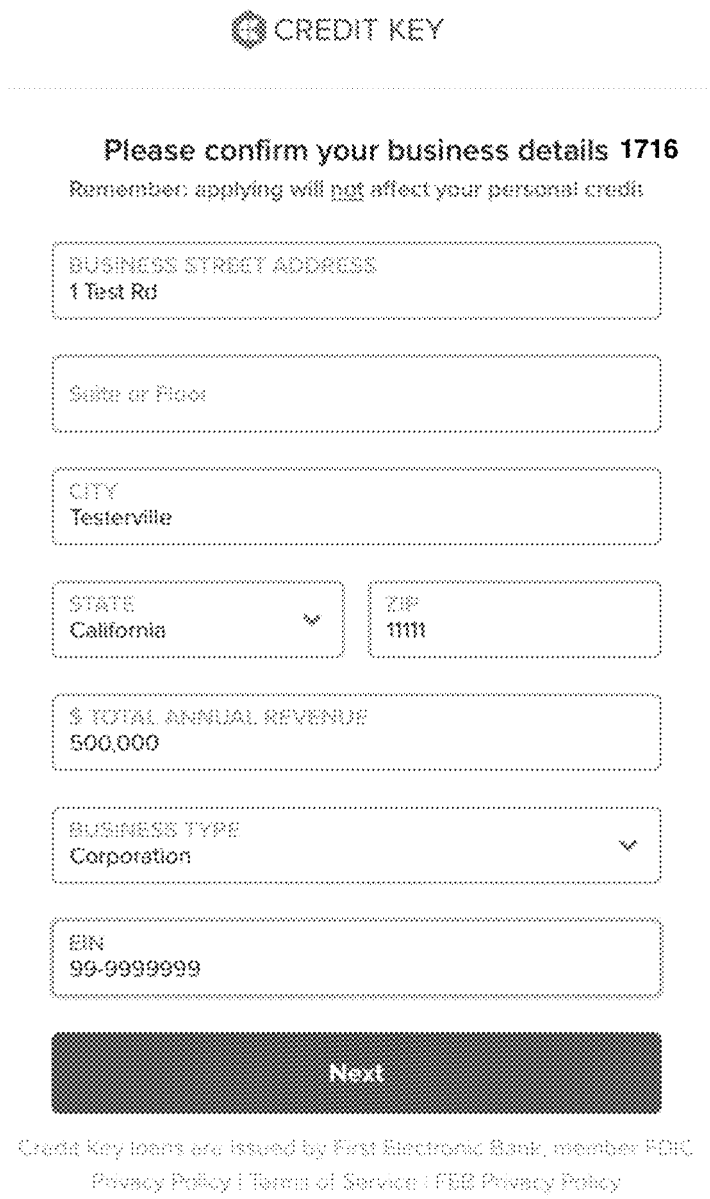

FIG. 17D asks the user to confirm the business details of the company 1716, wherein the user enters required validating information pertaining to the company such as: the business street address, city, state and zip code; the total annual revenue of the business; the business entity type; and the EIN for the business.

Figure 17E:
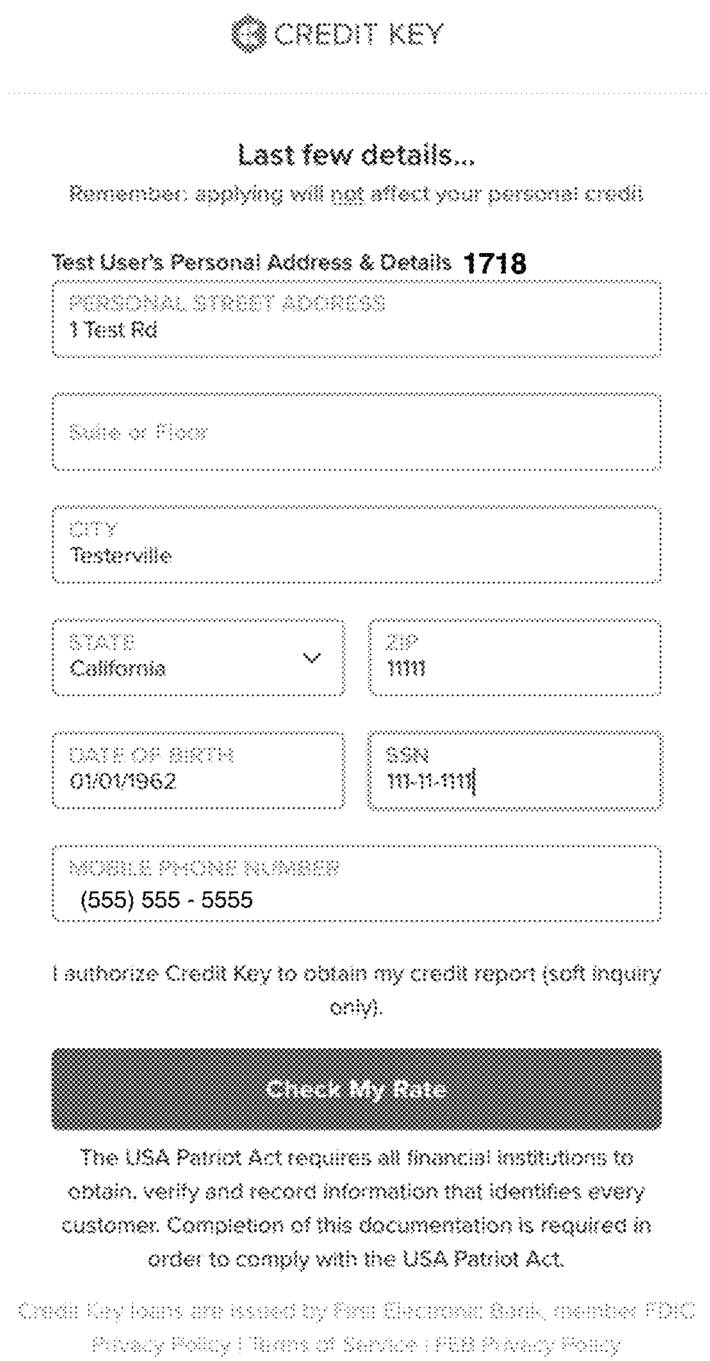

FIG. 17E is the next step of the business online loan application of the present invention, asking for the user to enter required personal information 1718 such as: the user's personal address, city, state and zip code; the user's date of birth; the user's SSN; and the user's mobile phone number.

Figure 17F:
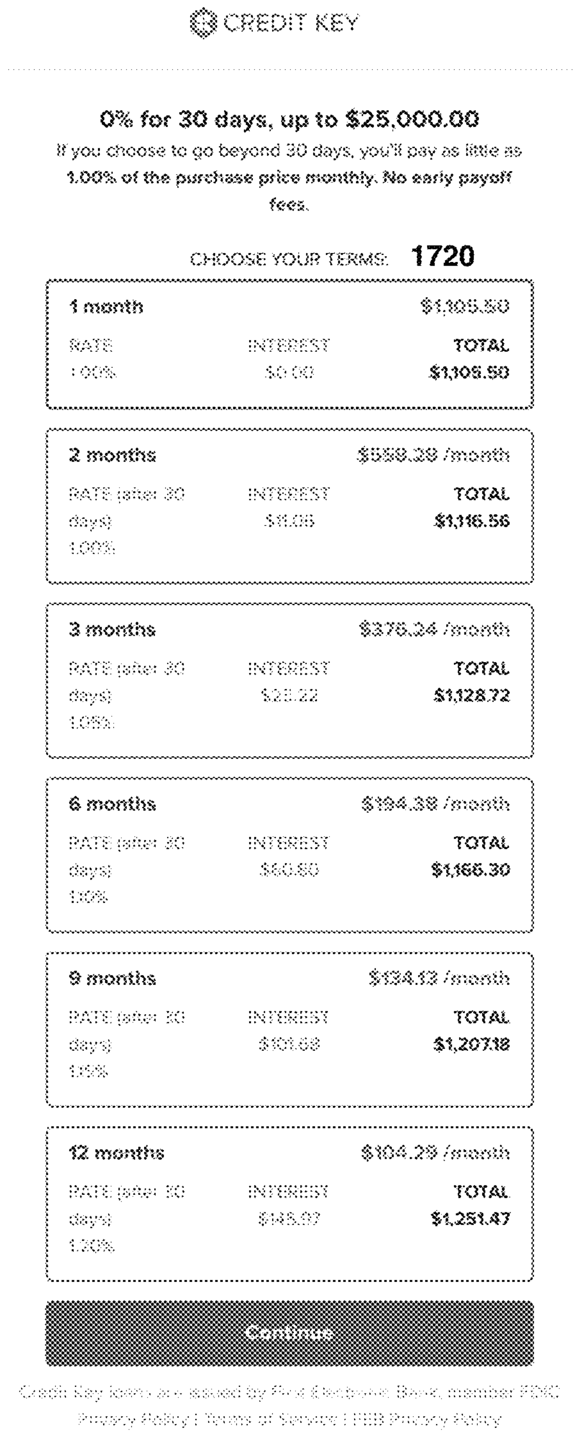

FIG. 17F asks the user to choose the terms of the loan 1720, wherein the options are based on how long the user needs to repay the loan in terms of months, and showing the rate, interest, and total amount owed for each option.

Figure 17G:
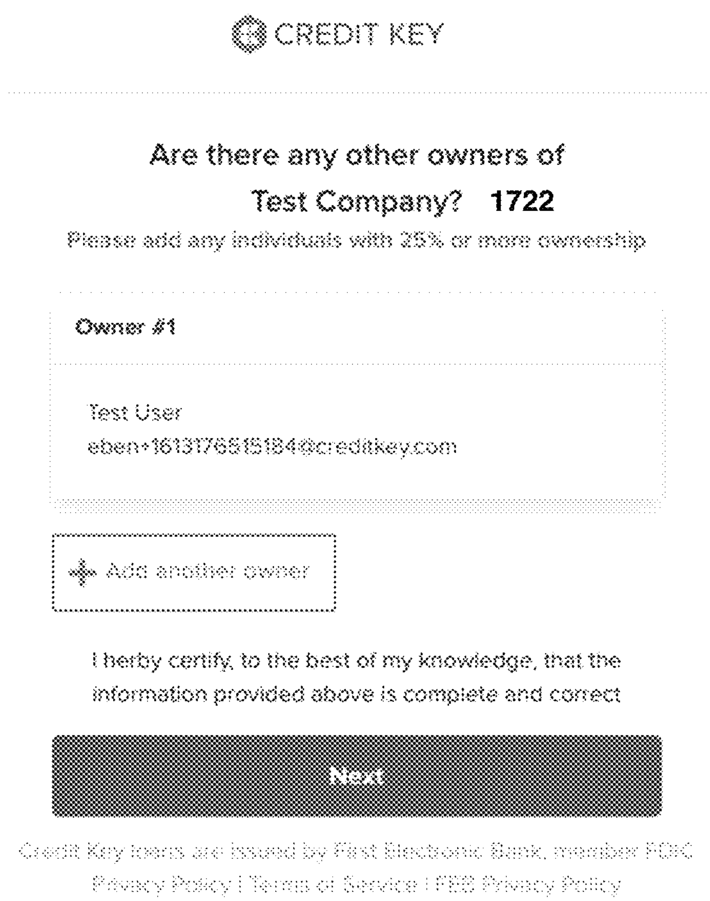

FIG. 17G allows for the user to add in the other owners of the company 1722, if applicable.

Figure 17H:
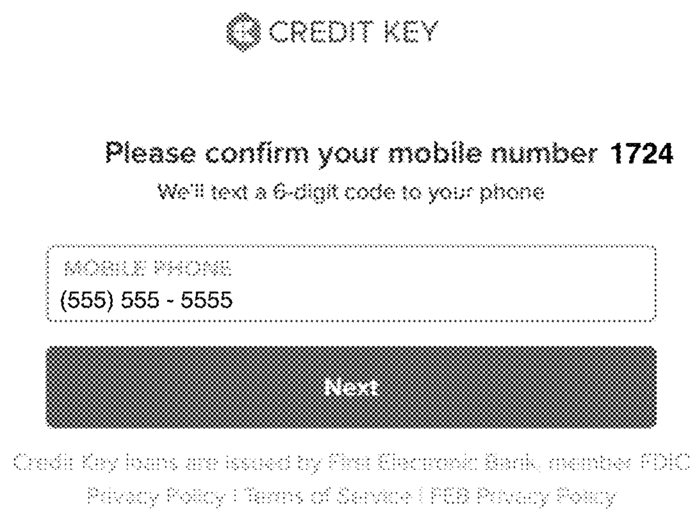

FIG. 17H is the next step of the business online loan application of the present invention, wherein the user is asked to confirm their mobile phone number 1724 in order to have a 6-digit verification code sent to their mobile device.

Figure 17I:
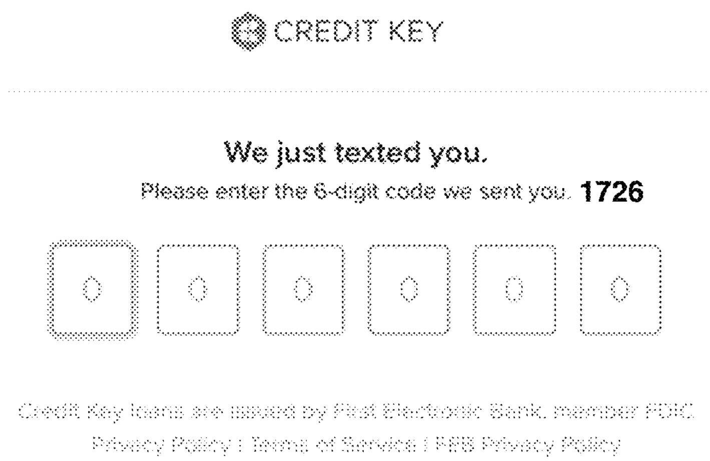

In FIG. 17I, the user must enter the 6-digit verification code 1726 that was sent to their mobile device.

Figure 17J:
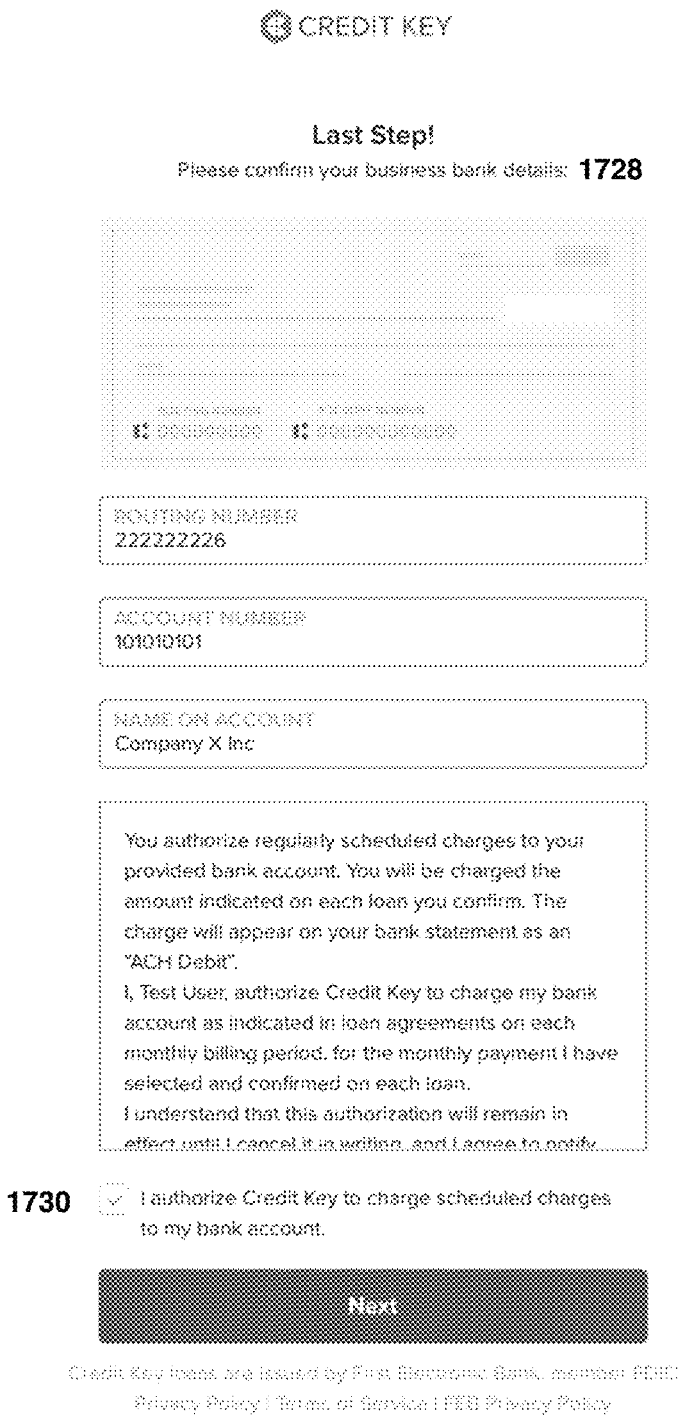

Once the user verification process has been successfully completed, the user the proceeds to the next step of the business online loan application of the present invention, as shown in FIG. 17J, wherein the user must enter the business banking details 1728 including: the business bank routing number; the business bank account number; and the name on the account. The user must also acknowledge and authorize the online application to charge scheduled charges to the user's bank account 1730.

Figure 17K:
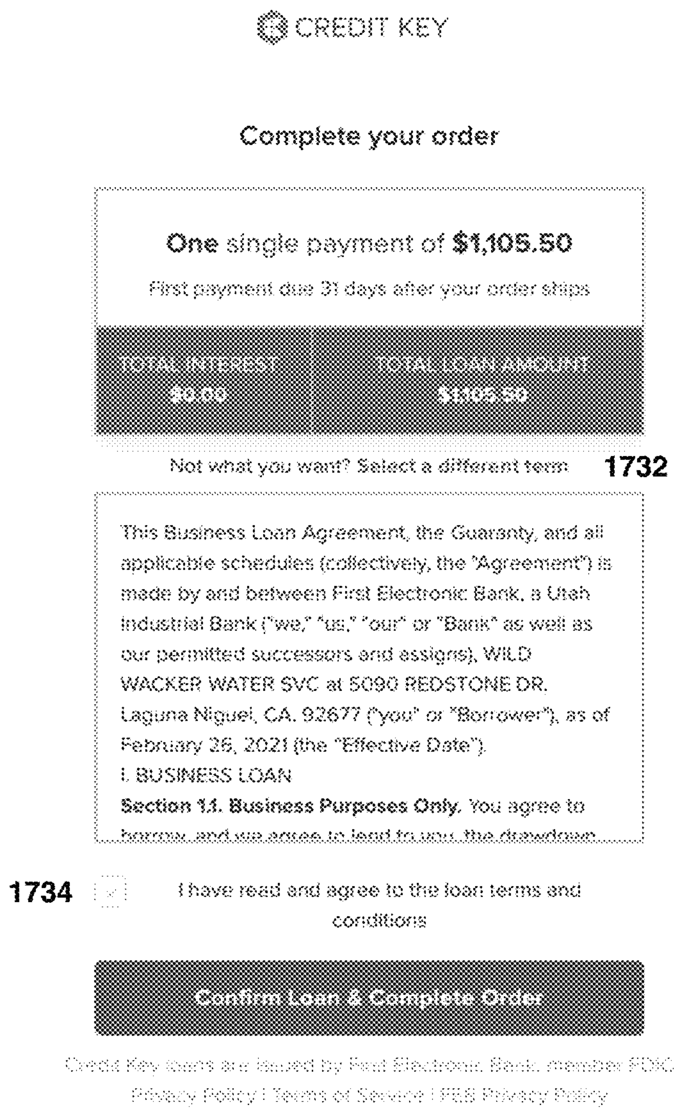

As shown in the next step of the application process depicted in FIG. 17K, the user reviews the term of the loan and can select a different term 1732 if necessary. The user must also review the loan terms and conditions and acknowledge and agree to the loan terms and conditions 1734.

Figure 17L:
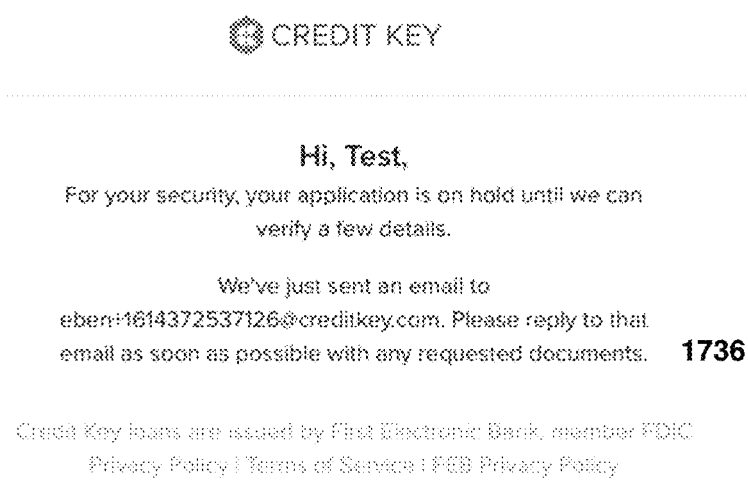

The Final screen depicted in FIG. 17L is the confirmation that the online business loan application has been successfully submitted 1736.

Figure 18A:
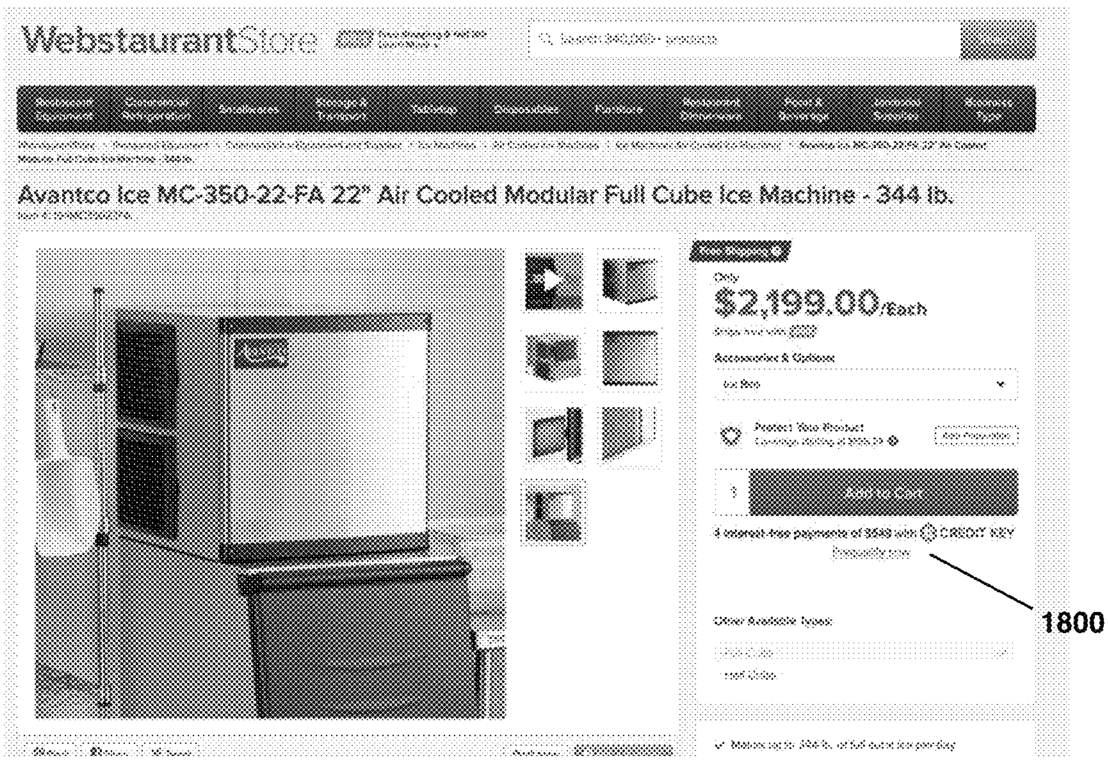
FIGS. 18A-J are screenshots of the pay in 4 checkout process of the present invention.

FIGS. 18A-J are screenshots of the pay in 4 checkout process of the present invention. In accordance with the preferred embodiment of the present invention, FIG. 18A is a screenshot of an online B2B ecommerce supply store, wherein the customer would add products to their online shopping cart. The customer's cart shown in FIG. 18A displays the option to use the present invention's pay in 4 feature 1800.

Figure 18B:
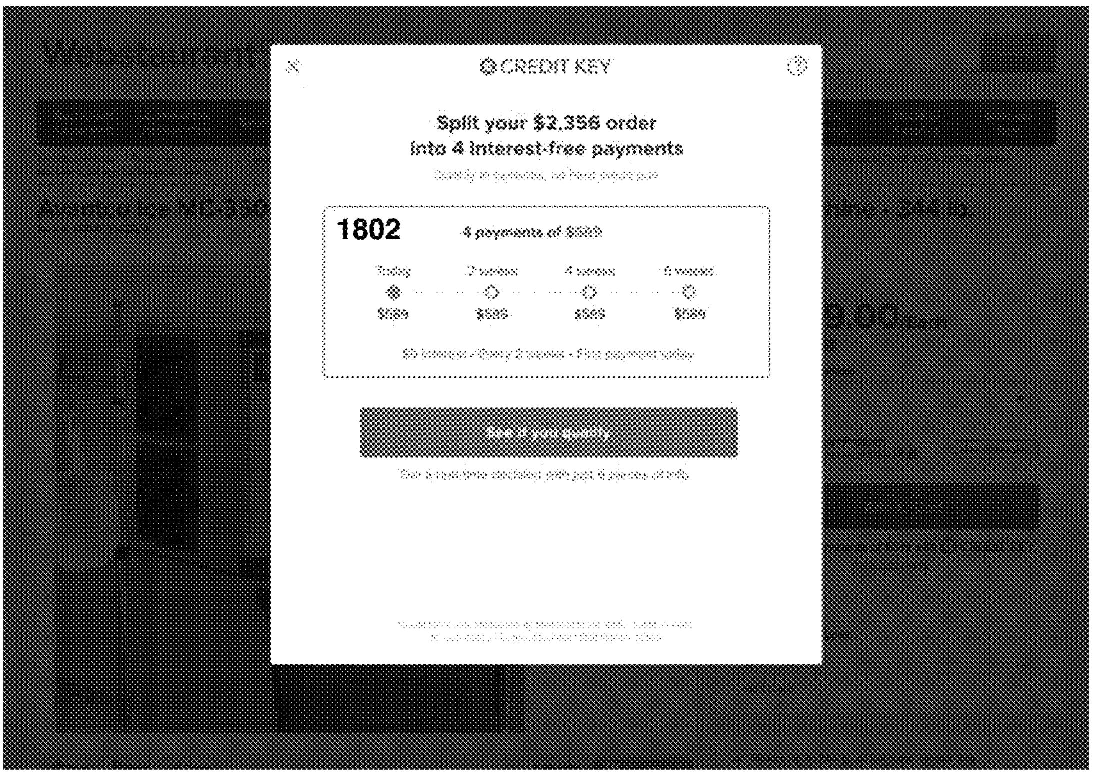

FIG. 18B shows the pay-in-4 checkout screen that allows the customer to view the payment terms and each payment amount 1802. The customer can then proceed to the pay in 4 qualification steps as shown in FIG. 18C.

Figure 18C:
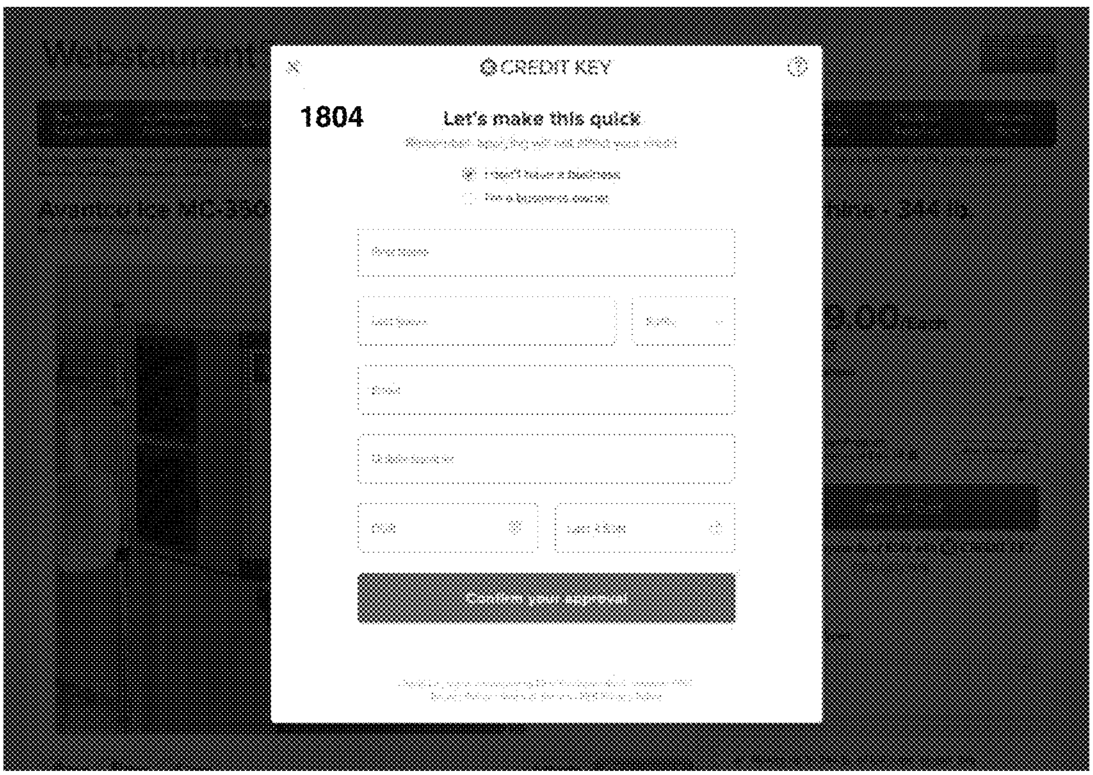

FIG. 18C shows the initial set of data input required from the customer in order to qualify for the pay in 4 feature. The customer needs to enter their personal information 1804 including: first and last name; email; phone number; date of birth; and last 4 digits of the customer's SSN.

Figure 18D:
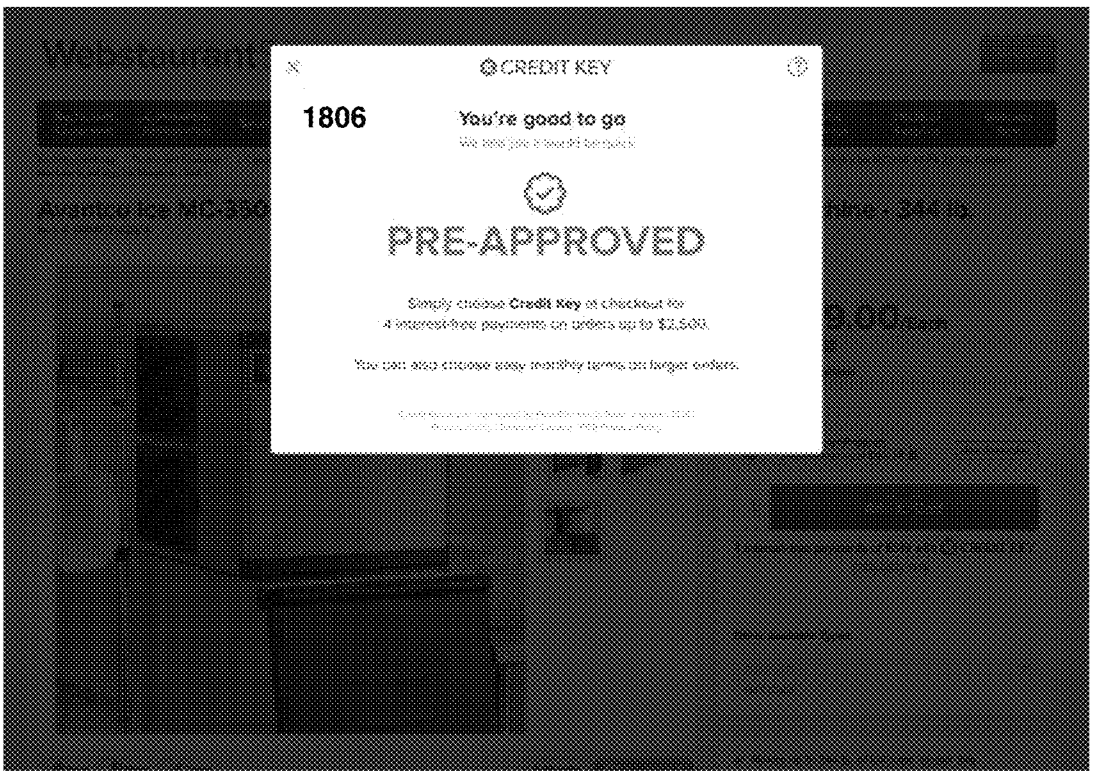

FIG. 18D shows if the customer is pre-approved for the pay in 4 feature based on the information entered in FIG. 18C. As shown in FIG. 18D, the customer has successfully been pre-approved 1806 and can now proceed with the remainder of the checkout process.

Figure 18E:
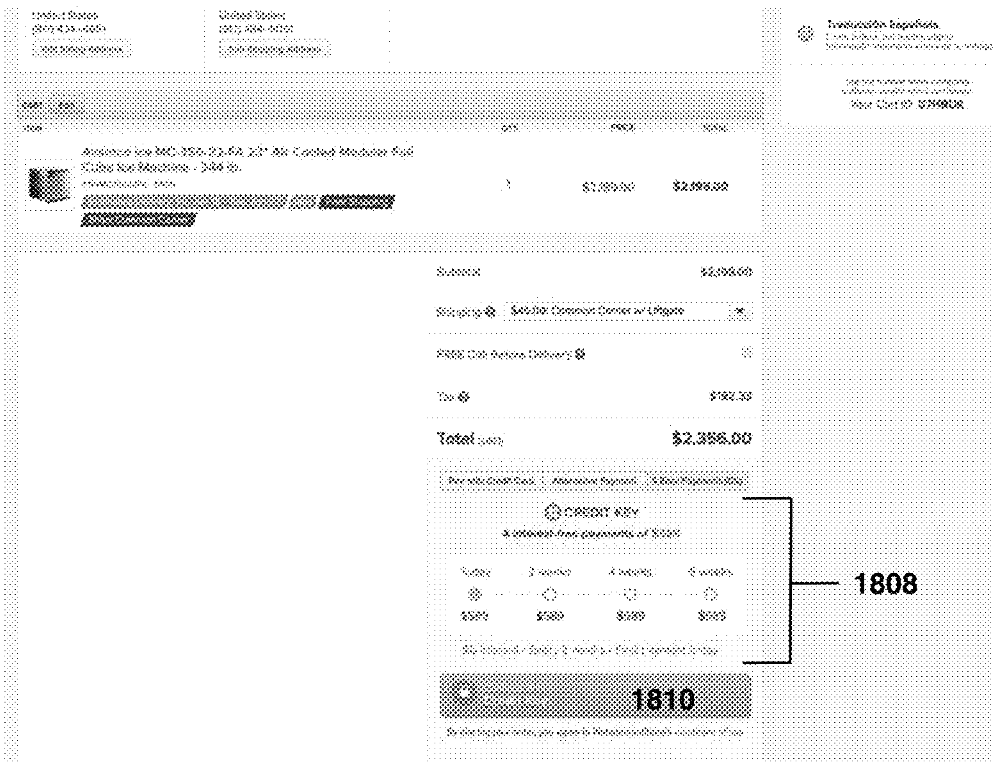
Figure 18F:
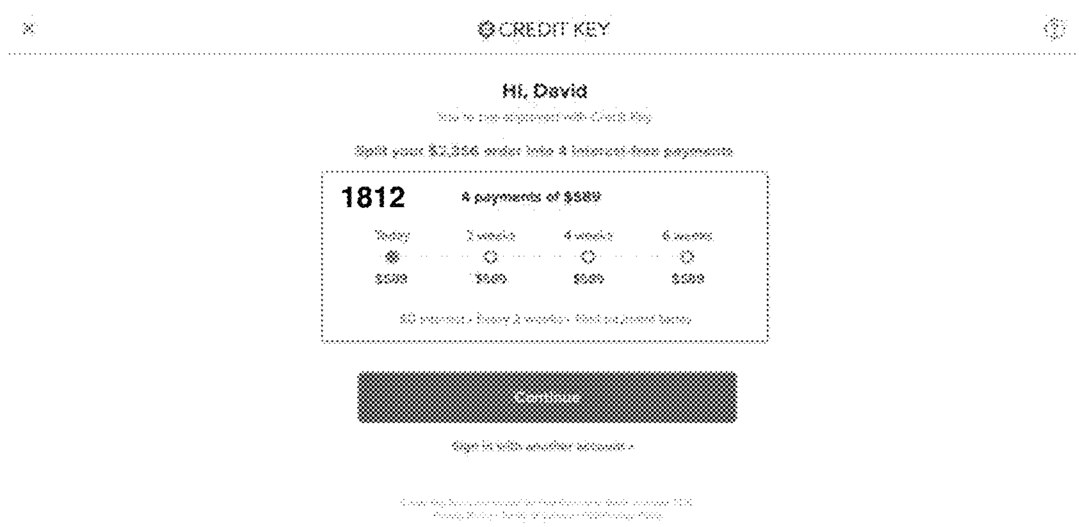

FIG. 18E shows the present invention's pay in 4 now as a payment option for the customer to complete their order 1808 by selecting the continue button 1810 and proceed to the pay in 4 checkout screen as shown in FIG. 18F.

FIG. 18F shows the first step of the pay in 4 checkout flow, where the customer can view the payment terms and amounts of each payment 1812 for the total amount of the order shown in the customers cart in FIG. 18E.

Figure 18G:
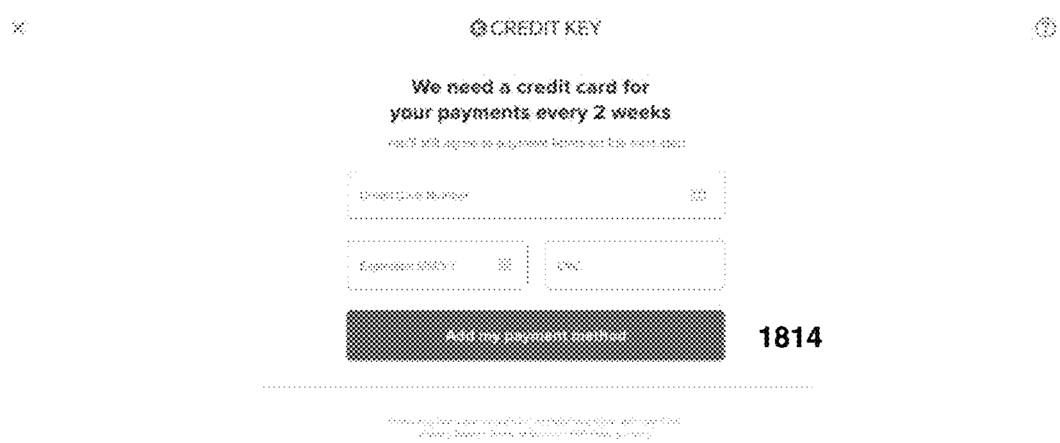

FIG. 18G shows the next screen of the pay in 4 checkout flow, wherein the customer must add their payment information 1814, such as their credit card number, expiration date and card verification code (CVC).

Figure 18H:
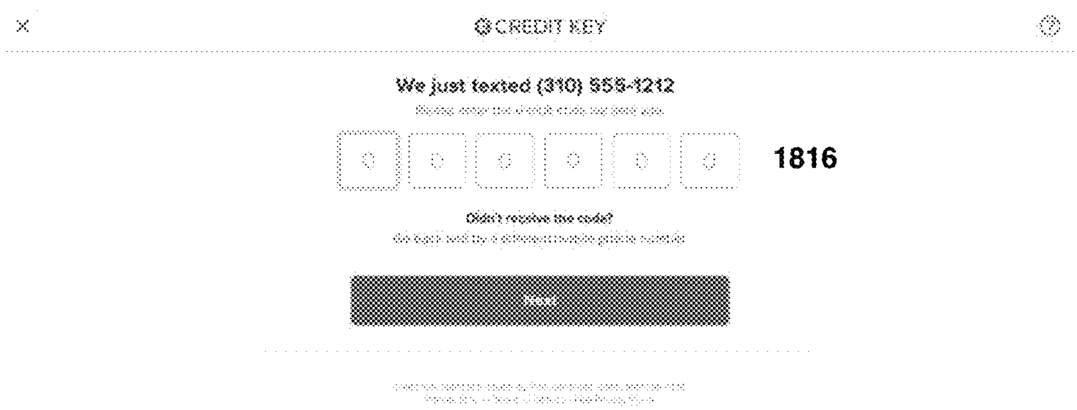

FIG. 18H shows the next screen of the pay in 4 checkout flow, wherein the customer must enter the 6-digit verification code 1816 that was sent to their mobile device.

Figure 18I:
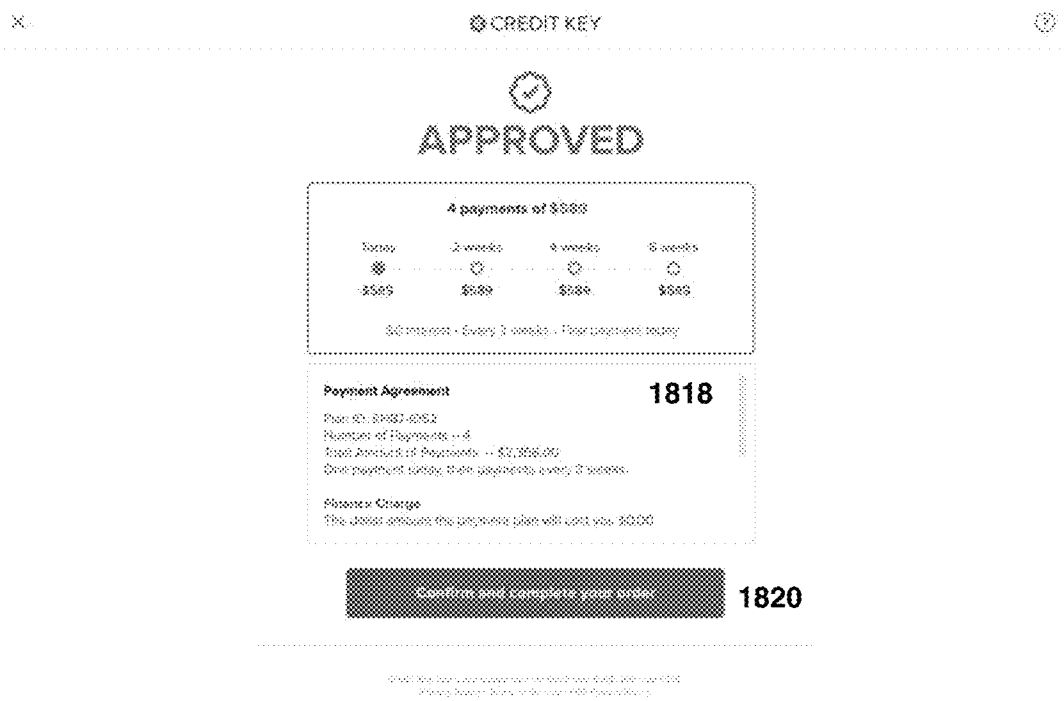

FIG. 18I shows the approval screen of the pay in 4 checkout flow. Once the identity of the customer has been verified, the customer can confirm the approval by reviewing the payment agreement 1818 and completing the transaction 1820.

Figure 18J:
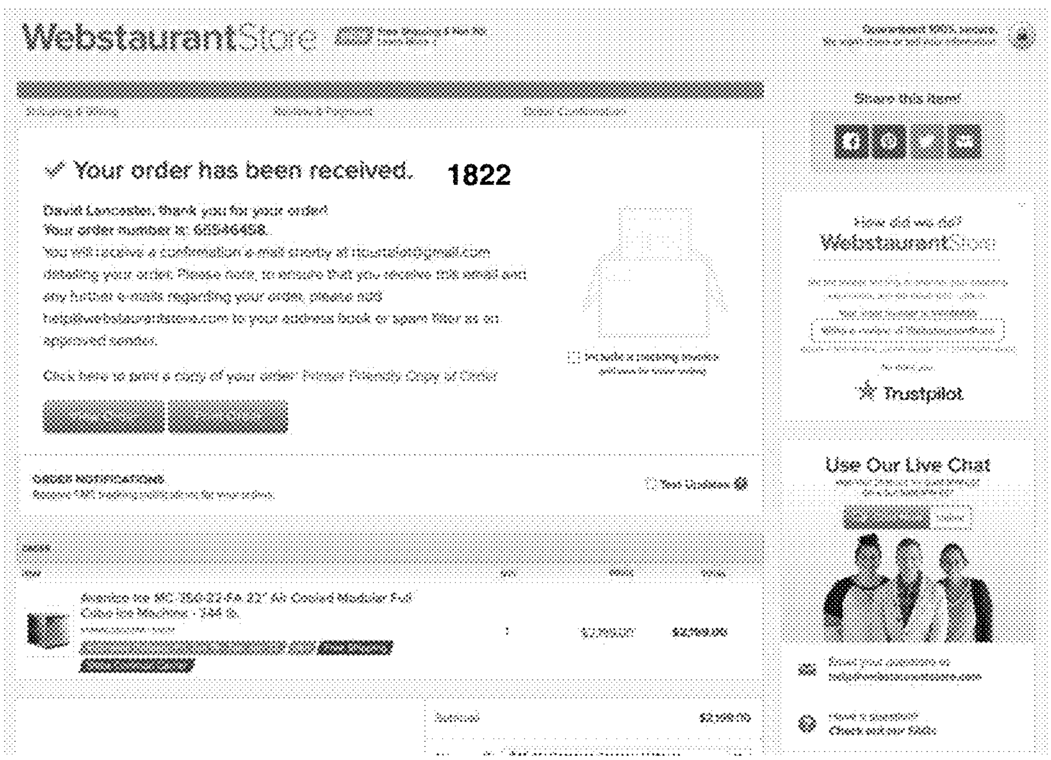

FIG. 18J shows the order confirmation screen 1822 once the pay in 4 checkout flow has been successfully completed, allowing the customer to view or print their order receipt.

Figure 19A:
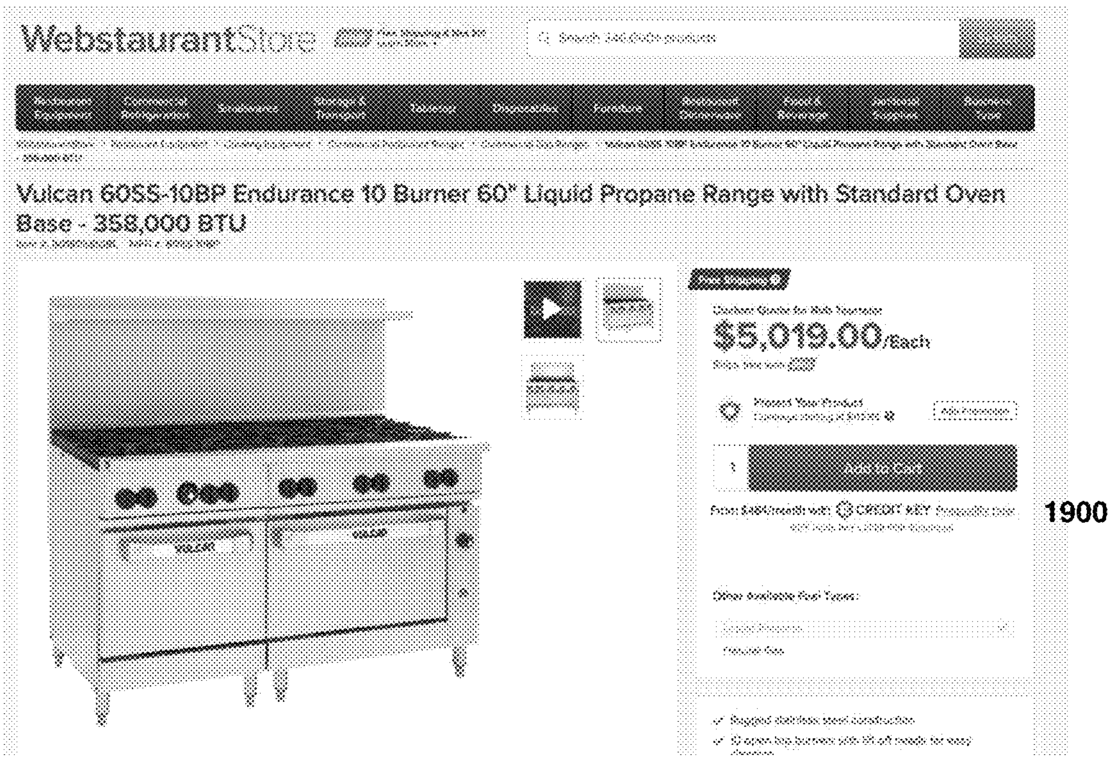
FIGS. 19A-B are screenshots of the financing checkout option of the present invention.
Figure 19B:
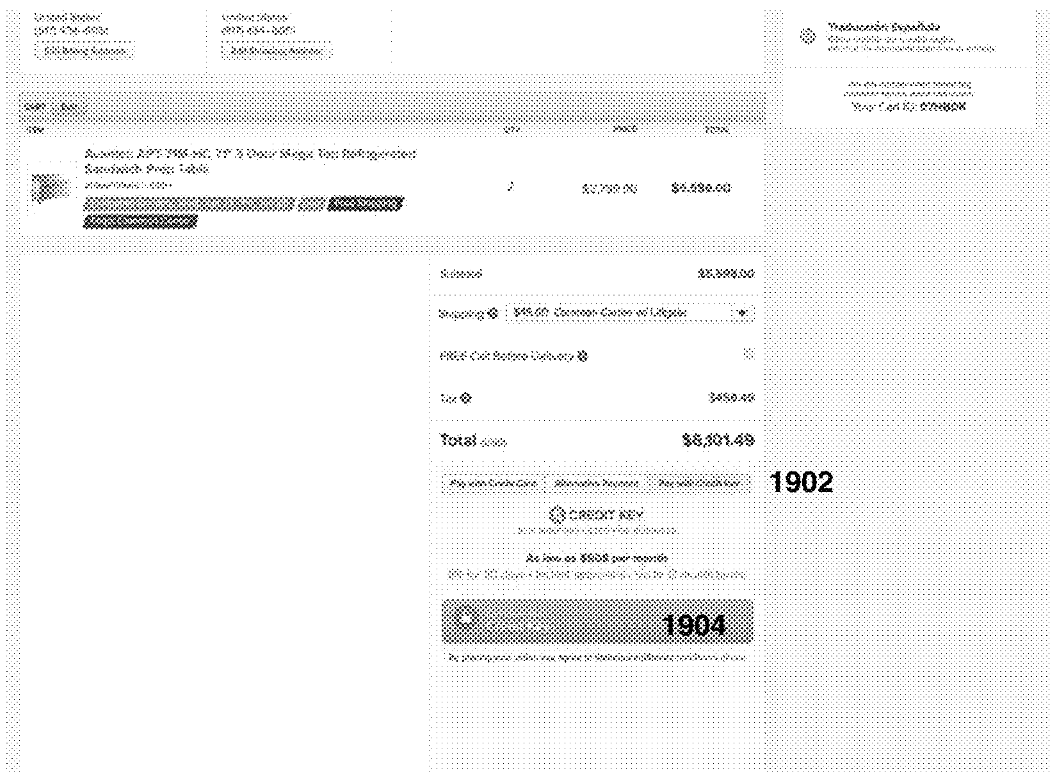

FIGS. 19A-B are screenshots of the credit checkout option of the present invention. In accordance with the preferred embodiment of the present invention, FIG. 19A is a screenshot of an online B2B ecommerce supply store, wherein the customer would add products to their online shopping cart. The customer's cart shown in FIG. 19A displays the option to use the present invention's buy now pay later credit purchase option 1900. FIG. 19B shows the present invention's credit purchase option now as a form of payment for the customer to complete their order 1902 by selecting the continue button 1904 to proceed to the credit purchase checkout screen of the present invention.

Figure 20A:
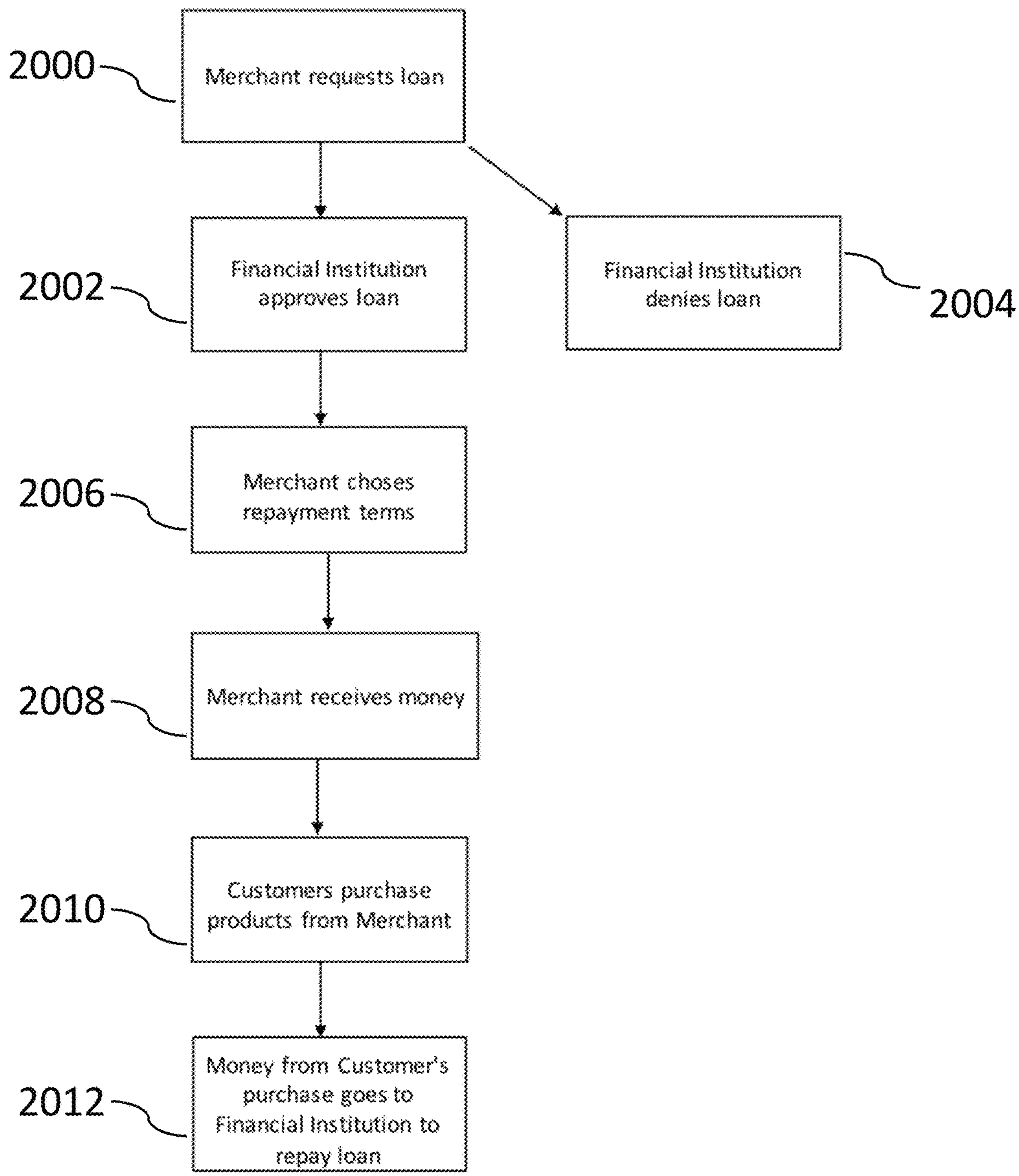
FIG. 20A is a flow diagram showing the Merchant loan option.

FIG. 20A is a flow diagram showing the Merchant loan option. If a Merchant needs a loan before they have sufficient funds to run their business, they can request a loan through the present invention. After the Merchant requests the loan via the loan request portal 2000, the Financial Institution will approve 2002 or deny 2004 the loan. Once the loan is approved, the Merchant will choose one of the provided repayment terms 2006. Once the option is chosen, the Merchant will receive the money 2008. When a customer purchases products from the Merchant 2010, the money from the purchase will go to the Financial Institution for repayment of the Merchant's loan 2012.

Figure 20B:
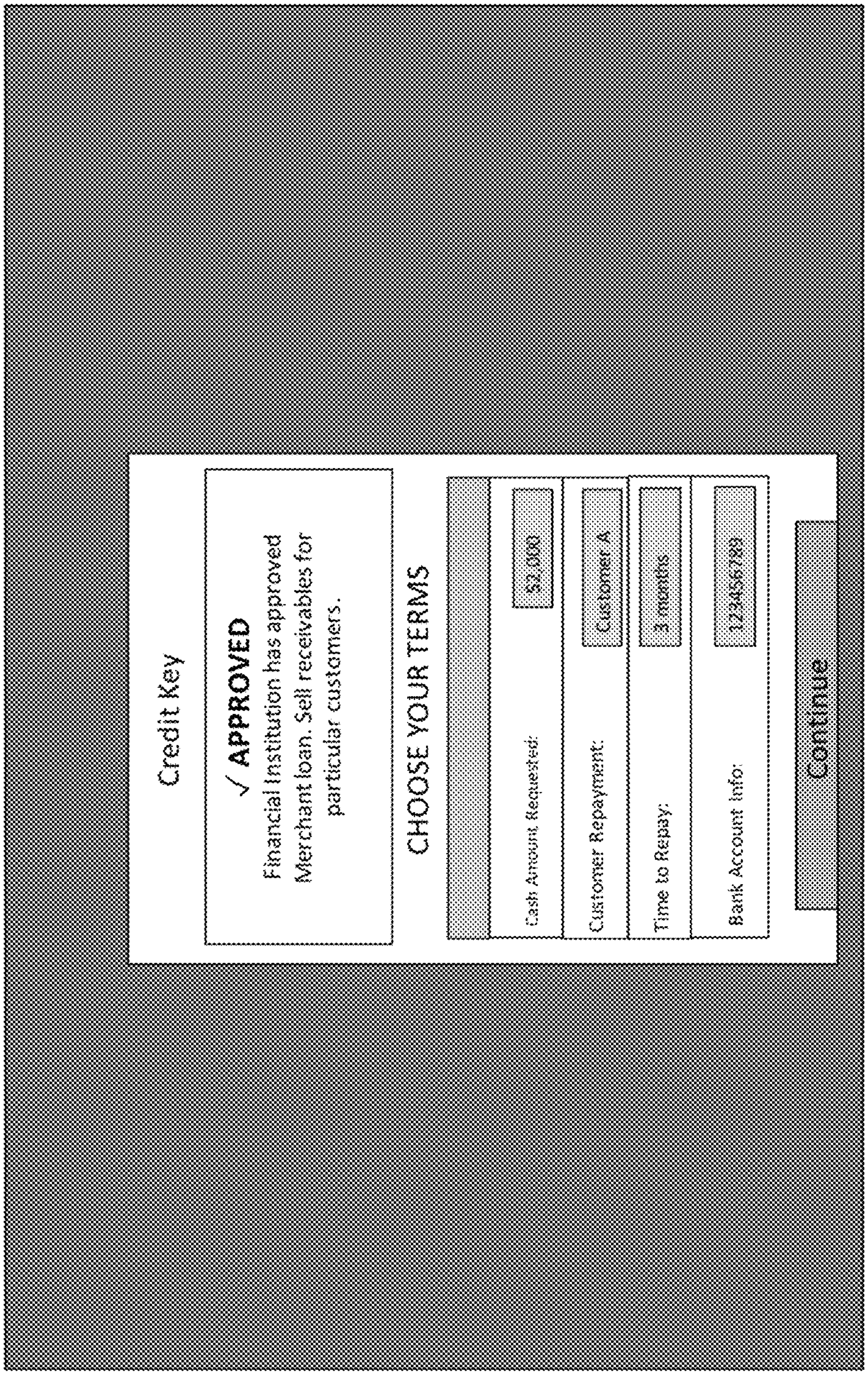
FIG. 20B is an image showing the Merchant loan option.

FIG. 20B shows the Merchant loan options. In this figure, the Merchant chooses which options are the best for them once they are approved. The Merchant puts in how much money they need, which of their customers they want to use the funds for repayment for, how long it will take to repay the loan, and their bank account information so they repayment can come through once the payment from customer goes through.

Figure 21:
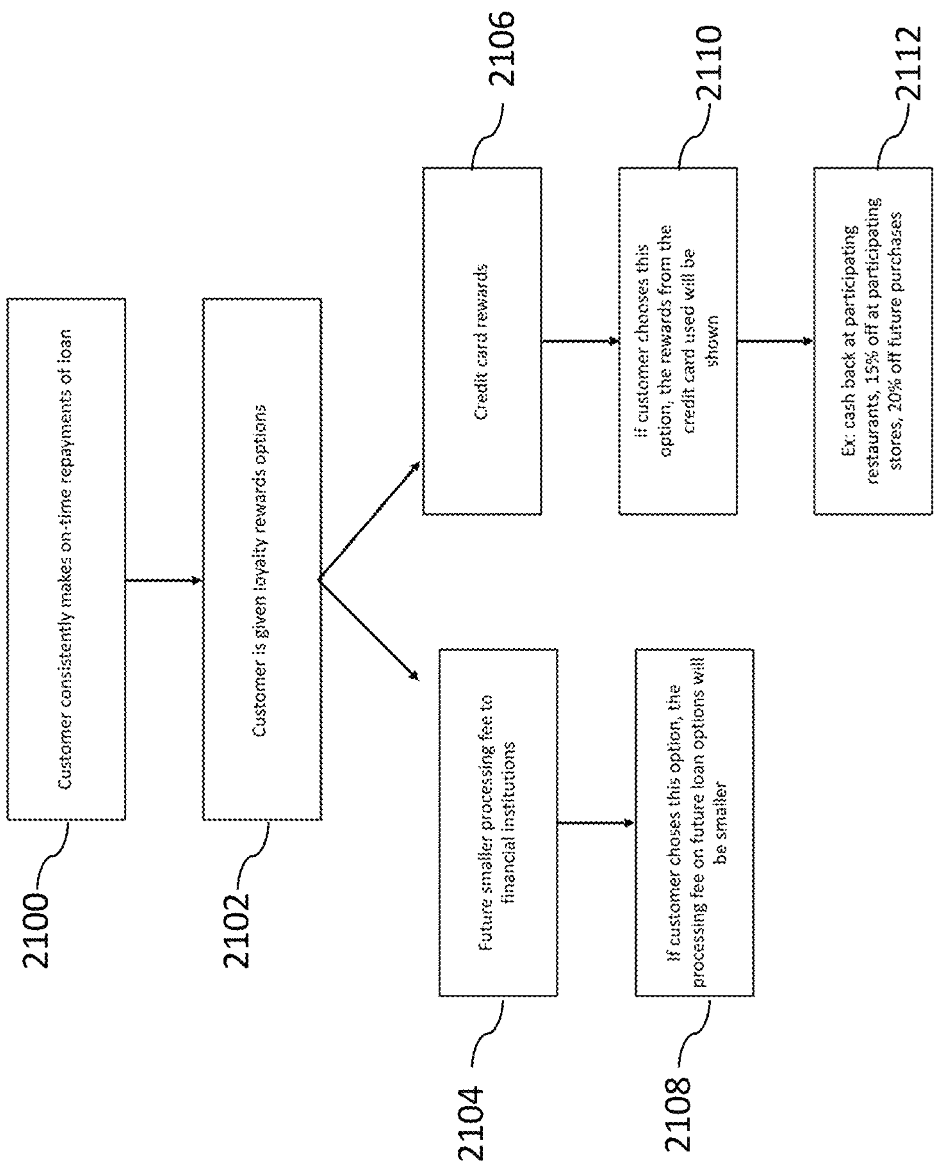
FIG. 21 is a flow diagram of the loyalty rewards program.

FIG. 21 is a flow diagram of one of the loyalty rewards options. In this diagram, because the customer has consistently made on-time repayments of their loan 2100; they are given the option to receive rewards 21002. The customer can choose whether to have a smaller processing fee for financial institutions in the future 2104 or to receive rewards from the credit card they are using to repay the loans 2106. If the customer chooses the smaller processing fee, when a future loan is made through the present invention, the processing fee for the financial institution will automatically decrease in price 2108. If the customer chooses rewards from the credit card they are using, the present invention will connect to the credit card application to show rewards that can be used by the specific credit card 2110. Some of these options can be cash back at participating restaurants, a certain percentage off at participating stores, or a certain percentage off all future purchases 2112.

Figure 22:
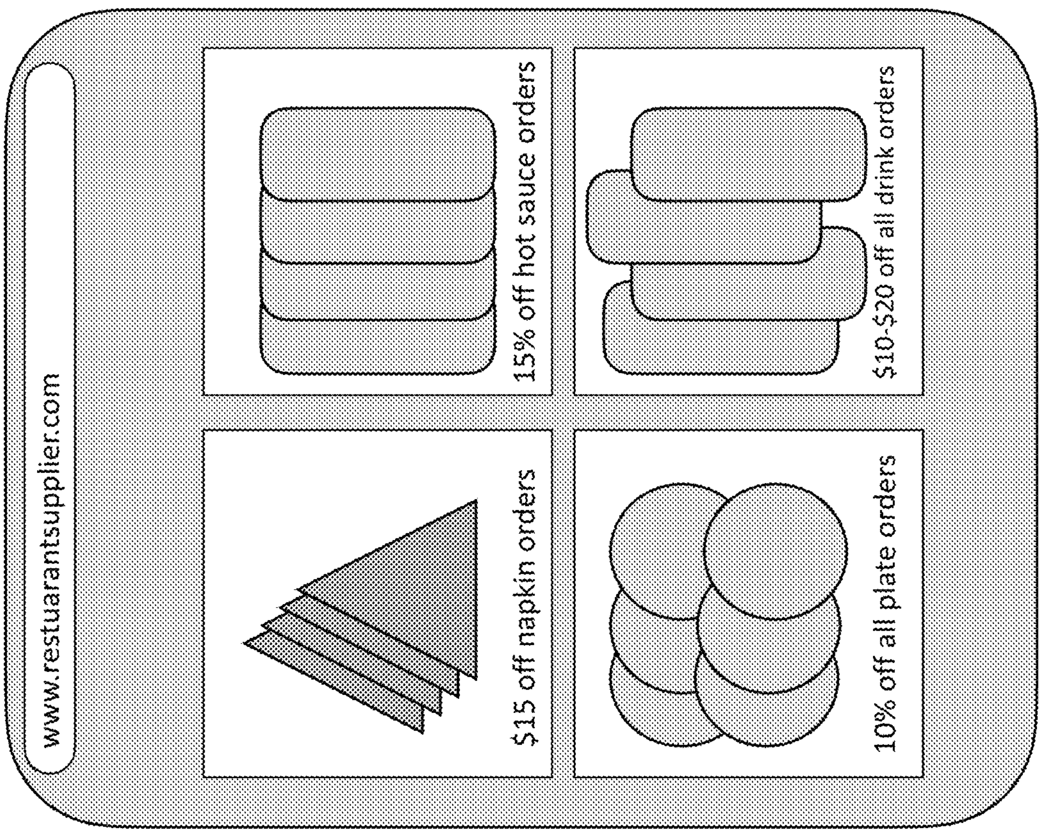
FIG. 22 is another diagram of the loyalty rewards program.

FIG. 22 is an image showing another loyalty rewards option. In this option, when a customer is purchasing items for their business through another business, they can receive discounts for those items using the present invention. In this example, the customer is purchasing from a restaurant supplier and is shown the option of receiving different discounts for items sold through this supplier. The customer is given these discounts as a result of their customer loyalty to the present invention.

Figure 23:
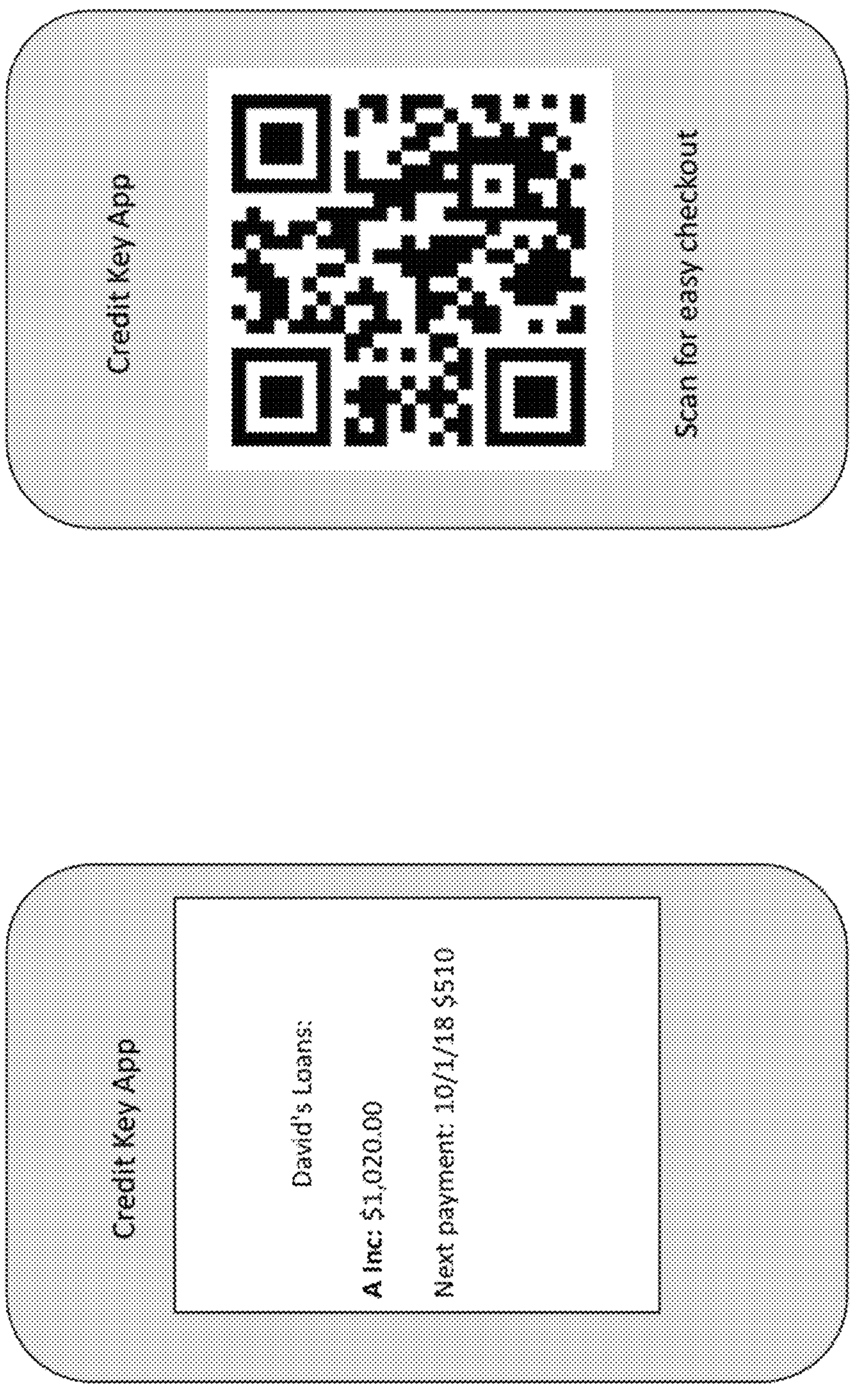
FIG. 23 is the present invention app.

FIG. 23 is the present invention app. On the app, the customer can see all open loans that they have with the present invention. Each loan will show how much money the loan is for along with when the next payment is due and how much the minimum payment is. The app also includes a QR code for the customer. This QR code can be scanned at a physical store that uses the present invention in order to create a quick and easy checkout while in person. The information associated with each customer's unique QR code can also be loaded onto a physical Credit Key Card ("CKC") that can be used for in-store purchases via chip insert, air tap, or magnetic strip swipe at any standard POS system or other physical check-out systems.

Similarly, in accordance with the preferred embodiment, merchants using the present invention may visibly display a unique QR code in their brick-and-mortar shop. This provides the opportunity for customers who are not yet affiliated with the system to quickly apply and potentially use it for their in-store purchase. Upon scanning the QR code, customers will be prompted to submit an application to the present invention. This process can be completed in a few minutes or less. Once approved, the merchant can redirect the sale by inputting the customer's Bank Identification Number ("BIN") into the Credit Key portal interface on their POS device and completing the transaction with the present invention. This changes the domain of the transaction from the merchant to the present invention during checkout, allowing for the application of the present invention for virtual, online shopping to be replicated in-person at brick-and-mortar shops seamlessly.

Figure 24:
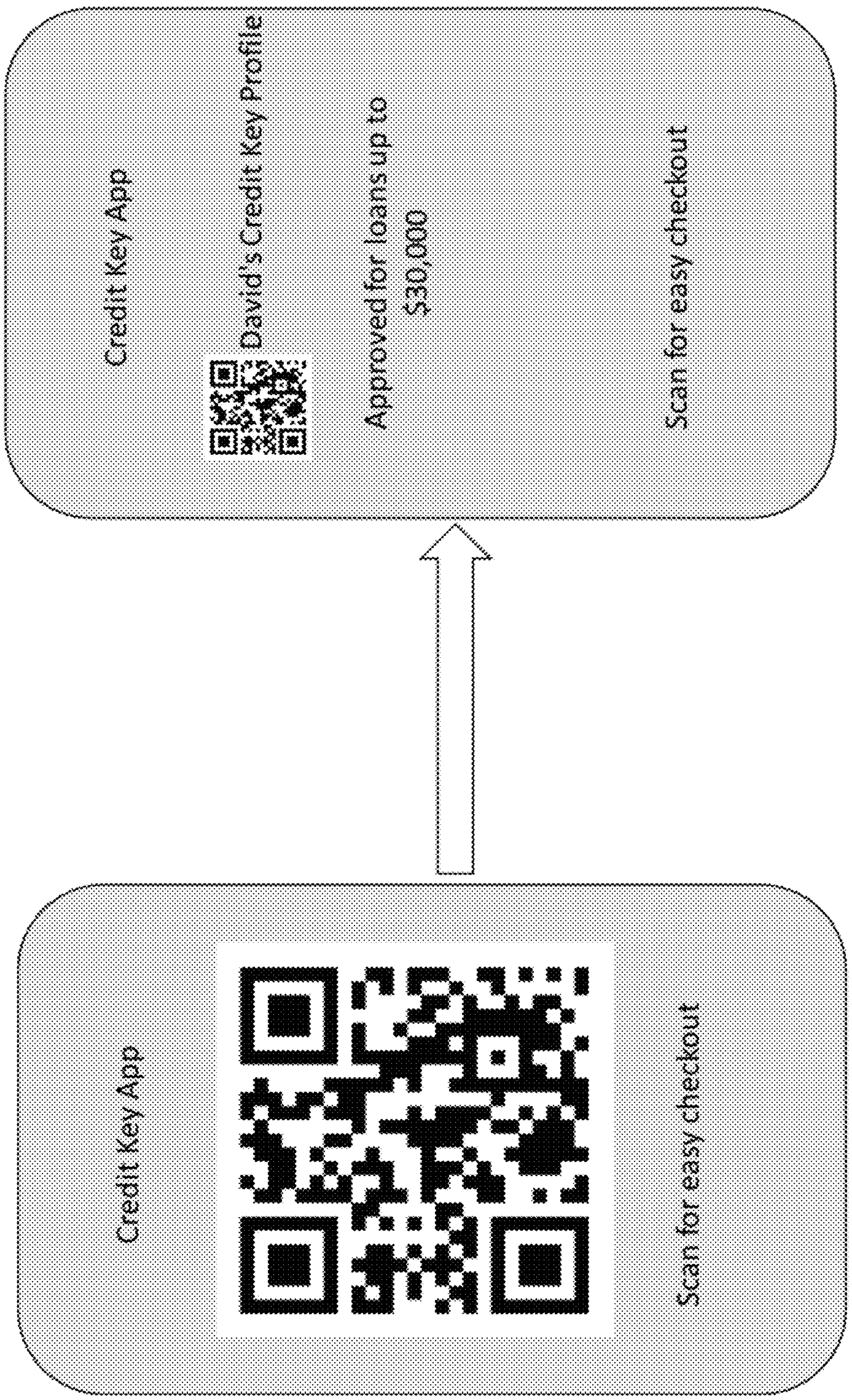
FIG. 24 is the present invention app QR code information.

FIG. 24 is a diagram showing the present invention's user's profile that comes up when the QR code is scanned in person. This information will also pop up on the Merchant's computer, showing the Merchant that the customer is approved for a loan and can purchase the products with the loans. This QR code creates a quick and easy checkout while at a physical store. This also gives more Merchants the opportunity to use the present invention while also allowing more customers to use the benefits of the present invention.

Figure 25:
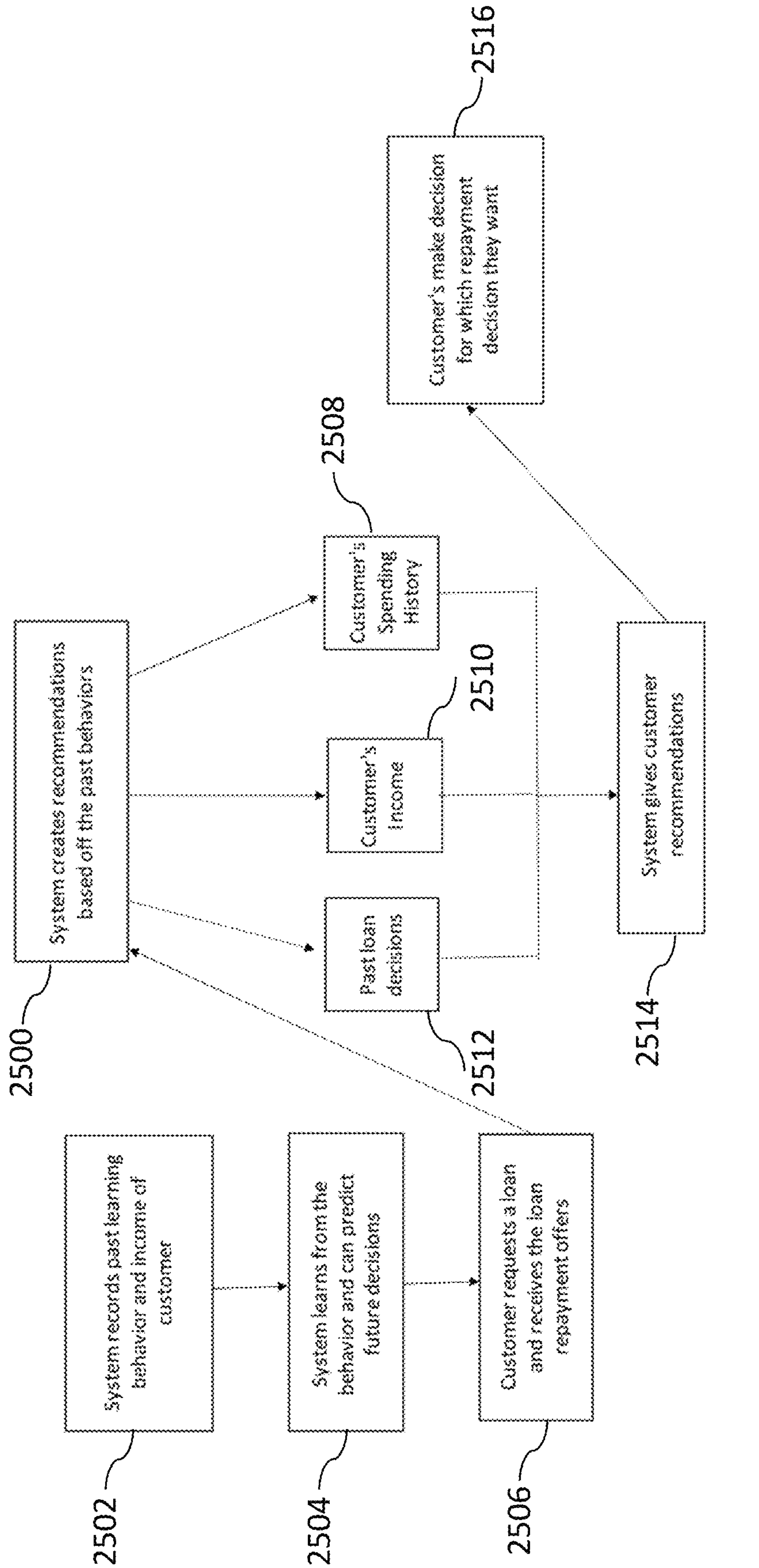
FIG. 25 is a flow diagram of the present invention's recommendation system.

FIG. 25 is a flow diagram showing the present invention's recommendations. The system records past learning behavior and income of the customer 2502. From this, the system learns from the behaviors and can make predictions about the future for the customers 2500. A customer will then request a loan and receive the loan repayment offers given by the financial institution through the present invention. Based on the past behaviors that the system has learned from, the system will give recommendations 2514. These recommendations are based on past loan decisions 2512, income 2510, and spending history 2508. Once these recommendations are given, the customer can decide which repayment offer they want to take 2516.

Figure 26:
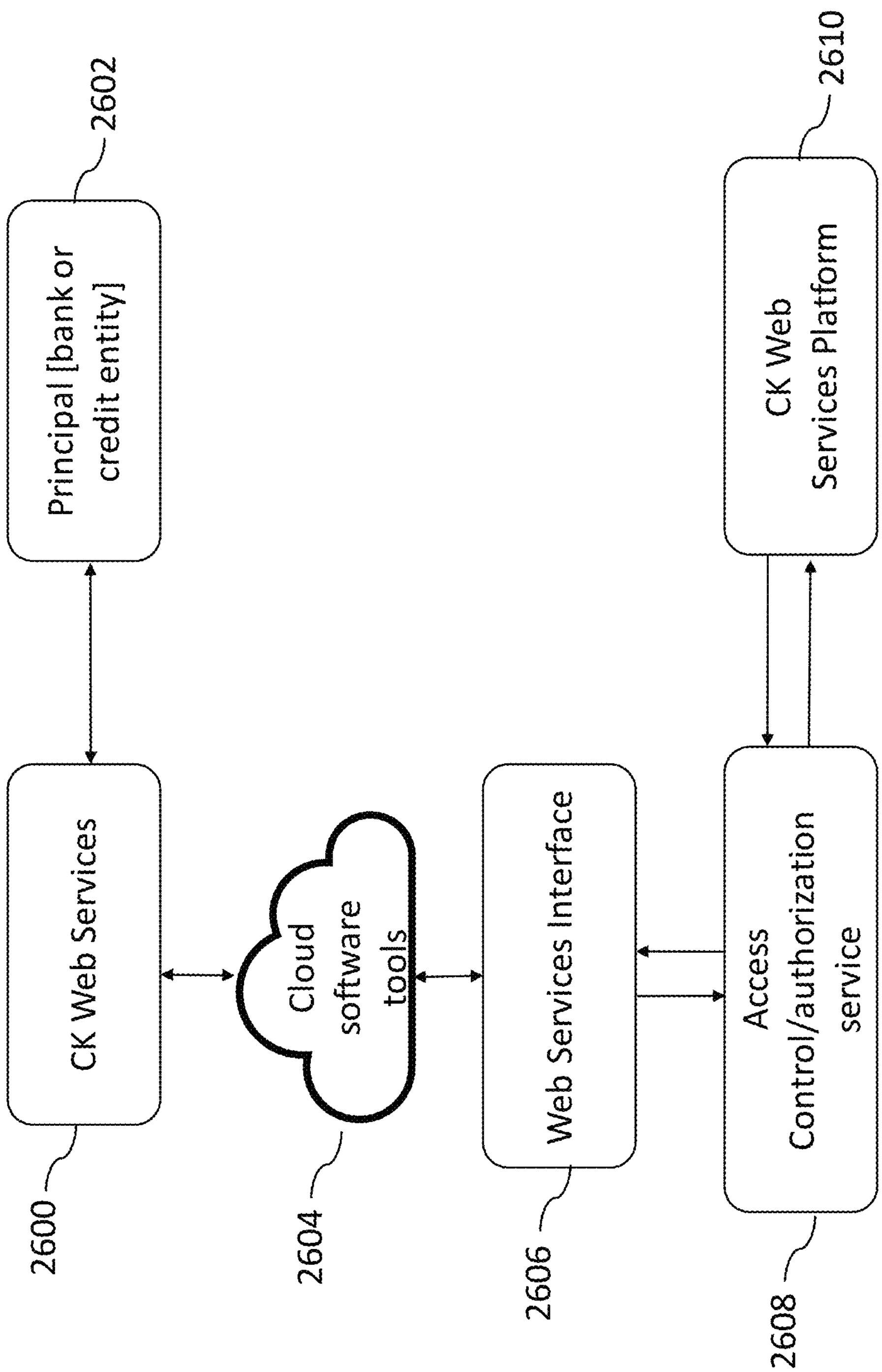
FIG. 26 is a flow diagram outlining the integration of cloud software tools with the present invention's web services.

FIG. 26 is a diagram of the flow of access between the platform of the present invention and the provided CKWS 2600 via cloud software tools 2604. The principal or bank or credit entity 2602 accesses the web services client, which then transmits data via cloud software tools 2604 to the CKWS interface 2606. Access control and authorization 2608 acts as a barrier in order to access the CKWS platform 2610 by way of the CKWS interface 2606.

Figure 27:
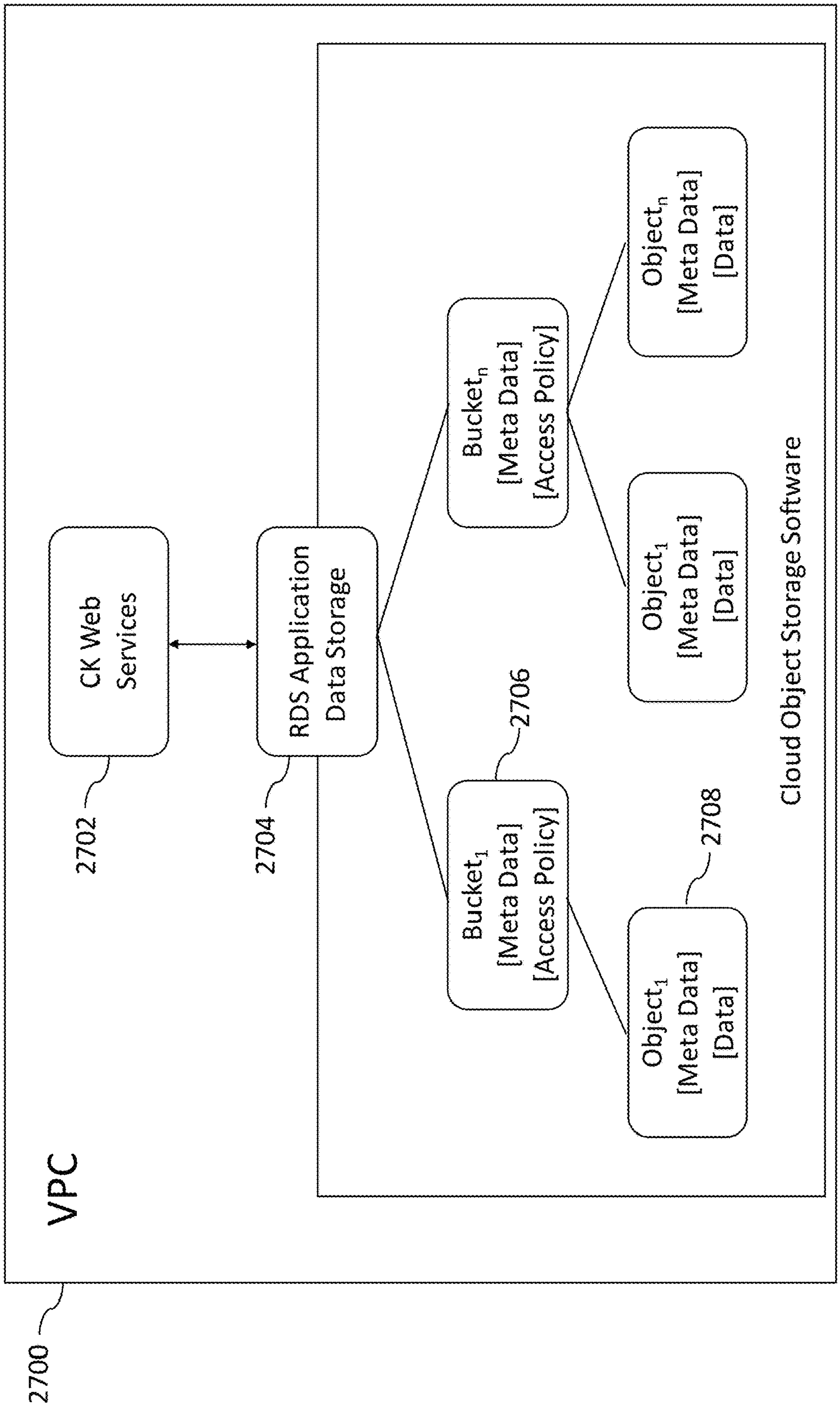
FIG. 27 is a diagram outlining the storage of data in the virtual private cloud space via RDS database storage.

FIG. 27 is a diagram of an example of a virtual private cloud storage organization 2700 in which CKWS 2702 access and retrieve analytic data stored via RDS database 2704 as objects 2708 in buckets 2706 within a virtual private cloud storage space 2700. The virtual private cloud storage space 2700 is a means of storing and protecting any amount of data for a range of use cases. Buckets 2706 are containers for objects 2708 stored in the virtual private cloud storage space 2700 and objects 2708 consist of object data and metadata. The metadata is a set of name-value pairs that describe the object. These pairs include some default metadata, such as the date last modified, and standard metadata, such as Content-Type. You can also specify custom metadata at the time that the object is stored. CKWS 2702 provide access to and from the virtual private cloud object storage space 2700.

Figure 28:
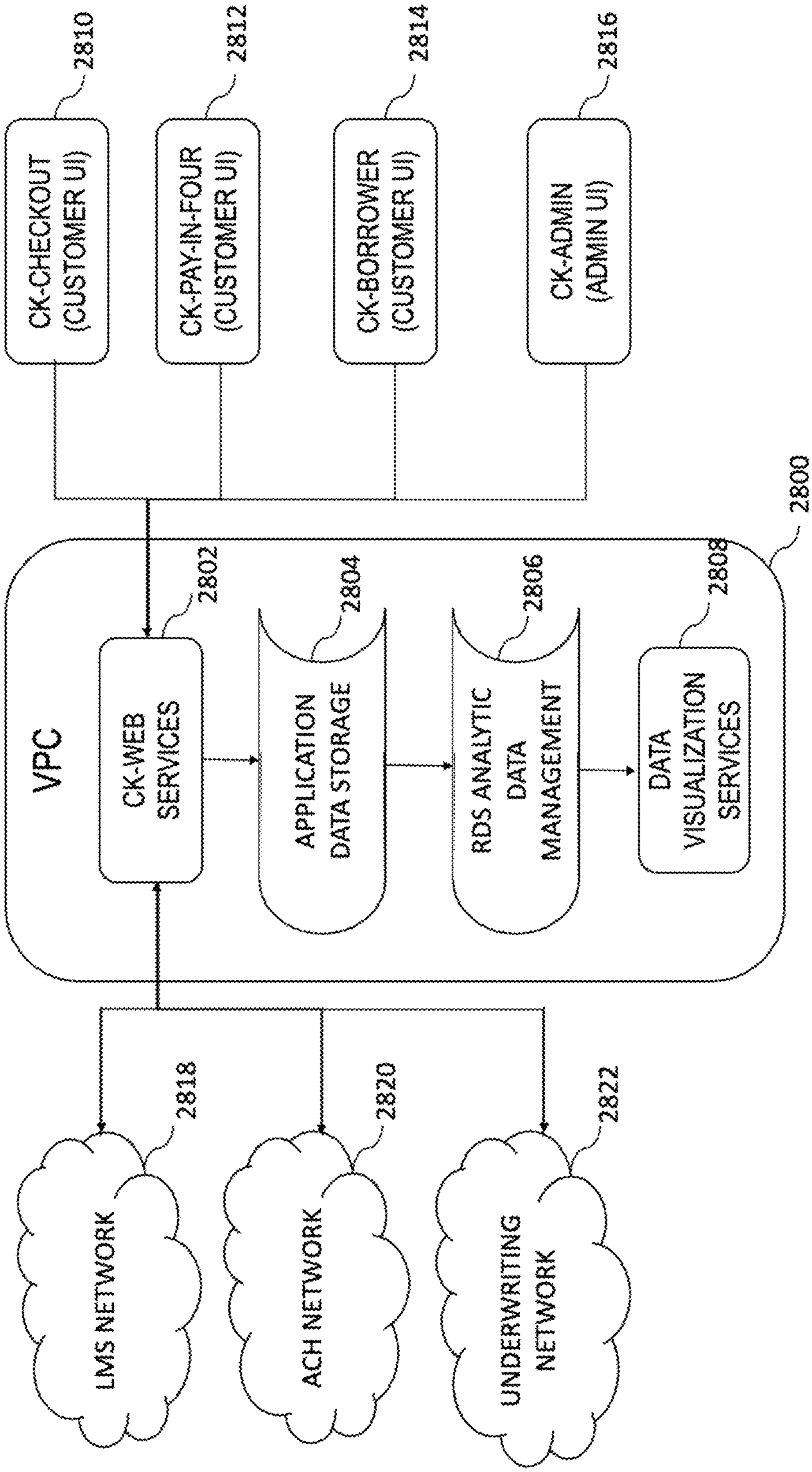
FIG. 28 is a diagram outlining the present invention's network flow between user-interfaces, virtual private cloud databases, and various networks.

FIG. 28 is a diagram of a network used to practice the present invention. CKWS (accessed via a virtual private cloud platform 2800) provide customers with access to several databases and networks. In accordance with the preferred embodiment, CKWS are accessed by the customers via several user interfaces including Credit Key checkout 2810, Credit Key pay-in-four 2812, and Credit Key borrower 2814. These user interfaces can be presented via computers, wireless interface devices, or other devices that connect to the Internet or other wired or wireless services. Administration users can also access CKWS via the Credit Key Admin portal 2816 on similar interface devices. Several databases are located within the virtual private cloud platform 2800. Data from the application itself are stored in secure database 2802. This database stores information as JavaScript Object Notation ("JSON")-like objects which resemble objects in the application code allowing for secure storage and access. A Relational Database Service ("RDS") provides management of analytic data regarding CKWS 2804. Lastly, data visualization software services 2808 are contained within virtual private cloud 2800 allowing for quick data reporting and analysis.

CKWS 2802 access a Learning Management Network ("LMS") 2818 which provides bank infrastructure and financial services according to the CKWS model. This infrastructure includes online transactions such as transfers and loans as well as access to financial intermediaries. CKWS also access an Automated House-Clearing ("ACH") Network 2820 for electronic fund transfers. Underwriting network 2822 provides the process through which Credit Key accepts financial risk for a fee and takes on this liability for the CKWS 2802 based on a given user's approval for credit key services. Before the risk is taken, a customer must be approved via the known borrower underwriting model, which requires the customer to input basic personal and business data. In order to pass the first check point in the underwriting process, the applicant's business address must be located within the U.S., the cart amount must be below the threshold of $50,0000.00, the GAR must be within the threshold of more than $40,000.00, and the owner must be at least 18 years old. After the customer passes this "preflight check" they must then be verified as a known borrow and pass the ERP/TCH Hard Cuts verification. These processes are further described in FIG. 4.

Figure 29:
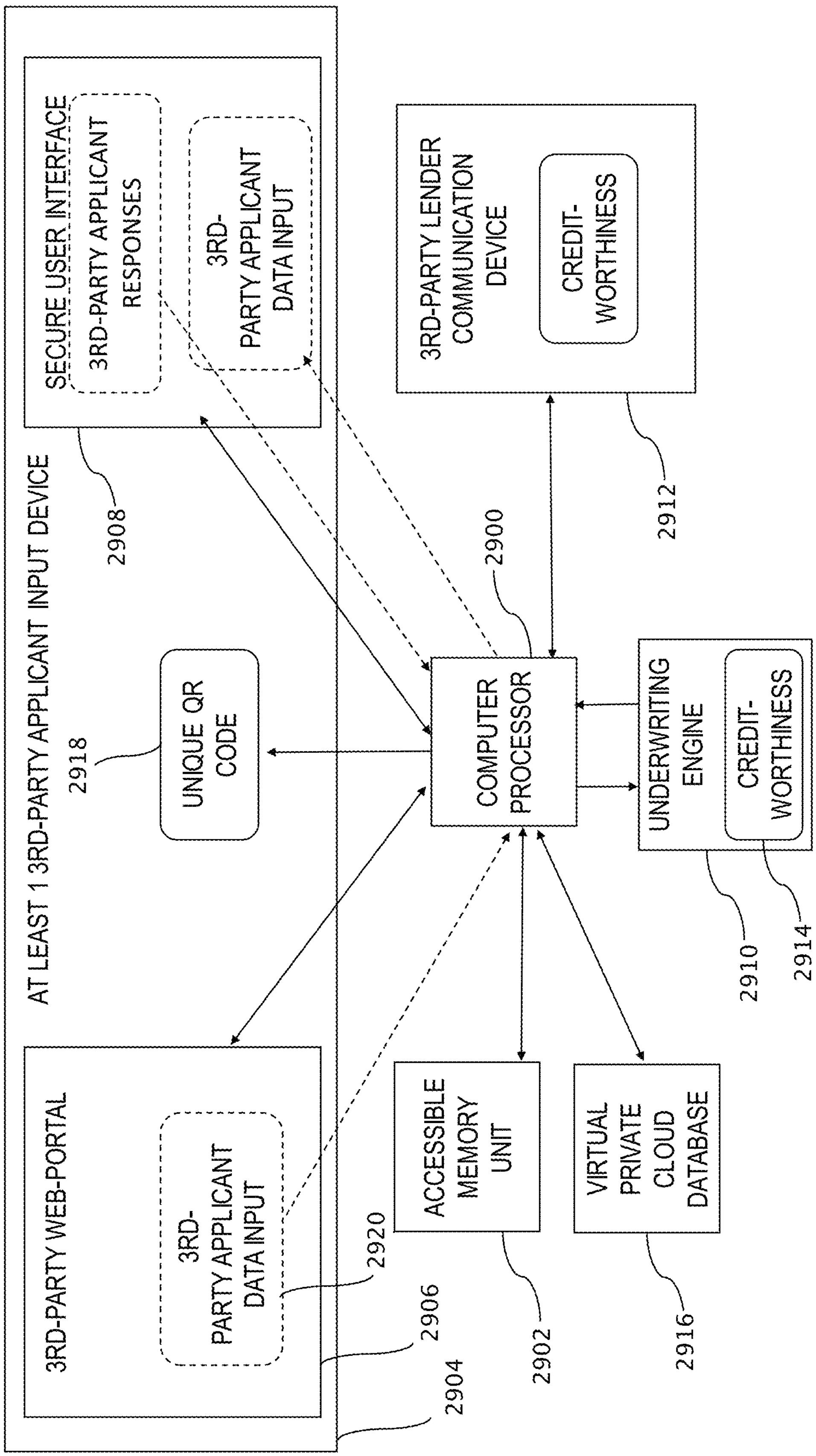
FIG. 29 shows a general overview of the system.

FIG. 29 shows a general overview of the system. The computer processor 2900 communicates with an accessible memory unit 2902, which provides computer-executable instructions which, when executed by the computer processor 2900, cause the system to securely redirect data input by at least one third-party applicant 2920 from a third-party web-portal 2906 to a secure interface 2908 on the at least one third-party applicant input device 2904. Furthermore, the computer processor receives responses from the at least one third-party applicant on the secure interface 2908. The computer processor 2900 also communicates with an underwriting engine 2910 which determines the creditworthiness of the at least one third-party business applicant and communicates the creditworthiness back to the computer processor which then redirects the information to the at least one third party applicant device 2904 and to at least one third-party lender device 2912. The computer processor can also communicate with a virtual private cloud database 2916 in which it stores, compares, and retrieves relevant data. The computer processor can also generate a unique QR code for the at least one third party business applicant that, when scanned, redirects the scanner to the credit information of the at least one third-party business applicant. The computer processor can also enable a machine-learning algorithm to determine a plurality of recommendable payment options to provide to the at least one third-party business applicant once the at least one third party business applicant is approved based on their creditworthiness.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that may be included in the disclosed technology. The disclosed technology is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the technology disclosed herein. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

What is claimed is:

1. A system for processing business-to-business lending opportunities, capable of communicating with at least one third-party applicant input-output device and at least one third-party lender device not associated with said system over the internet, said system comprising:

a computer processor;

a non-transitory computer readable and accessible memory unite capable of storing computer executable instructions, which when executed by said computer processor, causes said system to:

securely transmit data input by at least one third-party applicant from a third-party web-portal to a third-party applicant interface corresponding with at least one third-party applicant input-output device, said third-party applicant interface containing a plurality of third-party applicant input data related to a creditworthiness rating of said at least one third-party applicant;

securely receive responses from said at least one third-party applicant via said at least one third-party applicant input-output device;

securely transmit said responses to an underwriting engine, said underwriting engine configured to receive said responses and assess a degree of said creditworthiness rating relating to said at least one third-party applicant and assigning a creditworthiness rating to said at least one third-party applicant;

securely receive said creditworthiness rating from said underwriting engine;

securely communicate said creditworthiness rating to said at least one third-party lender device not associated with said system; securely redirect said at least one third-party applicant from said third-party applicant interface to said at least one third-party lender device not associated with said system via a secure network to determine an amount of credit extended;

capture at a point-of-sale personal information pertaining to said at least one third-party applicant including applicant first name, applicant last name, applicant home address, applicant telephone number, and business information associated with said at least one third-party applicant including gross annual revenue;

execute instructions providing a plurality of recommended payment options, wherein said plurality of recommended payment options are determined via said at least one third-party lender device not associated with said system;

locate said at least one third-party applicant independently of said data input by said at least one third-party applicant wherein said locating requires existence of known borrower information available from publicly available data resources and wherein said locating independently verifies location data input by said at least one third-party applicant;

store said known borrower information collected in a virtual private cloud database associated with said system;

compare, via said computer processor, said third-party applicant input data related to said creditworthiness rating with publicly available credit information associated with said at least one third-party applicant;

compare, via said computer processor, gross annual revenue data entered by said at least one third-party applicant with said known borrower information available from publicly available resources;

compare, via said computer processor, data input by said at least one third-party applicant with publicly available business information including an amount of time said at least one third-party applicant has been in business according to said publicly available business information, and wherein said at least one third-party applicant physically authenticates an agreement with business terms extended by said at least one third-party lender device; and generate, on at least one third-party applicant device, a unique quick-response code that, when scanned by a merchant device, redirects said third-party applicant input data related to said creditworthiness rating of said at least one third-party applicant stored on said at least one third-party applicant device to said merchant device.

2. The system of claim 1, wherein said computer executable instructions are further capable of determining completeness of said responses to a series of inputs and securely communicates requirements for complete responses to said at least one third-party applicant input-output device.

3. The system of claim 1, further comprising computer executable instructions, which when executed by said computer processor, cause said system to securely transmit said creditworthiness rating associated with said at least one third-party applicant to said at least one third-party lender device not associated with said system.

4. The system of claim 1, wherein said creditworthiness rating is determined by a variety of factors, which when analyzed determine a risk value associated with lending to said at least one third-party applicant.

5. The system of claim 4, wherein said underwriting engine determines said risk value and communicates it to said at least one third-party lender device not associated with said system.

6. The system of claim 4, wherein said underwriting engine is further configured to determine a possible manner in which said at least one third-party applicant can lower said risk value.

7. The system of claim 1, further configured to communicate a risk mitigation strategy to said at least one third-party applicant.

8. A computerized method for providing payments, said computerized method comprising:

transferring at least one third-party applicant from an original point-of-sale transaction to a simplified credit application via a secure network;

receiving responses to said simplified credit application from said at least one third-party applicant via said secure network;

assessing a creditworthiness rating of said at least one third-party applicant;

analyzing a lending risk associated with lending to said at least one third-party applicant based on said creditworthiness rating;

securely redirecting said at least one third-party applicant from said simplified credit application to at least one third-party lender device via said secure network to determine an amount of credit extended;

redirecting said at least one third-party applicant back to an original point-of-sale transaction based on a decision received from said at least one third-party lender device;

capturing at a point-of-sale personal information pertaining to said at least one third-party applicant including applicant first name, applicant last name, applicant home address, applicant telephone number, and business information associated with said at least one third-party applicant including gross annual revenue;

generating said creditworthiness rating in real-time to said at least one third-party applicant; and transmitting said at least one third-party applicant to an original electronic commerce transaction via at least one third-party applicant interface;

executing, by one or more processors, instructions for providing a plurality of recommended payment options, wherein said plurality of recommended payment options are determined via said at least one third-party lender device;

locating said at least one third-party applicant independently of data input by said at least one third-party applicant wherein said locating requires existence of known borrower information available from publicly available data resources and wherein said locating independently verifies location data input by said at least one third-party applicant;

store said known borrower information collected in a virtual private cloud database;

compare, via a computer processor, said third-party applicant input data related to said creditworthiness rating with publicly available credit information associated with said at least one third-party applicant;

compare, via a computer processor, gross annual revenue data entered by said at least one third-party applicant with said known borrower information available from publicly available resources;

compare, via said computer processor, data input by said at least one third-party applicant with publicly available business information including an amount of time said at least one third-party applicant has been in business according to said publicly available business information, and wherein said at least one third-party applicant physically authenticates an agreement with business terms extended by said at least one third-party lender device; and generate, on at least one third-party applicant device, a unique quick-response code that, when scanned by a merchant device, redirects said third-party applicant input data related to said creditworthiness rating of said at least one third-party applicant stored on said at least one third-party applicant device to said merchant device.

9. The method of claim 8, further comprising a secure method of communicating with said at least one third-party applicant and said at least one third-party lender device.

10. The method of claim 8, further comprising determining said creditworthiness rating of said at least one third-party applicant using predetermined factors.

11. The method of claim 8, further comprising communicating said lending risk to said at least one third-party applicant.

12. The method of claim 8, further comprising instructions transmitted to said at least one third-party applicant to lower said lending risk.

13. The method of claim 12, further comprising tracking said at least one third-party applicant's lending risk over time.

14. The method of claim 12, further comprising risk mitigation strategies communicated to said at least one third-party lender device.

15. A system of computers for facilitating business-to-business lending comprising:

a processor coupled to a memory;

an operating environment executing using said processor;

an underwriting engine that is configured to determine a creditworthiness rating of at least one third-party applicant;

a secure network, including a platform to which said at least one third-party applicant is transferred to provide responses to requests;

a risk assessment engine, capable of determining a risk value related to a risk of lending to said at least one third-party applicant and communicating said risk value to at least one third-party lender device not associated with said system securely;

a non-transitory computer readable memory and accessible memory unit capable of storing computer executable instructions, which when executed by said processor, cause said system to:

capture, at a point-of-sale, personal information pertaining to said at least one third-party applicant including applicant first name, applicant last name, applicant home address, applicant telephone number, and business information associated with said at least one third-party applicant including gross annual revenue associated with said at least one third-party applicant;

execute instructions for providing a plurality of recommended payment options, wherein said plurality of recommended payment options are determined via said at least one third-party lender device not associated with said system;

securely redirect said at least one third-party applicant from a secure third-party applicant interface to at least one third-party lender device not associated with said system via said secure network to determine an amount of credit extended;

generate, on at least one third-party applicant device, a unique quick-response code that, when scanned by a merchant device, redirects third-party applicant input data related to a creditworthiness rating of said at least one third-party applicant stored on said at least one third-party applicant device to said merchant device;

locate said at least one third-party applicant independently of data input by said at least one third-party applicant wherein said locating requires existence of known borrower information available from publicly available data resources and wherein said locating independently verifies location data input by said at least one third-party applicant;

store said known borrower information collected in a virtual private cloud database associated with said system;

compare, via said computer processor, said third-party applicant input data related to said creditworthiness rating with publicly available credit information associated with said at least one third-party applicant;

compare, via said processor, gross annual revenue data entered by said at least one third-party applicant with said known borrower information available from publicly available resources;

compare, via said processor, data input by said at least one third-party applicant with publicly available business information including an amount of time said at least one third-party applicant has been in business according to said publicly available business information, and wherein said at least one third-party applicant physically authenticates an agreement with business terms extended by a third-party lender device not associated with said system.

16. The system of claim 15, further comprising a secure method of communicating with said at least one third-party applicant and said at least one third-party lender device not associated with said system.

17. The system of claim 15, further capable of determining said creditworthiness rating of said at least one third-party applicant using predetermined factors.

18. The system of claim 15, further capable of communicating said risk value to said at least one third-party applicant.

19. The system of claim 15, further capable of providing instructions associated with risk mitigation to said at least one third-party applicant.

20. The system of claim 15, further capable of providing instructions associated with risk mitigation to said at least one third-party lender device not associated with said system.

21. The system of claim 15, wherein said processor is further configured to redirect said at least one third-party applicant to a third-party banking engine for further credit processing.

* * * * *